(12) United States Patent
Yamauchi et al.

(10) Patent No.: US 9,156,937 B2
(45) Date of Patent: Oct. 13, 2015

(54) BLOCK POLYISOCYANATE COMPOSITION AND COATING COMPOSITION CONTAINING SAME

(75) Inventors: Masakazu Yamauchi, Tokyo (JP); Takahiro Itamochi, Tokyo (JP); Kie Shinomiya, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 185 days.

(21) Appl. No.: 13/577,293

(22) PCT Filed: Feb. 7, 2011

(86) PCT No.: PCT/JP2011/052484
§ 371 (c)(1),
(2), (4) Date: Aug. 6, 2012

(87) PCT Pub. No.: WO2011/096559
PCT Pub. Date: Aug. 11, 2011

(65) Prior Publication Data
US 2012/0316291 A1    Dec. 13, 2012

(30) Foreign Application Priority Data

Feb. 8, 2010   (JP) ................. 2010-025805
Feb. 8, 2010   (JP) ................. 2010-025828
Apr. 7, 2010   (JP) ................. 2010-088516
Jun. 4, 2010   (JP) ................. 2010-129249

(51) Int. Cl.
C08G 18/08   (2006.01)
C08G 18/80   (2006.01)
C09D 175/04  (2006.01)
C08G 18/62   (2006.01)
C08G 18/78   (2006.01)
C08G 18/79   (2006.01)
C08G 18/02   (2006.01)
C08G 18/28   (2006.01)

(52) U.S. Cl.
CPC .......... *C08G 18/8093* (2013.01); *C08G 18/022* (2013.01); *C08G 18/0823* (2013.01); *C08G 18/283* (2013.01); *C08G 18/6225* (2013.01); *C08G 18/7837* (2013.01); *C08G 18/792* (2013.01); *C08G 18/80* (2013.01); *C08G 18/808* (2013.01); *C08G 18/8048* (2013.01); *C08G 18/8064* (2013.01); *C08G 18/8096* (2013.01); *C09D 175/04* (2013.01)

(58) Field of Classification Search
CPC .............................. C08G 18/80; C08G 18/808
USPC ............................ 528/49, 52, 53; 560/25, 26
See application file for complete search history.

(56) References Cited

U.S. PATENT DOCUMENTS

| | | | | |
|---|---|---|---|---|
| 4,096,291 | A | * | 6/1978 | Dunwald et al. ............... 427/120 |
| 4,373,081 | A | | 2/1983 | Nachtkamp et al. |
| 4,495,229 | A | * | 1/1985 | Wolf et al. ................. 427/388.2 |
| 4,859,788 | A | | 8/1989 | Brindoepke et al. |
| 5,126,424 | A | | 6/1992 | Brindoepke et al. |
| 5,350,825 | A | * | 9/1994 | Konig et al. .................... 528/45 |
| 5,705,593 | A | | 1/1998 | Schmalstieg et al. |
| 5,849,855 | A | * | 12/1998 | Usui et al. ...................... 528/45 |
| 6,583,216 | B1 | | 6/2003 | Koenig et al. |
| 6,965,007 | B1 | | 11/2005 | Charriere et al. |

(Continued)

FOREIGN PATENT DOCUMENTS

| | | |
|---|---|---|
| EP | 0096210 | 4/1983 |
| EP | 0159117 | 2/1985 |
| EP | 0600314 | 11/1993 |

(Continued)

OTHER PUBLICATIONS

Search report from International Application No. PCT/JP2011/052484, mail date is Mar. 22, 2011.

(Continued)

*Primary Examiner* — Michael L Leonard
(74) *Attorney, Agent, or Firm* — Greenblum & Bernstein, P.L.C.

(57) ABSTRACT

Provided is a block polyisocyanate composition comprising at least one block polyisocyanate represented by formula (I): $R-(A)_x(B)_y$. In formula (I), R is a residue obtained by removing an isocyanate group from a polyisocyanate composed of one or more polyisocyanates selected from aliphatic polyisocyanates, alicyclic polyisocyanates, and aromatic polyisocyanates and is bonded to a substituent containing A and B; A is a group of one or more keto compounds represented by formula (II) or enol isomers thereof; B is one or more constituent units represented by formula (III); and the sum of x and y is from 2.0 to 20, and x is not 0.

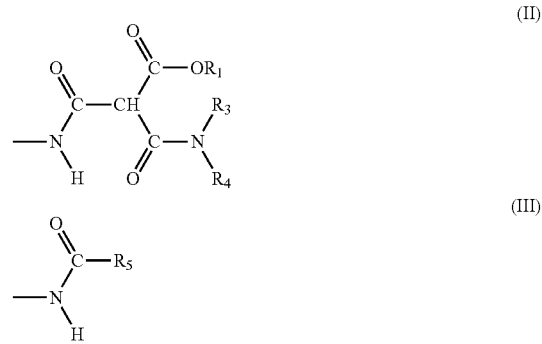

46 Claims, No Drawings

(56) References Cited

U.S. PATENT DOCUMENTS

| 2003/0055158 A1 | 3/2003 | Koenig et al. |
| 2006/0276611 A1 | 12/2006 | Katamura et al. |

FOREIGN PATENT DOCUMENTS

| JP | 57-121065 | 7/1982 |
| JP | 63-265916 | 11/1988 |
| JP | 1-135823 | 5/1989 |
| JP | 6-211771 | 8/1994 |
| JP | 8-225630 | 9/1996 |
| JP | 9-125001 | 5/1997 |
| JP | 9-249731 | 9/1997 |
| JP | 2000-327647 | 11/2000 |
| JP | 2002-521541 | 7/2002 |
| JP | 2004-528415 | 9/2004 |
| JP | 2004-292502 | 10/2004 |
| JP | 2007-023208 | 2/2007 |
| JP | 2007-023209 | 2/2007 |
| JP | 2009-155408 | 7/2009 |
| JP | 2009-155409 | 7/2009 |
| KR | 10-2006-0126402 A | 12/2006 |

OTHER PUBLICATIONS

Korean Office Action issued with respect to corresponding Korean Application No. 10-2012-7020675, mail date is Dec. 26, 2013.
Barry W. Kostyk et al. "Malonic Ester-Blocked Aliphatic Isocyanates", Journal of Polymer Science, vol. 17, pp. 2423-2428 (1979).
Supplementary European search report issue with respect to application No. 11739906.3, mail date is Jun. 26, 2014.
Japanese Office Action in respect to Japanese Application No. 2011-033039, dated Oct. 21, 2014.

* cited by examiner

BLOCK POLYISOCYANATE COMPOSITION AND COATING COMPOSITION CONTAINING SAME

TECHNICAL FIELD

The present invention relates to a blocked polyisocyanate composition, which is capable of forming a crosslinked coating film at a temperature of 100° C. or lower and has excellent moisture stability and a good post-storage curability, and a coating composition comprising the same.

BACKGROUND ART

A blocked polyisocyanate composition, as well as a melamine curing agent, has been widely used as a thermal-crosslinking-type curing agent in baking finish. In recent years, it has been pointed out that formalin is generated when a melamine curing agent is used. From the viewpoint of the global environment, safety, sanitation, and the like, a blocked polyisocyanate composition has attracted attention. Conventionally known blocking agents used for such a blocked polyisocyanate composition include oximes, phenols, alcohols, and lactams. However, since a blocked polyisocyanate composition formed using such a conventional blocking agent generally requires a high baking temperature of 140° C. or higher, energy costs become enormously high. In addition, there has been a limitation that such a blocked polyisocyanate composition that requires high-temperature baking cannot be used in the processing of plastic products having low heat resistance.

In order to overcome such a disadvantage, a pyrazole blocked polyisocyanate composition (Patent Literature 1) and an aliphatic secondary amine blocked polyisocyanate composition (Patent Literature 2) have been proposed as blocked polyisocyanate compositions that form a crosslinked coating film at a relatively low temperature. However, these blocked polyisocyanate compositions require a baking temperature of approximately 120° C., and thus, a further decrease in the baking temperature has been desired.

Blocked polyisocyanate compositions that have been proposed to enable such a further decrease in the baking temperature include: a coblocked polyisocyanate composition formed using (α) a diisopropylamine, (β) an active methylene compound, and (γ) an oxime as blocking agents (Patent Literature 3); a blocked polyisocyanate composition formed using a malonic diester as a blocking agent (Patent Literature 4); a blocked polyisocyanate composition formed using diethyl malonate and ethyl acetoacetate as blocking agents (Patent Literature 5); and a blocked polyisocyanate composition formed using isobutanoyl acetate as a blocking agent (Patent Literature 6).

Moreover, Patent Literature 7 describes a CH-active alkyl ester or an addition product formed by adding such a CH-active alkyl ester to isocyanate as a raw material for a synthetic intermediate of an amino group-containing curing component.

PRIOR ART

Patent Literature

Patent Literature 1: EP159117 B1
Patent Literature 2: EP96210 A1
Patent Literature 3: EP600314 A1
Patent Literature 4: JP 57-121065 A
Patent Literature 5: JP 8-225630 A
Patent Literature 6: JP 2009-155408 A
Patent Literature 7: JP 63-265916 A

SUMMARY OF INVENTION

Problem to be Solved by the Invention

However, in the case of the coblocked polyisocyanate composition described in Patent Literature 3, a decrease in the baking temperature is insufficient. As for the blocked polyisocyanate compositions described in Patent Literatures 4 and 5, there is an event in which, when the blocked polyisocyanate compositions absorb moisture, carbon dioxide may be generated, resulting in the swelling of a can. In addition, the blocked polyisocyanate composition described in Patent Literature 6 may have a decreased level of its gel fraction after it has been stored.

The present invention has been made under the aforementioned circumstances. It is an object of the present invention to provide a blocked polyisocyanate composition, which is capable of forming a crosslinked coating film at a temperature of 100° C. or lower and has excellent moisture stability and a good post-storage curability, and a coating composition comprising the same.

Means for Solving the Problem

As a result of intensive studies, the present inventors have surprisingly found that a composition comprising at least one blocked polyisocyanate having a specific structure has a significantly improved moisture stability and post-storage curability, while retaining a low-temperature curability, thereby completing the present invention.

Specifically, the present invention has the following constitutions.

[1]. A blocked polyisocyanate composition comprising at least one blocked polyisocyanate represented by a formula (I):

[Formula 1]

$$R\text{-}(A)_x(B)_y \qquad (I)$$

wherein R represents a residue of a polyisocyanate made from one or two or more selected from an aliphatic polyisocyanate, an alicyclic polyisocyanate and an aromatic polyisocyanate, from which isocyanate groups thereof are excluded, wherein the R is bound to a substituent(s) including A and a substituent(s) including B; A represents one or two or more kinds of a keto form represented by a formula (II) shown below or an enol isomer(s) thereof; B represents one or two or more kinds of a structural unit represented by a formula (III); and a total of x and y is from 2.0 to 20, and x is not 0,

[Formula 2]

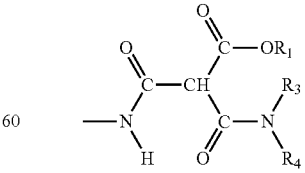

(II)

wherein $R_1$ represents an alkyl group containing 1 to 8 carbon atoms, a phenyl group or a benzyl group; and $R_3$ and $R_4$ may be identical to or different from each other, and they each represents a hydrocarbon group containing 1 to 30 carbon atoms, which optionally contains at least one selected from an ether bond, an ester bond, a hydroxyl group, a carbonyl group, and a thiol group, wherein the $R_3$ and the $R_4$ may be bonded to each other to form a 5- or 6-membered cycloalkyl group, or the $R_3$ and the $R_4$ may form a 3-, 4-, 5-, or 6-membered ring together with a nitrogen atom sandwiched between the $R_3$ and the $R_4$, the ring optionally containing a nitrogen or oxygen atom as an additional crosslinking member,

[Formula 3]

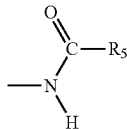

(III)

wherein $R_5$ represents a residue of an active hydrogen-containing compound, from which an active hydrogen is excluded.

[2]. The blocked polyisocyanate composition according to [1], wherein the $R_3$ and the $R_4$ in the formula (II) both represent a branched alkyl group containing 3 to 6 carbon atoms.

[3]. The blocked polyisocyanate composition according to [1], wherein the $(R_3)(R_4)$N— in the formula (II) represents a connected structure represented by a formula (IV):

[Formula 4]

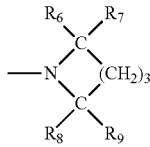

(IV)

wherein $R_6$, $R_7$, $R_8$, and $R_9$ each independently represents hydrogen or a methyl group, and at least one of them is a methyl group.

[4]. The blocked polyisocyanate composition according to any one of [1] to [3], wherein the x and the y in the formula (I) meet the equation: $x/y \geq 1$.

[5]. The blocked polyisocyanate composition according to any one of [1] to [4], wherein at least part of the blocked polyisocyanate of the formula (I) is at least one blocked polyisocyanate represented by a formula (V):

[Formula 5]

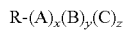

$R\text{-}(A)_x(B)_y(C)_z$ (V)

wherein R represents a residue of a polyisocyanate made from one or two or more selected from an aliphatic polyisocyanate, an alicyclic polyisocyanate and an aromatic polyisocyanate, from which isocyanate groups thereof are excluded;

A represents one or two or more kinds of a keto form represented by the above formula (II) shown below or an enol isomer(s) thereof;

B represents one or two or more kinds of a structural unit represented by the above formula (III);

C represents one or two or more kinds of a structural unit represented by a formula (VI); and x+y+z=2.0 to 20, and any of x and z is not 0,

[Formula 6]

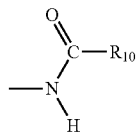

(VI)

wherein $R_{10}$ represents a residue of an active hydrogen-containing hydrophilic compound, from which an active hydrogen is excluded.

[6]. The blocked polyisocyanate composition according to [5], wherein the x, the y, and the z in the formula (V) meet the equation: $49 \geq (x+y)/z \geq 1$ and $x/y \geq 1$.

[7]. The blocked polyisocyanate composition according to any one of [1] to [6], which comprises a basic compound (e) having an acid dissociation constant (PKa) of 7.0 to 8.5 in an amount of 10 mol % or more based on blocked isocyanate groups of the blocked polyisocyanate composition, wherein a number of moles of the blocked isocyanate groups in the formula (I) is indicated as a number of moles on the basis of isocyanate groups derived from the polyisocyanate serving as a precursor, and a number of moles of the blocked isocyanate groups in the formula (V) is indicated as a number of moles on the basis of isocyanate groups used as sources of partial structures A and B in the polyisocyanate serving as a precursor.

[8]. A coating composition comprising the blocked polyisocyanate composition according to any one of [1] to [7] and a polyol.

[9]. The coating composition according to [8], which is an aqueous coating composition.

[10]. A coating film formed from a coating composition according to [8] or [9].

[11]. A method for producing a blocked polyisocyanate composition, which comprises: a first step of adding a malonic diester (b) represented by a formula (VII) to a polyisocyanate (a) having, as a skeleton, one or two or more selected from the group consisting of an aliphatic polyisocyanate, an alicyclic polyisocyanate, and an aromatic polyisocyanate, in an amount of 75 to 150 mol % based on isocyanate groups of the polyisocyanate (a) so that the isocyanate groups of the polyisocyanate (a) are allowed to react with the malonic diester (b); and a second step of allowing a product obtained in the first step to react with one or two or more kinds of an organic amine compound (c) represented by a formula (VIII):

[Formula 7]

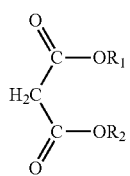

(VII)

wherein $R_1$ and $R_2$ each independently represents an alkyl group containing 1 to 8 carbon atoms, a phenyl group or a benzyl group, and the $R_1$ and the $R_2$ may be identical to or different from each other,

[Formula 8]

(VIII)

wherein R$_3$ and R$_4$ may be identical to or different from each other, and they each represents a hydrocarbon group containing 1 to 30 carbon atoms, which optionally contains at least one selected from an ether bond, an ester bond, a hydroxyl group, a carbonyl group, and a thiol group, wherein the R$_3$ and the R$_4$ may be bonded to each other to form a 5- or 6-membered cycloalkyl group, or the R$_3$ and the R$_4$ may form a 3-, 4-, 5-, or 6-membered ring together with a nitrogen atom sandwiched between the R$_3$ and the R$_4$, the ring optionally containing a nitrogen or oxygen atom as an additional crosslinking member.

[12]. The method for producing a blocked polyisocyanate composition according to [11], wherein the first step is a step of adding the malonic diester (b) and the active hydrogen-containing hydrophilic compound (d) to the polyisocyanate (a), in a total amount of the malonic diester (b) and the active hydrogen-containing hydrophilic compound (d) of 77 to 150 mol % based on the isocyanate groups of the polyisocyanate so that the polyisocyanate (a) is allowed to react with the malonic diester (b) and the active hydrogen-containing hydrophilic compound (d).

[13]. The method for producing a blocked polyisocyanate composition according to [12], wherein the first step is a step of allowing the polyisocyanate (a) to react with the active hydrogen-containing hydrophilic compound (d) and then subjecting a resultant product to a further reaction with the malonic diester (b).

[14]. The method for producing a blocked polyisocyanate composition according to any one of [11] to [13], wherein, in the second step, the one or two or more kinds of the organic amine compound (c) is added to a product obtained in the first step, in an amount of 50 to 500 mol % based on the isocyanate groups of the polyisocyanate (a) so that the organic amine compound (c) is allowed to react with the product obtained in the first step.

[15]. The method for producing a blocked polyisocyanate composition according to any one of [11] to [14], wherein a third step of removing the organic amine compound (c) for purifying the composition is carried out after the first step and the second step.

[16]. The method for producing a blocked polyisocyanate composition according to [15], wherein, in the third step, the organic amine compound (c) and an alcohol compound dissociated as a result of the reaction of an ester group of the product obtained in the first step with the organic amine compound, are removed for purifying the composition.

[17]. The method for producing a blocked polyisocyanate composition according to [15] or [16], wherein a basic compound (e) having an acid dissociation constant (PKa) of 7.0 to 8.5 is added after the first step, the second step, and the third step.

Advantageous Effects of the Invention

According to the present invention, there can be provided: a blocked polyisocyanate composition, which is capable of forming a crosslinked coating film at a temperature of 100° C. or lower and has excellent moisture stability and an excellent post-storage curability; a coating composition comprising the same; and a coating film formed from the coating composition.

PREFERRED EMBODIMENTS FOR CARRYING OUT THE INVENTION

Hereinafter, the present invention will be specifically explained by focusing preferred embodiments of the invention.

A blocked polyisocyanate contained in the blocked polyisocyanate composition of the present invention is represented by the following formula (I):

[Formula 9]

$$R\text{-}(A)_x(B)_y \qquad (I)$$

wherein R represents a residue of a polyisocyanate made from one or two or more selected from an aliphatic polyisocyanate, an alicyclic polyisocyanate and an aromatic polyisocyanate, from which isocyanate groups thereof are excluded.

Examples of the aliphatic polyisocyanate include aliphatic diisocyanate, lysine triisocyanate (hereinafter referred to as LTI), 4-isocyanatomethyl-1,8-octamethylene diisocyanate (trimer triisocyanate; hereinafter referred to as TTI), and bis (2-isocyanatoethyl)-2-isocyanato glutarate (glutamic acid ester triisocyanate; hereinafter referred to as GTI).

The aliphatic diisocyanate used for the aliphatic polyisocyanate preferably contains 4 to 30 carbon atoms. Examples of the aliphatic diisocyanate include tetramethylene diisocyanate, pentamethylene diisocyanate, hexamethylene diisocyanate (hereinafter referred to as HDI), 2,2,4-trimethyl-1,6-diisocyanato hexane, and lysine diisocyanate. HDI is preferred among them in terms of industrial availability. The aliphatic diisocyanate may be used singly or in combination of two or more types.

As the alicyclic polyisocyanate, an alicyclic diisocyanate as described below may be mainly used. The alicyclic diisocyanate preferably contains 8 to 30 carbon atoms. Examples of the alicyclic diisocyanate include isophorone diisocyanate (hereinafter referred to as IPDI), 1,3-bis(isocyanatomethyl)-cyclohexane, 4,4'-dicyclohexylmethane diisocyanate, norbornene diisocyanate, and hydrogenated xylylene diisocyanate. IPDI is preferred among them in terms of weather resistance and industrial availability. The alicyclic diisocyanate may be used singly or in combination of two or more types.

As the aromatic polyisocyanate, an aromatic diisocyanate as described below may be mainly used. Examples of the aromatic diisocyanate include 2,4-tolylene diisocyanate, 2,6-tolylene diisocyanate, 4,4'-diphenylmethane diisocyanate, naphthalene diisocyanate, and xylylene diisocyanate. The aromatic diisocyanate may be used singly or in combinations of two or more types.

Among these polyisocyanates, the aliphatic polyisocyanate and/or the alicyclic polyisocyanate are preferred because they are excellent in terms of weather resistance. Moreover, among the aliphatic polyisocyanates, the aliphatic diisocyanate is most preferred.

The average number of isocyanate groups in the polyisocyanate formed from one or two or more selected from these polyisocyanates is preferably from 2.0 to 20. Moreover, the lower limit of the average number is preferably 2.3, more preferably 2.5, and most preferably 3.0. The upper limit thereof is more preferably 15, and further preferably 10. By setting the average number of isocyanate groups at 2.0 or greater, crosslinkability can be improved and desired physical properties of a coating film can be obtained. On the other hand, by setting the average number of isocyanate groups at 20 or less, excessively high cohesion can be prevented, and thus, a smooth coating film can be obtained.

The average number of isocyanate groups can be obtained by the following equation.

$$\text{Average number of isocyanate groups} = \frac{(\text{Number average molecular weight}) \times (\text{mass \% of isocyanate groups})}{\text{Formula weight of isocyanate (42)} \times 100} \quad [\text{Equation 1}]$$

Examples of the polyisocyanate used as a source of R in the formula (I) include: triisocyanates such as LTI, TTI, and GTI; their derivatives; and diisocyanate oligomers ranging from a dimer to a 20-mer, which are produced by forming a biuret bond, a urea bond, an isocyanulate bond, a uretdione bond, a urethane bond, an allophanate bond, an oxadiazinetrione bond, etc. A polyisocyanate having a biuret bond can be obtained by allowing a diisocyanate to react with what is called a biuret reagent such as water, t-butanol or urea at a molar ratio between the biuret reagent and the isocyanate groups in the diisocyanate that is approximately 1/2 to approximately 1/100, and then removing unreacted diisocyanate for purifying. A polyisocyanate having an isocyanulate bond can be obtained, for example, by performing a cyclization-trimerization reaction using a catalyst or the like, then terminating the reaction when the conversion rate becomes approximately 5 to approximately 80 mass %, and then removing unreacted diisocyanate and purification. In this operation, a monovalent to hexavalent alcohol compound can be used in combination.

In general, as a catalyst used in the aforementioned isocyanulation reaction, a catalyst having basicity is preferred. Examples of such a catalyst include:
(1) hydroxides of tetraalkylammonium, such as tetramethylammonium, tetraethylammonium and trimethylbenzylammonium, and organic weak acid salts such as acetic acid and capric acid;
(2) hydroxides of hydroxyalkylammonium, such as trimethylhydroxypropylammonium, trimethylhydroxyethylammonium, triethylhydroxypropylammonium and triethylhydroxyethylammonium, and organic weak acid salts such as acetic acid and capric acid;
(3) salts of alkylcarboxylic acid with alkali metal such as tin, zinc and lead of;
(4) metal alcoholates such as sodium and potassium;
(5) aminosilyl group-containing compounds such as hexamethyldisilazane;
(6) Mannich bases;
(7) a combined use of tertiary amines with epoxy compounds; and
(8) phosphorus compounds such as tributylphosphine.
These substances may be used in combinations of two or more types.

When the used reaction catalyst is likely to adversely affect the physical properties of a coating material or a coating film, the catalyst is preferably neutralized with an acidic compound or the like. Examples of the acidic compound used herein include: inorganic acids such as hydrochloric acid, phosphorous acid and phosphoric acid; sulfonic acids and derivatives thereof, such as methanesulfonic acid, p-toluenesulfonic acid, methyl p-toluenesulfonate, and ethyl p-toluenesulfonate; and ethyl phosphate, diethyl phosphate, isopropyl phosphate, diisopropyl phosphate, butyl phosphate, dibutyl phosphate, 2-ethylhexyl phosphate, di(2-ethylhexyl) phosphate, isodecyl phosphate, diisodecyl phosphate, oleyl acid phosphate, tetracosyl acid phosphate, ethyl glycol acid phosphate, butyl pyrophosphate, and butyl phosphite. These substances may be used in combination of two or more types.

A polyisocyanate having a urethane bond can be obtained, for example, by allowing a divalent to hexavalent alcohol compound such as trimethylol propane to react with a diisocyanate at a molar ratio between hydroxyl groups in the alcohol compound and isocyanate groups in the diisocyanate that is approximately 1/2 to approximately 1/100, and then removing unreacted diisocyanate for purification.

Derivatives of LTI, TTI and GTI are produced by the same method as in the case of a polyisocyanate derived from a diisocyanate. When these triisocyanates are used, it is not always necessary to remove unreacted triisocyanates for purification.

The substituent A in the formula (I) represents one or two or more kinds of a keto form represented by the following formula (II) or an enol form(s) thereof:

[Formula 10]

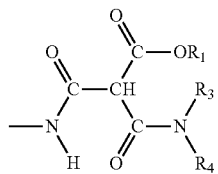

(II)

The Formula (II) shows the keto form, but it also includes an enol form(s) thereof that is(are) a keto-enol tautomer(s). For example, it includes a structure in which a proton of the methine group has become an enol form on the side of the amide group, and a structure in which it has become an enol form on the side of the ester group. In this case, the compositional ratio of the keto form is preferably 50% or more, more preferably 75% or more, and further preferably 90% or more.

$R_1$ in the formula (II) represents an alkyl group containing 1 to 8 carbon atoms, a phenyl group or a benzyl group. If $R_1$ represents an alkyl group containing 9 or more carbon atoms, effective NCO % tends to decrease, and there is also a case in which compatibility with a base resin or the like may decrease when a coating material is prepared. Thus, an alkyl group containing 9 or more carbon atoms is unfavorable. Among others, $R_1$ is preferably an alkyl group containing 1 to 8 carbon atoms, more preferably an alkyl group containing 1 to 4 carbon atoms, further preferably a methyl group or an ethyl group, and most preferably an ethyl group.

$R_3$ and $R_4$ in the formula (II) may be identical to or different from each other, and they each represents a hydrocarbon group containing 1 to 30 carbon atoms, which optionally contains at least one selected from an ether bond, an ester bond, a hydroxyl group, a carbonyl group, and a thiol group, wherein the $R_3$ and the $R_4$ may be bonded to each other to form a 5- or 6-membered cycloalkyl group, or the $R_3$ and the $R_4$ may form a 3-, 4-, 5-, or 6-membered ring together with a nitrogen atom sandwiched between the $R_3$ and the $R_4$, the ring optionally containing a nitrogen or oxygen atom as an additional crosslinking member. Among others, preferably, the $R_3$ and the $R_4$ may be identical to or different from each other, and they each represents a hydrocarbon group containing 1 to 30 carbon atoms, which optionally contains at least one selected from an ether bond, an ester bond, a hydroxyl group, a carbonyl group, and a thiol group, or the $R_3$ and the $R_4$ may form a 3-, 4-, 5-, or 6-membered ring together with a nitrogen atom sandwiched between the $R_3$ and the $R_4$, the ring optionally containing a nitrogen or oxygen atom as an additional crosslinking member.

$R_3$ and $R_4$ in the formula (II) will be below described separately about a structure in which the $R_3$ and the $R_4$ are independently present (hereinafter referred to as an "independent structure") and a structure in which they are connected with each other (hereinafter referred to as a "connected structure").

The independent structure of $R_3$ and $R_4$ will be firstly described.

In the independent structure, $R_3$ and $R_4$ in the formula (II) may be identical to or different from each other, and they each represents a hydrocarbon group containing 1 to 30 carbon atoms, which optionally contains at least one selected from an ether bond, an ester bond, a hydroxyl group, a carbonyl group, and a thiol group. Among others, the $R_3$ and the $R_4$ each preferably represents a hydrocarbon group containing 1 to 8 carbon atoms, more preferably a branched alkyl group containing 3 to 6 carbon atoms, further preferably a branched alkyl group containing 3 or 4 carbon atoms, and most preferably an isopropyl group. Preferred substituents, which are optionally contained in $R_3$ and $R_4$, include an ether bond and an ester bond. When the $R_3$ and the $R_4$ each represents an alkyl group containing 30 or less carbon atoms, a decrease in effective NCO % can be suppressed, and high compatibility with a base resin or the like can be maintained when a coating material is prepared.

The connected structure of $R_3$ and $R_4$ will be then described.

In the connected structure, the $(R_3)$ $(R_4)$ N-portion in the formula (II) represents a residue of a cyclic secondary amine containing a nitrogen atom, from which an active hydrogen is excluded, as described below. Specific examples of the cyclic secondary amine include: azabicyclo compounds such as 2-azabicyclo[2.1.1]hexane and 7-azabicyclo[2.2.1]heptane; saturated cyclic secondary amines such as aziridine, azetidine, pyrrolidine, 2-methylpyrrolidine, 3-pyrrolidiol, 2-pyrrolidone, proline, 4-hydroxyproline, piperidine, 2-methylpiperidine, 3-methylpiperidine, 4-methylpiperidine, 4-benzylpiperidine, 2,4-dimethylpiperidine, 3,5-dimethylpiperidine, 2,6-dimethylpiperidine, 2,2,6,6-tetramethylpiperidine, 3-piperidinemethanol, 2-piperidineethanol, 4-piperidineethanol, 4-piperidinol, 2-piperidone, 4-piperidone, 4-piperidine carboxylic acid methyl ester, 4-piperidine carboxylic acid ethyl ester, 2,2,6,6-tetramethyl-4-piperidone, 4-piperidinopiperidine, decahydroquinoline, piperazine, N-methylpiperazine, N-ethylpiperazine, N-allylpiperazine, N-isobutylpiperazine, N-cyclohexylpiperazine, N-cyclopentylpiperazine, N-phenylpiperazine, 1-(2-pyridyl)piperazine, 1-(4-pyridyl)piperazine, 1-(2-pyrimidyl)piperazine, N-methylhomopiperazine, N-acetylhomopiperazine, N-butyrylhomopiperazine, oxazolidine, morpholine, imidazolidine, 2-imidazolidone, hydantoin, 1-methylhydantoin, 5-methylhydantoin, creatinine, parabanic acid, urazole, thiazolidine and thialdine; aromatic secondary amines such as pyrrole, 2-methylpyrrole, 2,4-dimethylpyrrole, 3,4-dimethylpyrrole, 2-acetylpyrrole, 2-pyrrolecarboxylic acid, indole, 3H-indole, 3-methylindole, 2-phenylindole, 3-hydroxyindole, 3-indoleacetic acid, indoline, 2-indolinone, isatin, α-isatinoxime, isoindole, isoindoline, 1-isoindolinone, carbazole, 1,2,3,4-tetrahydroquinoline, 1,2,3,4-tetrahydroisoquinoline, 9-acridone, pyrazole, 3,5-dimethylpyrazole, imidazole, benzoimidazole, benzoimidazolone, 1H-1,2,3-triazole, 1H-1,2,4-triazole, benzotriazole, tetrazole, purine, xanthin, phenoxazine, isatoic anhydride, benzothiazoline, 2-benzothiazolone, phenothiazine, 5,10-dihydrophenazine, β-carboline and perimidine; and unsaturated bond-containing cyclic secondary amines such as 2-pyrroline, 3-pyrroline, dihydropyridine, 2-pyrazoline, 5-pyrazolone, 2-imidazoline, 4H-1,4-oxazine, 4H-1,4-thiazine and 2H,6H-1,5,2-dithiazine.

Among these cyclic secondary amines, preferred are aziridine, azetidine, pyrrolidine, 2-methylpyrrolidine, 3-pyrrolidiol, 2-pyrrolidone, proline, 4-hydroxyproline, piperidine, 2-methylpiperidine, 3-methylpiperidine, 4-methylpiperidine, 4-benzylpiperidine, 2,4-dimethylpiperidine, 3,5-dimethylpiperidine, 2,6-dimethylpiperidine, 2,2,6,6-tetramethylpiperidine, 3-piperidinemethanol, 2-piperidineethanol, 4-piperidineethanol, 4-piperidinol, 2-piperidone, 4-piperidone, 4-piperidine carboxylic acid methyl ester, 4-piperidine carboxylic acid ethyl ester, 2,2,6,6-tetramethyl-4-piperidone, 4-piperidinopiperidine, decahydroquinoline, piperazine, N-methylpiperazine, N-ethylpiperazine, N-allylpiperazine, N-isobutylpiperazine, N-cyclohexylpiperazine, N-cyclopentylpiperazine, N-phenylpiperazine, 1-(2-pyridyl)piperazine, 1-(4-pyridyl)piperazine, 1-(2-pyrimidyl)piperazine, N-methylhomopiperazine, N-acetylhomopiperazine, N-butyrylhomopiperazine, oxazolidine, morpholine, imidazolidine, 2-imidazolidone, hydantoin, 1-methylhydantoin, 5-methylhydantoin, creatinine, parabanic acid, urazole, thiazolidine, and thialdine.

More preferred examples of the cyclic secondary amine include aziridine, azetidine, pyrrolidine, 2-methylpyrrolidine, piperidine, 2-methylpiperidine, 3-methylpiperidine, 4-methylpiperidine, 4-benzylpiperidine, 2,4-dimethylpiperidine, 3,5-dimethylpiperidine, 2,6-dimethylpiperidine, 2,2,6,6-tetramethylpiperidine, 4-piperidine carboxylic acid methyl ester, 4-piperidine carboxylic acid ethyl ester, 2,2,6,6-tetramethyl-4-piperidone, 4-piperidinopiperidine, piperazine, N-methylpiperazine, N-ethylpiperazine, N-allylpiperazine, N-isobutylpiperazine, N-cyclohexylpiperazine, N-cyclopentylpiperazine, N-phenylpiperazine, 1-(2-pyridyl)piperazine, 1-(4-pyridyl)piperazine, 1-(2-pyrimidyl)piperazine, N-methylhomopiperazine, N-acetylhomopiperazine, and N-butyrylhomopiperazine. Further preferred examples of the cyclic secondary amine include pyrrolidine, 2-methylpyrrolidine, piperidine, 2-methylpiperidine, 3-methylpiperidine, 4-methylpiperidine, 2,4-dimethylpiperidine, 3,5-dimethylpiperidine, 2,6-dimethylpiperidine, and 2,2,6,6-tetramethylpiperidine. Most preferred examples of the cyclic secondary amine include 2-methylpiperidine, 2,6-dimethylpiperidine, and 2,2,6,6-tetramethylpiperidine.

As illustrated above specifically, examples of the cyclic secondary amine compound containing a nitrogen atom include a saturated cyclic secondary amine, an aromatic secondary amine, and an unsaturated bond-containing cyclic secondary amine. Of these, a saturated cyclic secondary amine is preferred. In addition, among examples of such a saturated cyclic secondary amine, a secondary amine containing only one nitrogen atom is preferred. It is more preferably a 5-membered ring or a 6-membered ring, and further preferably a piperidine derivative having a structure represented by the following formula (IV), wherein the substituents at positions 2 and 6 are hydrogen or a methyl group, and at least one of them is a methyl group. Specific compounds corresponding to such a piperidine derivative include the above-described 2-methylpiperidine, 2,6-dimethylpiperidine, and 2,2,6,6-tetramethylpiperidine.

[Formula 11]

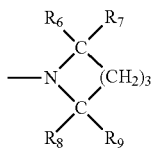

(IV)

In the formula (IV), $R_6$, $R_7$, $R_8$, and $R_9$ each independently represents hydrogen or a methyl group, and at least one of them is a methyl group.

That is to say, with respect to the alkyl substituents on the nitrogen atom in the formula (II), it is preferred that at least one of the carbon atoms adjacent to the nitrogen atom is bonded to two or more carbon atoms.

The blocked polyisocyanate composition of the present invention may partially comprise a blocked polyisocyanate having a keto form(s) of a substituent represented by a formula (IX) shown below, or an enol form(s) thereof, as an alternative of the substituent A in the formula (I).

[Formula 12]

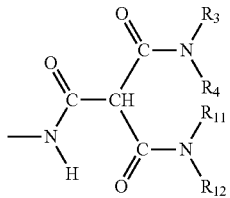

(IX)

wherein $R_3$ and $R_4$ may be identical to or different from each other, and they each represents a hydrocarbon group containing 1 to 30 carbon atoms, which optionally contains at least one selected from an ether bond, an ester bond, a hydroxyl group, a carbonyl group, and a thiol group, wherein the $R_3$ and the $R_4$ may be bonded to each other to form together a 5- or 6-membered cycloalkyl group, or $R_3$ and the $R_4$ may form a 3-, 4-, 5-, or 6-membered ring together with a nitrogen atom sandwiched between the $R_3$ and the $R_4$, the ring optionally containing a nitrogen or oxygen atom as an additional crosslinking member, and wherein $R_{11}$ and $R_{12}$ may be identical to or different from each other, and they each represents a hydrocarbon group containing 1 to 30 carbon atoms, which optionally contains at least one selected from an ether bond, an ester bond, a hydroxyl group, a carbonyl group, and a thiol group, wherein the $R_{11}$ and the $R_{12}$ may be bonded to each other to form together a 5- or 6-membered cycloalkyl group, or the $R_{11}$ and the $R_{12}$ may form a 3-, 4-, 5-, or 6-membered ring together with a nitrogen atom sandwiched between the $R_{11}$ and the $R_{12}$, the ring optionally containing a nitrogen or oxygen atom as an additional crosslinking member.

The content of the blocked polyisocyanate represented by the formula (IX) in the substituent A in the formula (I) is preferably 50 mass % or less, more preferably 30 mass % or less, further preferably 20 mass % or less, and most preferably 10 mass % or less, from the viewpoint of suppression of crystallization while maintaining a low-temperature curability.

The substituent B in the formula (I) is one or two or more kinds of a structural unit represented by the following formula (III):

[Formula 13]

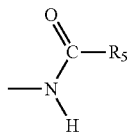

(III)

$R_5$ in the formula (III) represents a residue of an active hydrogen-containing compound, from which an active hydrogen is excluded.

The active hydrogen-containing compound used as a source of $R_5$ in the formula (III) is not particularly limited, as long as it is capable of reacting with isocyanate groups. As the active hydrogen-containing compound used herein, one generally known as a blocking agent is preferred. As such a blocking agent, a compound having one active hydrogen in a molecule thereof is preferred. Examples of such a compound include an alcohol compound, an alkylphenol compound, a phenol compound, an active methylene compound, a mercaptan compound, an acid amide compound, an acid imide compound, an imidazole compound, a urea compound, an oxime compound, an amine compound, an imide compound, and a pyrazole compound.

More specific examples of such a blocking agent will be given below:

(1) aliphatic alcohols such as methanol, ethanol, 2-propanol, n-butanol, sec-butanol, 2-ethyl-1-hexanol, 2-methoxyethanol, 2-ethoxyethanol and 2-butoxyethanol;

(2) alkylphenol compounds: mono- and di-alkylphenols having an alkyl group containing 4 or more carbon atoms as a substituent, which are, for example, monoalkylphenols such as n-propylphenol, i-propylphenol, n-butylphenol, sec-butylphenol, t-butylphenol, n-hexylphenol, 2-ethylhexylphenol, n-octylphenol and n-nonylphenol, and dialkylphenols such as di-n-propylphenol, diisopropylphenol, isopropylcresol, di-n-butylphenol, di-t-butylphenol, di-sec-butylphenol, di-n-octylphenol, di-2-ethylhexylphenol and di-n-nonylphenol;

(3) phenol compounds: phenol, cresol, ethylphenol, styrenated phenol, hydroxybenzoic acid ester, etc.;

(4) active methylene compounds: dimethyl malonate, diethyl malonate, methyl acetoacetate, ethyl acetoacetate, acetylacetone, etc.;

(5) mercaptan compounds: butylmercaptan, dodecylmercaptan, etc.;

(6) acid amide compounds: acetanilide, acetic acid amide, ε-caprolactam, δ-valerolactam, γ-butyrolactam, etc.;

(7) acid imide compounds: imide succinate, imide maleate, etc.;

(8) imidazole compounds: imidazole, 2-methylimidazole, etc.;

(9) urea compounds: urea, thiourea, ethyleneurea, etc.;

(10) oxime compounds: formaldoxime, acetaldoxime, acetoxime, methylethylketoxime, cyclohexanone oxime, etc.;

(11) amine compounds: diphenylamine, aniline, carbazole, di-n-propylamine, diisopropylamine, isopropylethylamine, diisobutylamine, di(2-butylamine), di(t-butyl)amine, dicyclohexylamine, N-t-butylcyclohexylamine, 2-methylpiperidine, 2,6-dimethylpiperidine, 2,2,6,6-tetramethylpiperidine, etc.;

(12) imine compounds: ethyleneimine, polyethyleneimine, etc.;

(13) pyrazole compounds: pyrazole, 3-methylpyrazole, 3,5-dimethylpyrazole, etc.

A preferred example of the active hydrogen-containing compound is at least one selected from alcohol-based, oxime-based, amine-based, acid amide-based, active methylene-based, and pyrazole-based blocking agents. A more preferable example of the active hydrogen-containing compound is at least one selected from oxime-based, active methylene-based and pyrazole-based blocking agents, and a further preferable example thereof is at least one selected from active methylene-based blocking agents. Most preferable example is a malonic diester.

Examples of the active hydrogen in the above-described active hydrogen-containing compound include: hydrogen of a hydroxyl group with respect to the alcohol-based active hydrogen-containing compound; hydrogen of a methylene group sandwiched between two carbonyl groups with respect to the active methylene-based active hydrogen-containing compound; and hydrogen bound to a nitrogen atom with respect to the amine-based active hydrogen-containing compound. Specifically, the residue of the active hydrogen-containing compound, from which an active hydrogen is excluded means a residue obtained by removing the active hydrogen from each of the alcohol-based, the active methylene-based, and the amine-based active hydrogen-containing compounds, and the like.

A total of x and y in the formula (I) of the present invention is a value that corresponds to the average number of isocyanate groups in a polyisocyanate used as a source of R. It is from 2.0 to 20, and x is not 0. In addition, y may be 0, but it is more preferred that y be not 0. The lower limit of the total of x and y is preferably 2.3, more preferably 2.5, and most preferably 3.0. The upper limit of the total of x and y is more preferably 15, and most preferably 10. It is to be noted that the symbols x and y are used herein to mean the statistic average numbers of A and B to R, respectively.

By setting the total of x and y at 2.0 or greater, crosslinkability can be improved and desired physical properties of a coating film can be obtained. On the other hand, by setting the total of x and y at 20 or less, excessively high cohesion can be prevented, and thus, a smooth coating film can be obtained. In addition, in a case in which y is not 0, x and y are preferably x/y≥1, more preferably x/y≥1.5, and further preferably x/y≥2.

The blocked polyisocyanate used in the blocked polyisocyanate composition of the present invention is able to enhance its compatibility in a water-borne coating material by comprising at least one blocked polyisocyanate having a substituent C with a specific structure shown in the following formula (V). The blocked polyisocyanate represented by the formula (V) is encompassed by the definition of the formula (I).

[Formula 14]

A and B in the formula (V) respectively represent one or two or more kinds of a keto form represented by the above formula (II) or an enol isomer(s) thereof, and one or two or more kinds of a structural unit represented by the above formula (III). In addition, C in the formula (V) represents one or two or more kinds of a structural unit represented by the following formula (VI):

[Formula 15]

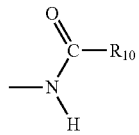

(VI)

$R_{10}$ in the formula (VI) represents a residue of an active hydrogen-containing hydrophilic compound, from which an active hydrogen is excluded.

The active hydrogen-containing hydrophilic compound used as a source of C in the formula (V) is selected from a nonionic hydrophilic compound, an anionic hydrophilic compound, and a cationic hydrophilic compound. In terms of easiness of production, among these compounds, a nonionic hydrophilic compound and an anionic hydrophilic compound are preferred, and a nonionic hydrophilic compound is more preferred. These hydrophilic compounds may be used singly or in combinations of two or more types.

An example of the nonionic hydrophilic compound is a polyethylene glycol compound having at least 3 consecutive ethylene oxide groups. The number average molecular weight of the nonionic hydrophilic compound is preferably from 200 to 2000. The lower limit of the number average molecular weight is more preferably 300, and further preferably 400. The upper limit of the number average molecular weight thereof is more preferably 1500, further preferably 1200, and most preferably 1000. By setting the lower limit of the number average molecular weight of the nonionic hydrophilic compound at 200 or greater, sufficient water dispersibility of the composition can be achieved. On the other hand, by setting the upper limit of the number average molecular weight of the nonionic hydrophilic compound at 2000 or less, a decrease in the physical properties of the coating film, such as water resistance after baking, can be suppressed.

The exemplified polyethylene glycol compound having at least 3 consecutive ethylene oxide groups may comprise, in the ethylene oxide repeating unit thereof, other oxyalkylene groups such as an oxypropylene group or an oxystyrene group. In such a case, the molar ratio of the ethylene oxide groups is preferably 60 mol % or more, more preferably 70 mol % or more, and most preferably 80 mol % or more. When the molar ratio of the ethylene oxide groups is high, compatibility in a water-borne coating material can be efficiently improved. Thus, it is favorable.

Examples of such a polyethylene glycol compound include: monoalkoxy polyethylene glycol; polyethylene glycol or triol; so-called Pluronic-type polypropylene glycol or triol, in which ethylene oxide is added to the terminals of polypropylene glycol by addition polymerization; polyoxypropylene polyoxyethylene copolymer diol or triol; and polyoxypropylene polyoxyethylene blocked polymer diol or triol. Of these, monoalkoxy polyethylene glycol and polyethylene glycol are particularly preferred, and monoalkoxy polyethylene glycol is further particularly preferred. Such monoalkoxy polyethylene glycol is a compound in which an alcohol is added to one of the terminals of polyethylene glycol. As a monoalcohol that can be used for the monoalkoxy polyethylene glycol, a monoalcohol containing 1 to 8 carbon atoms is preferred, a monoalcohol containing 1 to 6 carbon atoms is more preferably, a monoalcohol containing 1 to 4 carbon atoms is further preferred, and methanol or ethanol are most preferred.

Accordingly, among the group of monoalkoxy polyethylene glycol, monomethoxy polyethylene glycol and monoethoxy polyethylene glycol are preferred, and monomethoxy polyethylene glycol is most preferred.

Among these polyethylene glycol compounds to be used as the active hydrogen-containing hydrophilic compound, a polyethylene glycol compound having a number average molecular weight of 200 to 2000, in which a monoalcohol containing 1 to 4 carbon atoms is added to one of the terminals of the compound, is particularly preferred.

Specific examples of such polyethylene glycol include PEG 200, 300, 400, 600, 1000 and 2000, manufactured by NOF Corporation. In addition, specific examples of monomethoxy polyethylene glycol include Uniox M400, 550, 1000 and 2000, manufactured by NOF Corporation, and MPG-081, manufactured by Nippon Nyukazai Co., Ltd.

Examples of the anionic hydrophilic compound include a carboxylic acid group-containing compound and a sulfonic acid group-containing compound. Examples of such a carboxylic acid group-containing compound include monohydroxy carboxylic acid, dihydroxy carboxylic acid, and derivatives thereof. Among these carboxylic acid group-containing compounds, monohydroxy carboxylic acid and dihydroxy carboxylic acid are preferred, and monohydroxy carboxylic acid is more preferred.

Specific examples of such a carboxylic acid-containing compound include hydroxypivalic acid, 2,2-dimethylol propionic acid, 2,2-dimethylol butanoic acid, and their derivatives formed from the aforementioned compounds as initiators, such as polycaprolactone diol and polyether polyol. When the carboxylic acid group-containing compound is used, it is preferred to neutralize the blocked polyisocyanate composition with a neutralizer after the composition was produced. Examples of the neutralizer include alkali metals, alkaline-earth metals, ammonia, and tertiary amines such as trimethylamine, triethylamine and dimethylethanolamine.

Examples of such a sulfonic acid group-containing compound include aminoethyl sulfonic acid, ethylenediamino-propyl-β-ethyl sulfonic acid, 1,3-propylenediamine-β-ethyl sulfonic acid, and N,N-bis(2-hydroxyethyl)-2-aminoethane sulfonic acid. When the sulfonic acid group-containing compound is used, it is preferred as well to neutralize the blocked polyisocyanate composition with a neutralizer after the composition was produced. Examples of the neutralizer include alkali metals, alkaline-earth metals, ammonia, and tertiary amines such as trimethylamine, triethylamine and dimethylethanolamine.

When the carboxylic acid group-containing compound is compared with the sulfonic acid group-containing compound, the carboxylic acid group-containing compound is preferred in terms of easiness of production and compatibility in a water-borne coating material.

An example of the cationic hydrophilic compound is a hydroxyl group-containing amino compound. Specific examples include dimethylethanolamine, diethylethanolamine, and hydroxypyridine. When such a hydroxyl group-containing amino compound is used, it is preferred as well to neutralize the blocked polyisocyanate composition with a neutralizer after the composition was produced. Examples of the neutralizer include organic acids such as acetic acid, propionic acid, butanoic acid, and 2-ethylhexanoic acid.

An example of the active hydrogen in the above-described active hydrogen-containing hydrophilic compound is hydrogen of a hydroxyl group with respect to the nonionic hydrophilic compound. Further examples of the active hydrogen in the above-described active hydrogen-containing hydrophilic compound are hydrogen of a hydroxyl group with respect to hydroxypivalic acid that is the anionic hydrophilic compound; and hydrogen of an amino group with respect to aminoethylsulfonic acid that is also the anionic hydrophilic compound. Still further example of the active hydrogen in the above-described active hydrogen-containing hydrophilic compound is hydrogen of a hydroxyl group with respect to dimethylethanolamine that is the cationic hydrophilic compound. That is to say, the residue of the active hydrogen-containing hydrophilic compound, from which an active hydrogen is excluded, means a residue obtained by removing the active hydrogen from each of the nonionic, anionic and cationic active hydrogen-containing hydrophilic compounds.

A total of x, y and z in the formula (V) is a value that corresponds to the average number of isocyanate groups in a polyisocyanate used as a source of R. It is preferred that the total ranges from 2.0 to 20. The lower limit is more preferably 2.3, further preferably 2.5, and most preferably 3.0. The upper limit is more preferably 15, and further preferably 10. It is to be noted that the symbols x, y and z used herein mean the statistic average numbers of A, B and C to R, respectively.

By setting the total of x, y and z in the formula (V) at 2.0 or greater, a decrease in crosslinkability can be suppressed, and thus, desired physical properties of a coating film can be obtained. On the other hand, by setting the total of x, y and z at 20 or less, excessively high cohesion can be prevented, and thus, a smooth coating film can be obtained. Any of x and z is not 0. In addition, y may be 0, but it is more preferred that y be not 0. Due to the structural characteristics that x is not 0, a low-temperature curability and storage property for a water-borne coating composition prepared from the polyisocyanate composition can be kept excellent. Moreover, due to the structural characteristics that z is not 0, the occurrence of separation, sedimentation and the like can be avoided when the water-borne coating composition is prepared.

With regard to x, y and z in the formula (V), it is preferred that they meet $49 \leq (x+y)/z \leq 1$. The lower limit is more preferably 1.5, and further preferably 2.0. Moreover, with regard to x and y in the formula (V), $x/y \leq 1$ is preferred, $x/y \leq 1.5$ is more preferred, and $x/y \leq 2$ is further preferred.

The blocked polyisocyanate composition of the present invention includes those in which some isocyanate groups remain. The preferred amount of the remaining isocyanate groups is different depending on an intended use. When the blocked polyisocyanate composition is mixed with a polyol or the like and is used as a one-pack coating composition, it is preferred from the viewpoint of good storage stability that the amount of the remaining isocyanate groups is 20 mol % or less based on the amount of isocyanate groups before blocking. The amount of the remaining isocyanate groups is more preferably 10 mol % or less, further preferably 5 mol % or less, and most preferably the absence of such remaining isocyanate groups, based on the amount of isocyanate groups before blocking.

A method for producing the blocked polyisocyanate composition of the present invention will be then described. Generally, the present blocked polyisocyanate composition can be synthesized by two types of production methods (hereinafter referred to as "Production Method 1" and "Production Method 2").

Production Method 1 is a method, which comprises allowing a polyisocyanate (a) used as a source of R in the formula (I) (or the formula (V)) to react with a malonic diester (b) represented by the following formula (VII) to obtain a reaction product, and then allowing an organic amine compound (c) represented by the following formula (VIII) to react with the reaction product:

[Formula 16]

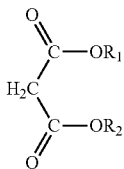

(VII)

wherein $R_1$ and $R_2$ each represents an alkyl group containing 1 to 8 carbon atoms, a phenyl group or a benzyl group, and the $R_1$ and the $R_2$ may be identical to or different from each other.

[Formula 17]

(VIII)

wherein $R_3$ and $R_4$ may be identical to or different from each other, and they each represents a hydrocarbon group containing 1 to 30 carbon atoms, which optionally contains at least one selected from an ether bond, an ester bond, a hydroxyl group, a carbonyl group, and a thiol group, wherein the $R_3$ and the $R_4$ may be bonded to each other to form together a 5- or 6-membered cycloalkyl group, or the $R_3$ and the $R_4$ may form a 3-, 4-, 5-, or 6-membered ring together with a nitrogen atom sandwiched between the $R_3$ and the $R_4$, the ring optionally containing a nitrogen or oxygen atom as an additional crosslinking member.

In addition, when the substituent C shown in the formula (V) is introduced, a step of allowing isocyanate groups in the polyisocyanate (a) to react with the active hydrogen-containing hydrophilic compound (d) is also included in the first step. In such a case, the reaction of the isocyanate groups in the polyisocyanate (a) with the active hydrogen-containing hydrophilic compound (d) and the reaction of the isocyanate groups with the malonic diester (b) may be carried out simultaneously. Otherwise, any one of the aforementioned reactions may be carried out, and the second reaction may be then carried out. Among others, it is preferred that the isocyanate groups be allowed to react with the active hydrogen-containing hydrophilic compound (d), and the obtained reaction product be then allowed to react with the malonic diester (b).

Production Method 2 is a method, which comprises allowing a polyisocyanate used as a source of R in the formula (I) (or the formula (V)) to react with a compound represented by the following formula (X):

[Formula 18]

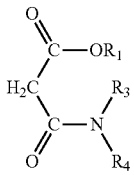

(X)

wherein $R_1$ represents an alkyl group containing 1 to 8 carbon atoms, a phenyl group or a benzyl group; and $R_3$ and $R_4$ may be identical to or different from each other, and they each represents a hydrocarbon group containing 1 to 30 carbon atoms, which optionally contains at least one selected from an ether bond, an ester bond, a hydroxyl group, a carbonyl group, and a thiol group, wherein the $R_3$ and the $R_4$ may be bonded to each other to form together a 5- or 6-membered cycloalkyl group, or the $R_3$ and the $R_4$ may form a 3-, 4-, 5-, or 6-membered ring together with a nitrogen atom sandwiched between the $R_3$ and the $R_4$, the ring optionally containing a nitrogen or oxygen atom as an additional crosslinking member.

In addition, when the substituent C shown in the formula (V) is introduced, a step of allowing isocyanate groups in the polyisocyanate (a) to react with the active hydrogen-containing hydrophilic compound (d) is also included. In such a case, the reaction of the isocyanate groups in the polyisocyanate (a) with the active hydrogen-containing hydrophilic compound (d) and the reaction of the isocyanate groups with the compound represented by the formula (X) may be carried out simultaneously. Otherwise, any one of the aforementioned reactions may be carried out, and the second reaction may be then carried out. Among others, it is preferred that the isocyanate groups be allowed to react with the active hydrogen-containing hydrophilic compound (d), and the obtained reaction product be then allowed to react with the compound represented by the formula (X).

In terms of easiness of production, Production Method 1 is more preferred. Hereinafter, Production Method 1 will be described.

Production Method 1 comprises two steps, namely; a first step of adding a malonic diester (b) represented by the formula (VII) to a polyisocyanate (a) having, as a skeleton, one or two or more selected from the group consisting of an aliphatic polyisocyanate, an alicyclic polyisocyanate, and an aromatic polyisocyanate, in an amount of 75 to 150 mol % based on isocyanate groups of the polyisocyanate (a) so that the isocyanate groups of the polyisocyanate (a) are allowed to react with the malonic diester (b); and a second step of allowing a product obtained in the first step to react with one or two or more kinds of an organic amine compound (c) represented by the formula (VIII).

The first step will be described. The amount of the malonic diester (b) added in the first step of Production Method 1 is 75 to 150 mol % based on the isocyanate groups in the polyisocyanate (a) used as a source of R in the formula (I) (or the formula (V)). The lower limit is more preferably 90 mol %, further preferably 95 mol %, and most preferably 100 mol %. The upper limit is more preferably 130 mol %, further preferably 120 mol %, and most preferably 110 mol %. By setting the amount added at 75 mol % or more, deterioration in a low-temperature curability can be prevented. In addition, by setting the amount added at 150 mol % or less, the adverse effects on the physical properties of a baked coating film, such as water resistance, can be suppressed.

When the substituent C shown in the formula (V) is introduced in the first step of Production Method 1, the total amount of the active hydrogen-containing hydrophilic compound (d) and the malonic diester (b) represented by the formula (VII) is preferably 77 to 150 mol % based on the isocyanate groups in the polyisocyanate (a). The lower limit of the aforementioned percentage is more preferably 90 mol %, further preferably 95 mol %, and most preferably 100 mol %. The upper limit of the aforementioned percentage is more preferably 130 mol %, further preferably 120 mol %, and most preferably 110 mol %. By setting the percentage of the total amount of the aforementioned compounds at 77 mol % or more, deterioration in the low-temperature curability of the composition can be prevented. On the other hand, by setting the percentage of the total amount of the aforementioned compounds at 150 mol % or less, the adverse effects on the physical properties of a baked coating film, such as water resistance, can be suppressed. The active hydrogen-containing hydrophilic compound used in the first step has a function of enhancing compatibility in a water-borne coating material.

The amount of the active hydrogen-containing hydrophilic compound (d) added, as the number of moles of the active hydrogen, is preferably 2 to 50 mol % based on the isocyanate groups in the polyisocyanate (a) serving as a precursor of the blocked polyisocyanate. The upper limit of the aforementioned percentage is more preferably 40 mol %, and further preferably 35 mol %. By setting the aforementioned percentage at 2 mol % or more, sufficient water dispersibility of the composition can be achieved. On the other hand, by setting the aforementioned percentage at 50 mol % or less, a decrease in crosslinking density can be suppressed, and a coating film can have desired physical properties such as water resistance.

The active hydrogen-containing hydrophilic compound (d) in the first step is selected from the above-described nonionic hydrophilic compound, anionic hydrophilic compound and cationic hydrophilic compound. In terms of easiness of production, among these compounds, the nonionic hydrophilic compound and the anionic hydrophilic compound are preferred, and the nonionic hydrophilic compound is more preferred. These hydrophilic compounds may be used singly or in combinations of two or more types.

When the substituent C shown in the formula (V) is introduced in the first step, the amount of the malonic diester (b) added is preferably 75 to 148 mol % based on the isocyanate groups in the polyisocyanate (a) serving as a precursor of the blocked polyisocyanate. The lower limit of the aforementioned percentage is more preferably 88 mol %, and further preferably 98 mol %. By setting the aforementioned percentage at 75 mol % or more, a decrease in crosslinking density can be prevented, and a coating film can have desired physical properties such as water resistance. On the other hand, by setting the aforementioned percentage at 148 mol % or less, the adverse effects on the physical properties of a baked coating film, such as water resistance, can be suppressed.

The malonic diester (b) in the first step of Production Method 1 is represented by the formula (VII). Specifically, $R_1$ and $R_2$ each represents an alkyl group containing 1 to 8 carbon atoms, a phenyl group or a benzyl group. The $R_1$ and the $R_2$ may be identical to or different from each other. In terms of easy availability, $R_1=R_2$ is preferred. When the $R_1$ and the $R_2$ each represents an alkyl group containing 8 or less carbon atoms, a decrease in effective NCO % can be suppressed, and a deterioration of compatibility with the base resin or the like in the coating material can be prevented. Among these groups, an alkyl group containing 1 to 8 carbon atoms is preferred, an alkyl group containing 1 to 4 carbon atoms is more preferred, a methyl group or an ethyl group is further preferred, and an ethyl group is most preferred. Effective NCO mass % is used herein to mean a mass % of potentially existing isocyanate groups based on the total mass of the blocked polyisocyanate composition.

Specific examples of the malonic diester (b) include dimethyl malonate, diethyl malonate, di-n-propyl malonate, diisopropyl malonate, di-n-butyl malonate, diisobutyl malonate, di-t-butyl malonate, methyl t-butyl malonate, di-n-hexyl malonate, di-2-ethylhexyl malonate, diphenyl malonate, and dibenzyl malonate. Among these compounds, dimethyl malonate, diethyl malonate, di-n-propyl malonate, diisopropyl malonate, di-n-butyl malonate, diisobutyl malonate, di-t-butyl malonate, methyl t-butyl malonate, di-n-hexyl malonate, and di-2-ethylhexyl malonate are preferred. Dimethyl malonate, diethyl malonate, di-n-propyl malonate, diisopropyl malonate, di-n-butyl malonate, diisobutyl malonate, di-t-butyl malonate, and methyl t-butyl malonate are more preferred. Dimethyl malonate and diethyl malonate are further preferred. Diethyl malonate is most preferred. The aforementioned malonic diesters may be used singly or in combinations of two or more types.

The reaction in the above-described first step can be carried out regardless of the presence or absence of a solvent. When the solvent is used, one that is inactive to the isocyanate groups and is hardly hydrolyzed is preferably used. Preferable examples of the solvent include: ether solvents such as propylene glycol dimethyl ether, dipropylene glycol dimethyl ether, diethylene glycol dimethyl ether, and diethylene glycol diethyl ether; and ketone solvents such as methyl ethyl ketone and methyl isobutyl ketone.

A reaction catalyst can be used in the reaction of the first step. Specific examples of such a reaction catalyst include: organic metal salts of tin, zinc, lead and the like; metal alcoholates; and tertiary amines.

When the used reaction catalyst is likely to adversely affect the physical properties of a coating material or a coating film, the catalyst is preferably deactivated by an acidic compound or the like. Examples of an acidic compound used herein include: inorganic acids such as hydrochloric acid, phosphorous acid and phosphoric acid; sulfonic acids and derivatives thereof, such as methanesulfonic acid, p-toluenesulfonic acid, methyl p-toluenesulfonate, and ethyl p-toluenesulfonate; and ethyl phosphate, diethyl phosphate, isopropyl phosphate, diisopropyl phosphate, butyl phosphate, dibutyl phosphate, 2-ethylhexyl phosphate, di(2-ethylhexyl) phosphate, isodecyl phosphate, diisodecyl phosphate, oleyl acid phosphate, tetracosyl acid phosphate, ethyl glycol acid phosphate, butyl pyrophosphate, and butyl phosphite. These substances may be used in combinations of two or more types.

The reaction in the first step can be generally carried out at a temperature from −20° C. to 150° C. The reaction temperature is preferably from 0° C. to 100° C., and more preferably from 40° C. to 80° C. By carrying out the reaction at a temperature of 150° C. or lower, side reactions can be suppressed. In addition, by carrying out the reaction at a temperature of −20° C. or higher, a high reaction rate can be maintained.

The compositional ratios of x and y in the formula (I) (or the formula (V)) depend on the mol % of the malonic diester (b) added to the isocyanate groups in the polyisocyanate (a) in the first step, and the reaction rate thereof. However, when a blocked polyisocyanate composition that has been synthesized in another reaction tank is finally blended to produce the blocked polyisocyanate composition of the present invention, the compositional ratios of x and y also depend on the mixing ratio. The compositional ratios of x and y do not only depend on the mol % of the malonic diester (b) added to the isocyanate groups in the polyisocyanate (a) in the first step, but also depends on the reaction rate thereof. Accordingly, it is preferred to check the remaining rate of the isocyanate at the time of completion of the first step, before carrying out the second step. When unreacted isocyanate groups remain, the organic amine (c) in the second step preferentially reacts with the isocyanate groups, rather than with an ester portion of the reaction product from the isocyanate groups and the malonic diester (b) in the first step. Since it is preferred in the present invention that the ratio of x be high and that the amount of the remaining isocyanate groups be small, the second step is more preferably carried out, after the disappearance of isocyanate groups has been confirmed in the first step.

Next, the second step of Production Method 1 will be described. The amount of the organic amine compound (c) represented by the formula (VIII) added in the second step is preferably 50 to 500 mol % based on the isocyanate groups in the polyisocyanate (a) serving as a precursor of a blocked polyisocyanate. The lower limit of this amount added is more preferably 70 mol %, and further preferably 90 mol %. The upper limit of the total amount added is more preferably 400 mol %, further preferably 300 mol %, and most preferably 200 mol %. By setting the total amount added at 50 mol % or more, high moisture stability can be maintained. In addition, by setting the total amount added at 50 mol % or more, the amount of a free amine can be reduced, and coloration of a baked coating film can be prevented.

The organic amine (c) used in the second step is added for the main purpose of being used in a reaction with an ester moiety of the reaction product of the polyisocyanate with the malonic diester (b) after the first step. However, in a case in which isocyanate groups remain after the first step, the organic amine (c) used in the second step may react with the remaining isocyanate groups. In such a case, it becomes the substituent B in the formula (I) (or the formula (V)).

When the malonic diester (b) has been added in an amount of more than 100 mol % based on the isocyanate groups in the polyisocyanate (a) in the first step, the malonic diester (b) remains after completion of the first step. In such a case, the reaction product may partially comprise a malonic acid monoester monoamide or malonic acid diamide that is a reaction product of the malonic diester (b) remaining after the first step with the organic amine compound (c) added in the second step.

The organic amine compound (c) used in the second step is represented by the formula (VIII). Specifically, in the organic amine compound (c) represented by the formula (VIII), $R_3$ and $R_4$ may be identical to or different from each other, and they each represents a hydrocarbon group containing 1 to 30 carbon atoms, which optionally contains at least one selected from an ether bond, an ester bond, a hydroxyl group, a carbonyl group, and a thiol group, wherein the $R_3$ and the $R_4$ may be bonded to each other to form together a 5- or 6-membered cycloalkyl group, or the $R_3$ and the $R_4$ may form a 3-, 4-, 5-, or 6-membered ring optionally additionally containing a nitrogen or oxygen atom as a crosslinking member, together with a nitrogen atom sandwiched between the $R_3$ and the $R_4$. Among others, it is preferred that $R_3$ and $R_4$ be identical to or different from each other, and that they each represents a hydrocarbon group containing 1 to 30 carbon atoms, which optionally contains at least one selected from an ether bond, an ester bond, a hydroxyl group, a carbonyl group, and a thiol group, or the $R_3$ and the $R_4$ may form a 3-, 4-, 5-, or 6-membered ring together with a nitrogen atom sandwiched between the $R_3$ and the $R_4$, the ring optionally containing a nitrogen or oxygen atom as an additional crosslinking member.

The organic amine compound (c) can be broadly classified into a chain secondary amine compound and a nitrogen atom-containing cyclic secondary amine compound. The chain secondary amine compound will be firstly described. The $R_3$ and the $R_4$ in the chain secondary amine compound represented by the formula (VIII) may be identical to or different from each other, and they each represents a hydrocarbon containing 1 to 30 carbon atoms, which optionally contains at least one selected from an ether bond, an ester bond, a hydroxyl group, a carbonyl group, and a thiol group. Among others, the $R_3$ and the $R_4$ each represents preferably a hydrocarbon containing 1 to 8 carbon atoms, more preferably a branched alkyl group containing 3 to 6 carbon atoms, further preferably a branched alkyl group containing 3 or 4 carbon atoms, and most preferably an isopropyl group. Since the $R_3$ and the $R_4$ each represents an alkyl group containing 30 or less carbon atoms, a decrease in effective NCO % can be suppressed, and high compatibility with a base resin or the like in the coating material can be maintained.

Specific examples of the chain secondary amine compound used in the present invention include: chain secondary amines such as dimethylamine, diethylamine, dipropylamine, dibutylamine, dipentylamine, dihexylamine, dioctylamine, dilaurylamine, ditridecylamine, and distearylamine; branched secondary amines such as diisopropylamine, diisobutylamine, di(2-butylamine), di(t-butyl)amine, di(2-ethylhexyl)amine, dicyclohexylamine, and di(2-methylcyclohexyl)amine; unsaturated double bond-containing secondary amines such as diallylamine; asymmetric secondary amines such as methylethylamine, N-methylisopropylamine, methyl t-butylamine, N-methylhexylamine, ethyl t-butylamine, N-ethylhexylamine, N-ethyl-1,2-dimethylpropylamine, N-ethylisoamylamine, N-ethyllaurylamine, N-ethylstearylamine, N-methylcyclohexylamine, N-ethylcyclohexylamine, and N-t-butylcyclohexylamine; secondary amines having an aromatic substituent, such as diphenylamine, dibenzylamine, methylbenzylamine, ethylbenzylamine, t-butylbenzylamine, N-methylaniline, N-ethylaniline, N-cyclohexylaniline, and 3-(benzylamino)propionic acid ethyl ester; and 2-(hydroxymethylamino)ethanol, diethanolamine, N-methylethanolamine, 4-methylaminobutanol, N-ethylethanolamine, N-propylethanolamine, N-isopropylethanolamine and N-butylethanolamine, etc.

Among these examples of the chain secondary amine compound, the followings are preferred: dimethylamine, diethylamine, dipropylamine, dibutylamine, dipentylamine, dihexylamine, dioctylamine, diisopropylamine, diisobutylamine, di(2-butylamine), di(t-butyl)amine, di(2-ethylhexyl) amine, dicyclohexylamine, di(2-methylcyclohexyl)amine, diallylamine, methylethylamine, N-methylisopropylamine, methyl t-butylamine, N-methylhexylamine, ethyl t-butylamine, N-ethylhexylamine, N-ethyl-1,2-dimethylpropylamine, N-ethylisoamylamine, N-methylcyclohexylamine, N-ethylcyclohexylamine, N-t-butylcyclohexylamine, diphenylamine, dibenzylamine, methylbenzylamine, ethylbenzylamine, t-butylbenzylamine, N-methylaniline, N-ethylaniline, 2-(hydroxymethylamino)ethanol, diethanolamine, N-methylethanolamine, 4-methylaminobutanol, N-ethylethanolamine, N-propylethanolamine, N-isopropylethanolamine, and N-butylethanolamine. Diisopropylamine, diisobutylamine, di(2-butylamine), di(t-butyl)amine, dicyclohexylamine, and N-t-butylcyclohexylamine are more preferred. Diisopropylamine, diisobutylamine, di(2-butylamine), and di(t-butyl)amine are further preferred. Diisopropylamine is most preferred.

The nitrogen atom-containing cyclic secondary amine compound will be then described. The $R_3$ and the $R_4$ in the nitrogen atom-containing cyclic secondary amine compound represented by the formula (VIII) may be bonded to each other to form together a 5- or 6-membered cycloalkyl group, or they may form a 3-, 4-, 5-, or 6-membered ring together with a nitrogen atom sandwiched between the $R_3$ and the $R_4$, the ring optionally containing a nitrogen or oxygen atom as an additional crosslinking member.

Specific examples of the nitrogen atom-containing cyclic secondary amine compound include: azabicyclo compounds such as 2-azabicyclo[2.1.1]hexane and 7-azabicyclo[2.2.1] heptane; saturated cyclic secondary amines such as aziridine, azetidine, pyrrolidine, 2-methylpyrrolidine, 3-pyrrolidiol, 2-pyrrolidone, proline, 4-hydroxyproline, piperidine, 2-methylpiperidine, 3-methylpiperidine, 4-methylpiperidine, 4-benzylpiperidine, 2,4-dimethylpiperidine, 3,5-dimethylpiperidine, 2,6-dimethylpiperidine, 2,2,6,6-tetramethylpiperidine, 3-piperidinemethanol, 2-piperidineethanol, 4-piperidineethanol, 4-piperidinol, 2-piperidone, 4-piperidone, 4-piperidinecarboxylic acid methyl ester, 4-piperidinecarboxylic acid ethyl ester, 2,2,6,6-tetramethyl-4-piperidone, 4-piperidinopiperidine, decahydroquinoline, piperazine, N-methylpiperazine, N-ethylpiperazine, N-allylpiperazine, N-isobutylpiperazine, N-cyclohexylpiperazine, N-cyclopentylpiperazine, N-phenylpiperazine, 1-(2-pyridyl)piperazine, 1-(4-pyridyl)piperazine, 1-(2-pyrimidyl)piperazine, N-methylhomopiperazine, N-acetylhomopiperazine, N-butyrylhomopiperazine, oxazolidine, morpholine, imidazolidine, 2-imidazolidone, hydantoin, 1-methylhydantoin, 5-methylhydantoin, creatinine, parabanic acid, urazole, thiazolidine, and thialdine; aromatic secondary amines such as pyrrole, 2-methylpyrrole, 2,4-dimethylpyrrole, 3,4-dimethylpyrrole, 2-acetylpyrrole, 2-pyrrolecarboxylic acid, indole, 3H-indole, 3-methylindole, 2-phenylindole, 3-hydroxyindole, 3-indoleacetic acid, indoline, 2-indolinone, isatin, α-isatinoxime, isoindole, isoindoline, 1-isoindolinone, carbazole, 1,2,3,4-tetrahydroquinoline, 1,2,3,4-tetrahydroisoquinoline, 9-acridone, pyrazole, 3,5-dimethylpyrazole, imidazole, benzoimidazole, benzoimidazolone, 1H-1,2,3-triazole, 1H-1,2,4-triazole, benzotriazole, tetrazole, purine, xanthin, phenoxazine, isatoic anhydride, benzothiazoline, 2-benzothiazolone, phenothiazine, 5,10-dihydrophenazine, β-carboline, and perimidine; and unsaturated bond-containing cyclic secondary amines such as 2-pyrroline, 3-pyrroline, dihydropyridine, 2-pyrazoline, 5-pyrazolone, 2-imidazoline, 4H-1,4-oxazine, 4H-1,4-thiazine, and 2H,6H-1,5,2-dithiazine.

Among these examples of the nitrogen atom-containing cyclic secondary amine compound, the followings are preferred: aziridine, azetidine, pyrrolidine, 2-methylpyrrolidine, 3-pyrrolidiol, 2-pyrrolidone, proline, 4-hydroxyproline, piperidine, 2-methylpiperidine, 3-methylpiperidine, 4-methylpiperidine, 4-benzylpiperidine, 2,4-dimethylpiperidine, 3,5-dimethylpiperidine, 2,6-dimethylpiperidine, 2,2,6,6-tetramethylpiperidine, 3-piperidinemethanol, 2-piperidineethanol, 4-piperidineethanol, 4-piperidinol, 2-piperidone, 4-piperidone, 4-piperidinecarboxylic acid methyl ester, 4-piperidinecarboxylic acid ethyl ester, 2,2,6,6-tetramethyl-4-piperidone, 4-piperidinopiperidine, decahydroquinoline, piperazine, N-methylpiperazine, N-ethylpiperazine, N-allylpiperazine, N-isobutylpiperazine, N-cyclohexylpiperazine, N-cyclopentylpiperazine, N-phenylpiperazine, 1-(2-pyridyl)piperazine, 1-(4-pyridyl)piperazine, 1-(2-pyrimidyl)piperazine, N-methylhomopiperazine, N-acetylhomopiperazine, N-butyrylhomopiperazine, oxazolidine, morpholine, imidazolidine, 2-imidazolidone, hydantoin, 1-methylhydantoin, 5-methylhydantoin, creatinine, parabanic acid, urazole, thiazolidine, and thialdine.

Of these, more preferable examples of the nitrogen atom-containing cyclic secondary amine compound are as follows: aziridine, azetidine, pyrrolidine, 2-methylpyrrolidine, piperidine, 2-methylpiperidine, 3-methylpiperidine, 4-methylpiperidine, 4-benzylpiperidine, 2,4-dimethylpiperidine, 3,5-dimethylpiperidine, 2,6-dimethylpiperidine, 2,2,6,6-tetramethylpiperidine, 4-piperidinecarboxylic acid methyl ester, 4-piperidinecarboxylic acid ethyl ester, 2,2,6,6-tetramethyl-4-piperidone, 4-piperidinopiperidine, piperazine, N-methylpiperazine, N-ethylpiperazine, N-allylpiperazine, N-isobutylpiperazine, N-cyclohexylpiperazine, N-cyclopentylpiperazine, N-phenylpiperazine, 1-(2-pyridyl)piperazine, 1-(4-pyridyl)piperazine, 1-(2-pyrimidyl)piperazine, N-methylhomopiperazine, N-acetylhomopiperazine, and N-butyrylhomopiperazine. Pyrrolidine, 2-methylpyrrolidine, piperidine, 2-methylpiperidine, 3-methylpiperidine, 4-methylpiperidine, 2,4-dimethylpiperidine, 3,5-dimethylpiperidine, 2,6-dimethylpiperidine, and 2,2,6,6-tetramethylpiperidine are further preferred; and 2-methylpiperidine, 2,6-dimethylpiperidine, and 2,2,6,6-tetramethylpiperidine are most preferred.

As specific examples are given above, the nitrogen atom-containing cyclic secondary amine compounds include the saturated cyclic secondary amine, the aromatic secondary amine, and the unsaturated bond-containing cyclic secondary amine. Of these, the saturated cyclic secondary amines are preferred. Moreover, among the saturated cyclic secondary amine, ones containing only one nitrogen atom are preferred. A 5-membered ring one or a 6-membered ring one are more preferred; and further preferred is a piperidine derivative wherein, in the following formula (XI), the substituents at positions 2 and 6 are hydrogen or a methyl group, and at least one of them is a methyl group. Specific examples of such a compound include the above-described 2-methylpiperidine, 2,6-dimethylpiperidine, and 2,2,6,6-tetramethylpiperidine.

[Formula 19]

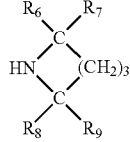

(XI)

In the formula (XI), $R_6$, $R_7$, $R_8$, and $R_9$ each independently represents hydrogen or a methyl group, and at least one of them is a methyl group.

That is to say, with respect to the alkyl substituents on the nitrogen atom in the formula (II), it is preferred that at least one of the carbon atoms adjacent to the nitrogen atom is bonded to two or more carbon atoms.

In the second step of Production Method 1, the above-described chain amine compound or nitrogen atom-containing cyclic amine compound may be used singly, or two or more types may be used in combination. Like the reaction of the first step, the reaction of the second step can also be carried out regardless of the presence or absence of a solvent. When the solvent is used, one that is inactive to the isocyanate groups and is hardly hydrolyzed is preferably used. Preferable examples of the solvent include: ether solvents such as propylene glycol dimethyl ether, dipropylene glycol dimethyl ether, diethylene glycol dimethyl ether, and diethylene glycol diethyl ether; and ketone solvents such as methyl ethyl ketone and methyl isobutyl ketone.

In the reaction of the second step of Production Method 1, the above-described examples of the catalyst for the first step can be used. However, when some types of the solvent are used, a reaction liquid may be colored. Thus, it is desired not to use such a solvent. In addition, when a catalyst is used in the first step, the second step may be carried out preferably after the catalyst has been deactivated with an acidic compound and the like.

Like the first step, the reaction of the second step can be carried out generally at a temperature from −20° C. to 150° C. The temperature is preferably from 0° C. to 100° C., and more preferably from 40° C. to 80° C. By carrying out the reaction at a temperature of 150° C. or lower, side reactions can be suppressed. On the other hand, by carrying out the reaction at a temperature of −20° C. or higher, a high reaction rate can be maintained.

After the reaction of the second step of Production Method 1, a third step of removing the remaining organic amine compound and/or an alcohol compound that is dissociated as a result of the reaction (namely, the reaction of the second step) of the organic amine compound and ester groups in the reaction product of the polyisocyanate with the malonic diester of the first step may be carried out to reduce the amounts of the remaining organic compound and the alcohol compound for purifying the reaction system.

In order to improve moisture stability when the composition is used for a solvent-borne coating material or to improve storage stability (i.e. suppression of the amount of gas generated and suppression of a pH change in the coating material) when the composition is used for a water-borne coating material, the organic amine compound (c) that has remained after the reaction of the above-described second step is preferably removed for purification, for example, by heating at a temperature from 20° C. to 80° C. under a reduced pressure so as to reduce the amount of the remaining organic amine compound (c). The amount of the remaining organic amine compound (c) is preferably 100 mol % or less, more preferably 50 mol % or less, further preferably 30 mol % or less, and most preferably 10 mol % or less, based on blocked isocyanate groups in the blocked polyisocyanate. With regard to the number of moles of the blocked isocyanate groups in this case, the value in the formula (I) is indicated as a number of moles on the basis of isocyanate groups derived from the polyisocyanate serving as a precursor, and the value of the blocked isocyanate groups in the formula (V) is indicated as a number of moles on the basis of isocyanate groups used as sources of partial structures A and B in the polyisocyanate serving as a precursor.

With regard to the alcohol compound that is dissociated as a result of the reaction of the organic amine compound and ester groups in the reaction product of the polyisocyanate with the malonic diester of the first step as well, in order to improve moisture stability when the composition is used for a solvent-borne coating material, or storage stability (i.e. suppression of the amount of gas generated and suppression of a pH change in the coating material) when the composition is used for a water-borne coating material, the amount of the remaining alcohol compound is preferably reduced as in the case of the remaining organic amine compound. The amount of the remaining alcohol compound is preferably 80 mol % or less, more preferably 50 mol % or less, further preferably 30 mol % or less, and most preferably 10 mol % or less, based on blocked isocyanate groups in the blocked polyisocyanate.

The blocked polyisocyanate composition of the present invention may be collectively produced by any one of the above-described methods, or it may also be produced by blending a plurality of the blocked polyisocyanate compositions which have been produced, separately.

It is also possible to use one prepared by blending a blocked polyisocyanate, which is derivable from single or two or more blocking agents selected from known active methylene-based, oxime-based, amine-based, and pyrazole-based blocking agents, with the blocked polyisocyanate composition of the present invention.

However, when a large amount of such a known active methylene-based blocked polyisocyanate is blended with the inventive composition, storage stability of a water-borne coating material may be decreased. On the other hand, when an oxime-based blocked polyisocyanate, amine-based blocked polyisocyanate, or pyrazole-based blocked polyisocyanate is blended in a large amount, a low-temperature curability may be decreased. Thus, the amounts of blocked polyisocyanates other than the blocked polyisocyanate represented by the formula (I) (or the formula (V)) to be blended are preferably 20 mass % or less, more preferably 10 mass % or less, and further preferably 5 mass % or less, based on the total amount of those blocked polyisocyanates.

Examples of the known active methylene-based blocking agent include dimethyl malonate, diethyl malonate, methyl acetoacetate, ethyl acetoacetate, and acetylacetone. Of these, dimethyl malonate and diethyl malonate are preferred because of their excellent low-temperature curability. Examples of the oxime-based blocking agent include formaldoxime, acetaldoxime, acetone oxime, methyl ethyl ketoxime, and cyclohexanone oxime.

Examples of the amine-based blocking agent include diphenylamine, aniline, carbazole, di-n-propylamine, diisopropylamine, and isopropylethylamine. Examples of the pyrazole-based blocking agent include pyrazole, 3-methylpyrazole, and 3,5-dimethylpyrazole.

The number average molecular weight of the blocked polyisocyanate composition of the present invention is preferably from 500 to 5,000. The lower limit thereof is more preferably 700, further preferably 800, and most preferably 1,000. The upper limit thereof is more preferably 4,000, further preferably 3,000, and most preferably 2,000. If the number average molecular weight is 500 or greater, it is made possible to ensure the number of blocked isocyanate functional groups per molecule that is 2.0 or greater. Moreover, if the number average molecular weight is 5,000 or less, too high viscosity can be suppressed.

The viscosity of the blocked polyisocyanate composition of the present invention ranges from 100 to 1,000 mPa·s/25° C. in a state in which the composition is diluted with a solvent or the like and has a resin solid content of 60 mass %. If the viscosity is 100 mPa·s or more, it is made possible to ensure the number of blocked isocyanate functional groups per molecule that is 2.0 or greater. If the viscosity is 1,000 mPa·s or less, it tends to be easy for the composition to be mixed into a coating material.

In order to improve moisture stability when the composition is used for a solvent-borne coating material or to improve storage stability (i.e. suppression of the amount of gas generated and suppression of a pH change in the coating material) when the composition is used for a water-borne coating material, a basic compound (e) having an acid dissociation constant (PKa) of 7.0 to 8.5 is preferably blended in an amount of 10 mol % or more based on blocked isocyanate groups in the blocked polyisocyanate composition. The acid dissociation constant (PKa) used herein is a value measured at 20° C. according to potentiometric titration. It was surprising to find out the results that a blocked polyisocyanate composition, in which the basic compound (e) having an acid dissociation constant (PKa) of 7.0 to 8.5 has been blended in an amount of 10 mol % or more based on blocked isocyanate groups in a specific type of the active methylene blocked polyisocyanate composition, achieves significantly improved storage stability as a water-borne coating composition and also has a high curing-retaining rate after being stored, while keeping a low-temperature curability.

Specific examples of the basic compound (e) having a PKa of 7.0 to 8.5 include: morpholine derivatives such as morpholine (PKa: 8.4), N-allylmorpholine (PKa: 7.1), N-methylmorpholine (PKa: 7.4), and N-ethylmorpholine (PKa: 7.7); triallylamine (PKa: 8.3); triethanolamine (PKa: 7.8); 2-methylimidazole (PKa: 7.8); and phthalamide (PKa: 8.3).

Among these compounds, N-allylmorpholine, N-methylmorpholine, N-ethylmorpholine, triethanolamine and 2-methylimidazole are more preferred, and N-methylmorpholine and N-ethylmorpholine are further preferred.

The upper limit of PKa of the basic compound (e) used in the blocked polyisocyanate composition of the present invention is more preferably 8.3, and further preferably 8.0. If the PKa of the basic compound is 7.0 or greater, storage stability is favorably improved. If it is 8.5 or less, an excessive increase in pH can be favorably prevented when it is mixed into a water-borne coating material.

The amount of the basic compound (e) blended is preferably 10 mol % or more based on blocked isocyanate groups in the blocked polyisocyanate composition. The lower limit of the amount of the basic compound blended is more preferably 20 mol %, and further preferably 30 mol %. The upper limit thereof is preferably 500 mol %, more preferably 400 mol %, and further preferably 300 mol %. With regard to the number of moles of the blocked isocyanate groups in this case, the value in the formula (I) is indicated as a number of moles on the basis of isocyanate groups derived from the polyisocyanate serving as a precursor, and the value in the formula (V) is indicated as a number of moles on the basis of isocyanate groups used as sources of partial structures A and B in the polyisocyanate serving as a precursor.

Moreover, some part of a basic compound (e2) having a PKa of more than 8.5 may be blended into the blocked polyisocyanate composition. The amount of such a basic compound (e2) blended is preferably 100 mol % or less, more preferably 50 mol % or less, further preferably 30 mol % or less, and most preferably 10 mol % or less, based on the blocked isocyanate groups in the blocked polyisocyanate composition.

The basic compound (e) having a PKa of 7.0 to 8.5 present in the blocked polyisocyanate composition of the present invention is preferably added after completion of the first and second steps, and it is more preferably added after completion of the first, second, and third steps.

By using a composition containing the blocked polyisocyanate having the structure represented by the formula (I) (or the formula (V)) as a coating composition in the present invention, it is made possible to significantly improve moisture stability and a post-storage curability, while retaining a low-temperature curability. The aforementioned Patent Literature 3 describes a coblocked polyisocyanate composition formed using ($\alpha$) diisopropylamine, ($\beta$) an active methylene compound, and ($\gamma$) oxime as blocking agents (wherein $\alpha+\beta+\gamma=100$ mol %, based on the molar equivalent of isocyanate groups in the polyisocyanate composition). However, the blocked polyisocyanate contained in the composition of the present invention largely differs from that described in Patent Literature 3 in the presence of the structure A in the formula (I).

The blocked polyisocyanate composition of the present invention is mixed with at least one of polyol, polyamine and alkanolamine so as to form a coating composition. In order to improve storage stability when the blocked polyisocyanate composition according to the present invention is mixed with a polyol, the blocked polyisocyanate composition may comprise a monohydric alcohol compound. Examples of such a monohydric alcohol compound include an aliphatic, alicyclic, and aromatic compound. Of these, an aliphatic compound is preferred. As such an aliphatic monohydric alcohol compound, those containing 1 to 20 carbon atoms are preferred. Examples of the aliphatic monohydric alcohol compound include: saturated alcohols such as methanol, ethanol, n-propanol, isopropanol, n-butanol, 2-butanol, t-butanol, 2-ethyl-1-propanol, n-amyl alcohol, 2-pentanol, 3-pentanol, 2-methyl-1-butanol, 3-methyl-1-butanol, 2-methyl-2-butanol, 3-methyl-2-butanol, and 2,2-dimethyl-1-propanol; and ether alcohols such as 2-methoxyethanol, 2-ethoxyethanol, 2-butoxyethanol, and 3,6-dioxa-1-heptanol. Such an aliphatic monohydric alcohol compound is preferably added to the composition in a molar amount of 0.2 to 10 times higher than that of the blocked isocyanate groups contained in the composition.

When the blocked polyisocyanate composition of the present invention is used in a water-borne coating material, the blocked polyisocyanate composition of the present invention may also comprise a surfactant, a solvent that tends to exhibit miscibility with water, and the like for the purpose of improving compatibility in the water-borne coating material. Specific examples of the surfactant include: anionic surfactants such as aliphatic soap, rosin soap, alkyl sulfonate, dialkyl aryl sulfonate, alkyl sulfosuccinate, polyoxyethylene alkyl sulfate, and polyoxyethylenealkyl aryl sulfate; and nonionic surfactants such as polyoxyethylene alkyl ether, polyoxyethylene alkyl aryl ether, and a polyoxyethylene-oxypropylene blocked copolymer. Examples of the solvent that tends to exhibit miscibility with water include diethylene glycol dimethyl ether, diethylene glycol diethyl ether, propylene glycol monomethyl ether acetate, propylene glycol monomethyl ether, propylene glycol dimethyl ether, dipropylene glycol dimethyl ether, isobutanol, butyl glycol, N-methylpyrrolidone, butyl diglycol, and butyl diglycol acetate.

Among these solvents, the followings are preferred: diethylene glycol dimethyl ether, diethylene glycol diethyl ether, propylene glycol monomethyl ether, propylene glycol dimethyl ether, dipropylene glycol dimethyl ether, isobutanol, butyl glycol, N-methylpyrrolidone, and butyl diglycol. Diethylene glycol dimethyl ether, diethylene glycol diethyl ether, propylene glycol dimethyl ether, and dipropylene glycol dimethyl ether are more preferred. These examples of the solvent may be used singly or in combinations of two or more types. Furthermore, the use of esters such as ethyl acetate, n-butyl acetate and cellosolve acetate is not preferred because the solvent itself may be hydrolyzed during the storage.

Thus prepared blocked polyisocyanate composition, together with at least one of polyol, polyamine and alkanolamine, serves as a major ingredient of the coating composition. Among these substances, the coating composition preferably contains a polyol. Examples of the polyol include polyester polyol, acrylic polyol, polyether polyol, polyolefin polyol, fluoropolyol, polycarbonate polyol, and polyurethane polyol.

Examples of the polyester polyol include: polyester polyols obtained by a condensation reaction of a single dibasic acid or a mixture of two or more types thereof selected from the group consisting of carboxylic acids such as succinic acid, adipic acid, sebacic acid, dimer acid, maleic anhydride, phthalic anhydride, isophthalic acid and terephthalic acid with a single polyhydric alcohol or a mixture of two or more types thereof selected from the group consisting of ethylene glycol, propylene glycol, diethylene glycol, neopentyl glycol, trimethylolpropane and glycerin; polycaprolactones, for example, ones obtained by ring-opening polymerization of $\epsilon$-caprolactone using polyhydric alcohol, etc.

The acrylic polyol can be obtained by copolymerizing a single ethylene unsaturated bond-containing monomer having a hydroxyl group or a mixture of such monomers with a single type of another copolymerizable ethylene unsaturated bond-containing monomer or a mixture of such monomers.

Examples of the ethylene unsaturated bond-containing monomer having a hydroxyl group include hydroxyethyl acrylate, hydroxypropyl acrylate, hydroxybutyl acrylate, hydroxyethyl methacrylate, hydroxypropyl methacrylate, and hydroxybutyl methacrylate. Hydroxyethyl acrylate and hydroxyethyl methacrylate are preferred.

Examples of another ethylene unsaturated bond-containing monomer that is copolymerizable with the above-described monomer include: acrylic acid esters such as methyl acrylate, ethyl acrylate, propyl acrylate, isopropyl acrylate, n-butyl acrylate, isobutyl acrylate, n-hexyl acrylate, cyclohexyl acrylate, 2-ethylhexyl acrylate, lauryl acrylate, benzyl acrylate, and phenyl acrylate; methacrylic acid esters such as methyl methacrylate, ethyl methacrylate, propyl methacrylate, isopropyl methacrylate, n-butyl methacrylate, isobutyl methacrylate, n-hexyl methacrylate, cyclohexyl methacrylate, 2-ethylhexyl methacrylate, lauryl methacrylate, benzyl methacrylate, and phenyl methacrylate; unsaturated carboxylic acids such as acrylic acid, methacrylic acid, maleic acid and itaconic acid; unsaturated amides such as acrylamide, methacrylamide, N,N-methylene bisacrylamide, diacetone acrylamide, diacetone methacrylamide, amide maleate and maleimide; vinyl monomers such as glycidyl methacrylate, styrene, vinyltoluene, vinyl acetate, acrylonitrile and dibutyl fumarate; and vinyl monomers having a hydrolyzable silyl group, such as vinyltrimethoxysilane, vinylmethyldimethoxysilane and γ-(meth) acryloxypropyltrimethoxysilane.

Examples of the polyether polyol include: polyether polyols obtained by adding, singly or in the form of a mixture, an alkylene oxide such as ethylene oxide, propylene oxide, butylene oxide, cyclohexene oxide or styrene oxide, to a single polyvalent hydroxy compound or a mixture of such compounds in the presence of a strongly basic catalyst, for example, a hydroxide such as lithium, sodium or potassium, an alcoholate or an alkyl amine, etc.; polyether polyols obtained by allowing a multifunctional compound such as ethylenediamines to react with an alkylene oxide; and so-called polymer polyols obtained by polymerization of an acrylamide or the like using those polyethers as media.

Examples of the above-described polyvalent hydroxy compound include:

(1) diglycerine, ditrimethylol propane, pentaerythritol, dipentaerythritol, and the like;

(2) sugar alcohol compounds such as erythritol, D-threitol, L-arabinitol, ribitol, xylitol, sorbitol, mannitol, galactitol, and rhamnitol;

(3) monosaccharides such as arabinose, ribose, xylose, glucose, mannose, galactose, fructose, sorbose, rhamnose, fucose, and ribodesose;

(4) disaccharides such as trehalose, sucrose, maltose, cellobiose, gentiobiose, lactose, and melibiose;

(5) trisaccharides such as raffinose, gentianose, and melezitose; and (6) tetrasaccharides such as stachyose.

Examples of the polyolefin polyol include polybutadiene having two or more hydroxyl groups, hydrogenated polybutadiene, polyisoprene, and hydrogenated polyisoprene. The number of hydroxyl groups possessed by a statistical molecule of polyol (hereinafter the average number of hydroxyl groups) is preferably 2 or greater. When the average number of hydroxyl groups in polyol is 2 or greater, a decrease in the crosslinking density of the obtained coating film can be suppressed.

The fluoropolyol is a polyol containing fluorine in the molecule. Examples of the fluoropolyol include copolymers such as fluoroolefins, cyclovinyl ethers, hydroxyalkyl vinyl ethers and monocarboxylic acid vinyl esters, which are disclosed in JP 57-34107 A and JP 61-275311 A.

Examples of the polycarbonate polyol include those obtained by condensation polymerization of a low-molecular-weight carbonate compound, e.g. a dialkyl carbonate such as dimethyl carbonate, an alkylene carbonate such as ethylene carbonate, or a diaryl carbonate such as diphenyl carbonate with a low-molecular-weight polyol as used in the aforementioned polyester polyol.

The polyurethane polyol can be obtained by reacting, for example, a polyol with a polyisocyanate according to an ordinary method. Examples of the polyol having a low molecular weight that does not contain a carboxyl group include ethylene glycol and propylene glycol. Examples of the polyol having a high molecular weight that does not contain a carboxyl group include an acrylic polyol, a polyester polyol, and a polyether polyol.

The hydroxyl value of the aforementioned polyol per unit of resin is preferably from 10 to 300 mg KOH/g resin. By setting the hydroxyl value per unit of resin at 10 mg KOH/g resin or more, a reduction in crosslinking density can be prevented, and thus the desired physical properties of the present invention can be sufficiently achieved. On the other hand, by setting the hydroxyl value per unit of resin at 300 mg KOH/g resin or less, an excessive increase in crosslinking density can be suppressed, and the mechanical properties of a coating film can be kept high.

In addition, the acid value of the aforementioned polyol per unit of resin is preferably from 5 to 150 mg KOH/g resin, more preferably from 8 to 120 mg KOH/g resin, and further preferably from 10 to 100 mg KOH/g resin. By setting the acid value at 5 mg KOH/g resin or more, high water dispersibility can be maintained. On the other hand, by setting the acid value at 150 mg KOH/g resin or less, a decrease in the water resistance of a coating film can be prevented.

Among the above-cited polyols, an acrylic polyol and a polyester polyol are preferred. When such polyol is used, the equivalent ratio between the blocked isocyanate groups and hydroxyl groups in the polyol in the coating composition can be generally set from 10:1 to 1:10.

Examples of the polyamine used herein include those having two or more primary amino groups or secondary amino groups in a molecule thereof. Of these, those having three or more primary amino groups or secondary amino groups in a molecule thereof are preferred.

Specific examples of the polyamine include: diamines such as ethylenediamine, propylenediamine, butylenediamine, triethylenediamine, hexamethylenediamine, 4,4'-diaminodicyclohexylmethane, piperazine, 2-methylpiperazine, and isophoronediamine; chain polyamines having three or more amino groups, such as bishexamethylenetriamine, diethylenetriamine, triethylenetetramine, tetraethylenepentamine, pentamethylenehexamine, and tetrapropylenepentamine; and cyclic polyamines such as 1,4,7,10,13,16-hexaazacyclooctadecane, 1,4,7,10-tetraazacyclododecane, 1,4,8,12-tetraazacyclopentadecane, and 1,4,8,11-tetraazacyclotetradecane.

Moreover, the alkanolamine used herein means a compound having an amino group and a hydroxyl group in a molecule thereof. Examples of the alkanolamine include monoethanolamine, diethanolamine, aminoethylethanolamine, N-(2-hydroxypropyl)ethylenediamine, mono-, di-(n- or iso-)propanolamine, ethylene glycol-bis-propylamine, neopentanolamine, and methylethanolamine.

When the blocked polyisocyanate composition of the present invention and the polyol are used in a water-borne coating composition, examples of the method of mixing the blocked polyisocyanate composition with the polyol include a method where the blocked polyisocyanate composition may be directly mixed with the polyol and dispersed therein, and a method where the blocked polyisocyanate composition may be once incorporated into water and the resultant mixture may be then blended with the polyol.

The pH of the water-borne coating composition, which contains the blocked polyisocyanate composition represented by the formula (V), is preferably from 7.0 to 9.0. The lower limit thereof is more preferably 7.5, and further preferably 8.0. The upper limit thereof is more preferably 8.8, and further preferably 8.6. By setting the pH of the water-borne coating composition at 7.0 to 9.0, the stability of a pigment such as aluminum and an additive such as a rheology-controlling agent blended in the composition can be preferably maintained. Thus, such a pH is preferred.

Furthermore, the above-described basic compound (e) having a PKa of 7.0 to 8.5 may be added to the water-borne coating material when prepared. In such a case, the basic compound (e) may be used in combination of the basic compound (e2) having a PKa of more than 8.5. The compositional ratio of the weakly basic compound (e) to the sum of the weakly basic compound (e) and the basic compound (e2), which can be referred to as the entire basic composition, is preferably 20 mol % or more.

The lower limit of the compositional ratio of the weakly basic compound (e) in the entire basic composition is preferably 30 mol %, more preferably 40 mol %, and further preferably 50 mol %. It is proper to use the weakly basic compound (e) in an amount of 20 mol % or more based on the entire basic composition in the present invention because of the following reason: even if the entire basic composition is present in an amount greater that that required to form salts with all acidic contents contained in individual ingredients in the coating material, excessively increasing a pH of the coating composition as prepared can be advantageously suppressed. Examples of the acidic groups to be neutralized include a carbonyl group and a sulfonyl group. Of these, a carbonyl group is preferred. Moreover, with regard to a carboxyl group of a polyol having the carboxyl group, the amount of the entire basic composition added can be determined on the basis of the amount of the acidic component added during production of the polyol.

The amount of the entire basic composition added is preferably 30 mol % or more based on 100 mol % of all acidic contents existing in individual ingredients in the coating material. The lower limit thereof is more preferably 50 mol %, further preferably 70 mol %, and most preferably 100 mol % or more. On the other hand, the upper limit thereof is preferably 500 mol %, more preferably 400 mol %, and further preferably 300 mol %.

A known melamine resin, epoxy resin, and polyurethane resin may be mixed into the coating composition containing the blocked polyisocyanate composition of the present invention. When the above-described polyol has a carboxyl group, an oxazoline group-containing compound or a carbodiimide group-containing compound may be mixed with the polyol. When the above-described polyol has a carbonyl group, a hydrazide group-containing compound and a semicarbazide group-containing compound may be mixed with the polyol. These compounds may be mixed either singly or in combinations of two or more types thereof.

An example of the melamine resin is a partial or complete methylol melamine resin obtained by the reaction of a melamine with an aldehyde. Examples of the aldehyde include formaldehyde and paraformaldehyde. Moreover, those obtained by partially or completely etherifying the methylol group of the methylol melamine resin with an alcohol can also be used. Examples of the alcohol used in the etherification include methanol, ethanol, n-propanol, isopropanol, n-butanol, isobutanol, 2-ethyl butanol, and 2-ethyl hexanol.

Specific examples of the melamine resin include Cymel 303, Cymel 323, Cymel 325, Cymel 327, Cymel 350, Cymel 370, Cymel 380, Cymel 385, Cymel 212, Cymel 251, Cymel 254, and Mycoat 776 (all of which are trade names), manufactured by Nihon Cytec Industries Inc.

When a melamine curing agent is used in combination, it is effective to use an acidic compound as a curing catalyst. Specific examples of such an acidic compound include a carboxylic acid, a sulfonic acid, an acidic phosphoric acid ester, and a phosphite.

Typical examples of the carboxylic acid include acetic acid, lactic acid, succinic acid, oxalic acid, maleic acid, and decanedicarboxylic acid. Typical examples of the sulfonic acid include paratoluenesulfonic acid, dodecylbenzenesulfonic acid, and dinonylnaphthalene disulfonic acid. Typical examples of the acidic phosphoric acid ester include dimethyl phosphate, diethyl phosphate, dibutyl phosphate, dioctyl phosphate, dilauryl phosphate, monomethyl phosphate, monoethyl phosphate, monobutyl phosphate, and monooctyl phosphate. Typical examples of the phosphite include diethyl phosphite, dibutyl phosphite, dioctyl phosphite, dilauryl phosphite, monoethyl phosphite, monobutyl phosphite, monooctyl phosphite, and monolauryl phosphite.

The epoxy resin is not particularly limited, as long as it is a resin having two or more epoxy groups in a single molecule thereof. Any known epoxy resins can be used. Examples of such an epoxy resin include: a bisphenol-type epoxy resin obtained by adding epichlorohydrin to bisphenol; a novolac-type epoxy resin obtained by adding epichlorohydrin to a phenol novolac resin, and polyethylene glycol diglycidyl ether. The epoxy resin can be dispersed in water and can be then used, as necessary.

The polyurethane resin is not particularly limited, as long as it is one commonly used in a coating material. A polyurethane resin, which is subjected to chain elongation through the reaction of isocyanate groups with a polyol, is preferred. The polyurethane resin includes: one having a carboxyl group, which is obtained using a carboxyl group-containing polyol as part of the polyol; and one having a hydroxyl group at the terminal(s) thereof. The polyurethane resin having a carboxyl group is preferably neutralized using a basic substance. Commercially available products of such a polyurethane resin include Superflex Series 110, 150 and 460S (trade names; manufactured by Dai-Ichi Kogyo Seiyaku Co., Ltd.), and NeoRez R9649 and R966 (trade names; manufactured by Avecia Biotechnology Inc.).

Examples of the oxazoline group-containing compound include a polymeric compound having at least two oxazoline groups on the side chain thereof, and a monomeric compound having at least two oxazoline groups in a single molecule thereof.

The carbodiimide group-containing compound can be obtained, for example, by subjecting isocyanate groups of polyisocyanate compounds to a decarboxylation reaction. Commercially available products of the carbodiimide group-containing compound include Carbodilite V-02, Carbodilite V-02-L2, Carbodilite V-04, Carbodilite E-01, and Carbodilite E-02 (trade names; all of which are manufactured by Nisshinbo Holdings Inc.).

The hydrazide group-containing compound includes a compound having at least 2, and preferably 2 to 10 hydrazide groups represented by —CO—NH—NH$_2$ in a single molecule thereof. Examples of the hydrazide group-containing compound include: saturated dicarboxylic acid dihydrazides having 2 to 18 carbon atoms, such as oxalic acid dihydrazide, malonic acid dihydrazide, glutaric acid dihydrazide, succinic acid dihydrazide, adipic acid dihydrazide, and sebacic acid dihydrazide; monoolefin unsaturated dicarboxylic acid dihydrazides, such as maleic acid dihydrazide, fumaric acid dihydrazide, and itaconic acid dihydrazide; and polyhydrazides obtained by allowing a lower polymer having a carboxylic acid lower alkyl ester group to react with hydrazine or a hydrazine hydrate.

The semicarbazide group-containing compound includes a compound having at least 2, and preferably 2 to 10 semicarbazide groups represented by —NH—CO—NH—NH$_2$ in a single molecule thereof. Examples of the semicarbazide group-containing compound include: bissemicarbazide; and multifunctional semicarbazide obtained by allowing an N,N-substituted hydrazine such as N,N-dimethyl hydrazine or the above-exemplified hydrazine to react with a diisocyanate such as hexamethylene diisocyanate or isophorone diisocyanate or a polyisocyanate compound derived therefrom.

The coating composition of the present invention may, as necessary, comprise: an antioxidant such as a hindered phenol, an ultraviolet absorber such as benzotriazole or benzophenone, a pigment such as titanium oxide, carbon black, indigo, quinacridon or pearl mica, a metal powder pigment such as aluminum, a rheology-controlling agent such as hydroxyethyl cellulose, a urea compound or microgel, and a curing promoter such as a tin compound, a zinc compound or an amine compound.

Thus prepared coating composition is suitably used as a primer, a middle coating, or a top coating on a metal such as a steel plate or a surface-treated steel plate, and a material such as a plastic or an inorganic material, according to roll coating, curtain flow coating, spray coating, electrostatic coating, bell coating, etc.

The coating composition is also suitably used to impart good appearance, weather resistance, acid resistance, anticorrosion, chipping resistance, adhesiveness, etc. to precoated metals including an anticorrosive steel plate, automobiles, and plastics. Furthermore, the coating composition is also useful as urethane materials such as an adhesive, a tackiness agent, an elastomer, a form and a surface treating agent.

After the coating composition of the present invention has been applied according to roll coating, curtain flow coating, spray coating, electrostatic coating, bell coating, etc., it may be subjected to a baking process so as to form a coating film. The coating composition is preferably subjected to a baking step, by which a crosslinked coating film is formed. The crosslinked coating film formed by the curing of the coating composition is characterized in that it has not only a polyisocyanate-derived urethane bond before the blocking reaction, but also has polar groups such as an amide bond or an ester bond derived from the blocked isocyanate groups. For that reason, the crosslinked coating film formed by the coating composition of the present invention can have drug resistance, heat resistance, water resistance, etc., which are properties characteristic of a common urethane crosslinked coating film, and at the same time, the crosslinked coating film enables the formation of a hydrogen bond or the like between the layers when lamination coating or recoating is carried out, and it is thus excellent in terms of adhesiveness between the layers. Because even a coating film in which the crosslinked structure has not yet been completely formed after the baking step has the above-described polar group, it is similarly excellent in terms of adhesiveness when lamination coating or recoating is carried out, as in the case of the crosslinked coating film.

Moreover, when several layers of coating solutions are laminated in a wet-on-wet manner as in coating operations of new automobiles, because organic amine compounds are present in the coating composition of the present invention or in the crosslinked coating film after the curing process, the present coating composition is likely to act as a catalyst in a crosslinking reaction of a lower or upper layer.

EXAMPLES

The present invention will be described more in detail based on the following Examples. Methods for measuring and evaluating various physical properties will be firstly explained.
<Measurement Methods>
(Measurement of Number Average Molecular Weight)
The number average molecular weight of a polyisocyanate means a number average molecular weight in terms of polystyrene measured by gel permeation chromatography (hereinafter referred to as GPC) using the following devices:
Device: Tosoh Corporation, HLC-8120 GPC (trade name)
Column: Tosoh Corporation, TSKgel Super H1000 (trade name)×1 column
TSKgel Super H2000 (trade name)×1 column
TSKgel Super H3000 (trade name)×1 column
Carrier: Tetrahydrofuran
Detection means: differential refractometer
The number average molecular weight of a polyol means a polystyrene equivalent number average molecular weight in terms of polystyrene according to the following GPC measurement:
Device: Tosoh Corporation, HLC-8120 GPC (trade name)
Column: Tosoh Corporation, TSKgel Super HM-H (trade name)×2 columns
Carrier: N,N-dimethylformamide
Detection means: differential refractometer
(Measurement of Viscosity)
Using a type E viscometer (manufactured by Tokimec Inc., VISCONIC ED (trade name)), viscosity was measured at 25° C.
(Calculation of Mass % of Effective NCO Groups (in Case of not Containing Substituent C))
The term "mass % of effective NCO groups" is used herein to mean a value obtained by quantifying the amount of blocked isocyanate groups that can be associated with a crosslinking reaction, which are present in a blocked polyisocyanate composition after a blocking reaction. This value is indicated in the form of the mass % of isocyanate groups, and is calculated by the following formula:

{(Solid content (mass %) of blocked polyisocyanate composition)×(mass of polyisocyanate used in reaction×content (%) of isocyanate groups in polyisocyanate serving as precursor)}/(resin mass of blocked polyisocyanate composition after blocking reaction)

It is to be noted that when the composition is diluted with a solvent or the like, the value obtained in the state of being diluted is recorded.
(Calculation of Mass % of Effective NCO Groups (in Case of Containing Substituent C))
The term "mass % of effective NCO groups" is used herein to mean a value obtained by quantifying the amount of blocked isocyanate groups that can be associated with a crosslinking reaction, which are present in a blocked polyisocyanate composition after a blocking reaction. This value is indicated in the form of the mass % of isocyanate groups derived from A and B in the formula (V), and is calculated by the following formula:

{(Solid content (mass %) of blocked polyisocyanate composition)×(mass of polyisocyanate used in reaction×content (%) of isocyanate groups used as sources of partial structures A and B in polyisocyanate serving as precursor)}/(resin mass of blocked polyisocyanate composition after blocking reaction)

It is to be noted that when the composition is diluted with a solvent or the like, the value obtained in the state of being diluted is recorded.

(Ratio of X to Y in Blocked Polyisocyanate (in Case of not Containing Substituent C))

When the mol % of the remaining isocyanate groups after the reaction of the first step in Production Method 1 is defined as (p), the mol % of the reacted organic amine compound after the reaction of the second step is defined as (q), and the mol % of the organic amine compound added to the isocyanate groups in the second step is defined as (r), the ratio of x to y is calculated by the following formula.

Since the organic amine compound preferentially reacts with the remaining isocyanate groups in the case of p≠0, the amount of the organic amine compound reacting with the remaining isocyanate groups needs to be considered in the total amount of the reacted amine compound. Thus, the ratio of x to y was calculated using the formulae: $x=\{(q\times r)-p\}$ and $x/y=\{(q\times r)-p\}/(100-x)$. The mol % of the remaining isocyanate groups after completion of the first step was quantified by the infrared spectrum measurement of the reaction solution. The reaction rate of the organic amine compound was calculated by quantifying the amount of the organic amine compound that was reduced after completion of the second step by gas chromatography measurement.

Device: GC-14A (trade name), manufactured by Shimadzu Corporation

Column: DB-1 (trade name), manufactured by Shimadzu GLC Ltd.

The blocked polyisocyanate having a substituent represented by the formula (IX) can be generated as a result of the reaction of 2 molar equivalents of the organic amine of the second step with 1 molar equivalent of the malonic diester portion. However, from the experimental results of a model compound (wherein n-hexylisocyanate was used as an isocyanate component), it was found that when a secondary amine is used as an organic amine in the second step, the aforementioned blocked polyisocyanate was generated in an amount of only 1 mass % or less based on the mass of the entire blocked polyisocyanate, probably, due to steric hindrance. Hence, generation of the blocked polyisocyanate having the substituent represented by the formula (IX) was ignored in the calculation of the x/y ratio.

The malonic diester remaining after the first step may react with the organic amine compound added in the second step. However, as a result of the gas chromatography measurement in the aforementioned model experiment example, a total amount of a malonic acid monoester monoamide and a malonic acid diamide was found to be 1 mass % or less. Therefore, a decrease in the organic amine due to this reaction was ignored in the calculation of x/y when a secondary amine was used as an organic amine.

(Ratio of X and Y to Z in Blocked Polyisocyanate (in Case of Containing Substituent C))

Compositional Ratio of Z

The compositional ratio of z can be calculated by determining the mol % of the remaining isocyanate groups by infrared spectrum measurement before and after the reaction of the active hydrogen-containing hydrophilic compound.

Compositional Ratios of X and Y

Since the organic amine compound preferentially reacts with the remaining isocyanate groups in the case of p≠0, the amount of the organic amine compound reacting with the remaining isocyanate groups needs to be considered in the total amount of the reacted amine compound. Thus, the compositional ratios of x and y were calculated using the formulae: $x=\{(q\times r)-p\}$ and $y=(100-(x+z))$ (wherein the definitions of p, q and r are as described above). The mol % of the remaining isocyanate groups after the reaction of the malonic diester was quantified by the infrared spectrum measurement of the reaction solution. The reaction rate of the organic amine compound was calculated by quantifying the amount of the organic amine compound that was reduced after completion of the second step by gas chromatography measurement.

Device: GC-14A (trade name), manufactured by Shimadzu Corporation

Column: DB-1 (trade name), manufactured by Shimadzu GLC Ltd.

It is to be noted that, for the same reasons as those described above, the blocked polyisocyanate having the substituent represented by the formula (IX), malonic acid monoester monoamide, and malonic acid diamide were ignored in the calculation of the ratio of x, y and z.

(Structure Identification of Blocked Polyisocyanate: NMR Measurement)

The structure of a blocked polyisocyanate was identified by performing $^1$H-NMR measurement using the following device. Chemical shift reference: tetramethylsilane was set at 0 ppm.

A methine proton of the keto form of the reaction product of isocyanate groups with a malonic diester as a product from the first step was observed around 4.3 ppm, and a proton of the enol form thereof was observed around 16.5 ppm. In addition, a methine proton of the keto form of the substituent A of the formula (II) as a product of the second step was observed around 4.5 ppm, and a proton of the enol form thereof was observed around 19.2 ppm. Based on the integral values of these peaks, the reaction ratio in the second step and the quantity ratio of the keto form and the enol form were obtained.

Device: ECS-400 (trade name), manufactured by JEOL Ltd.
Solvent: deuterated chloroform
Cumulated number: 128
Sample concentration: 5 mass %
Chemical shift standard: tetramethylsilane was set at 0 ppm.

(Initial Gel Fraction)

The prepared coating solution was applied with an applicator so that the thickness of a film became 40 μm after drying. It was then baked at 90° C. for 30 minutes to obtain a cured coating film. After baking, the cured coating film was left at 20° C. for 1 hour and was then immersed in acetone at 20° C. for 24 hours. Thereafter, the value of the mass of an undissolved portion to the mass before immersion was calculated. A gel fraction of 85% or more was defined as ⊚, 80% or more and less than 85% was defined as ○, 70% or more and less than 80% was defined as ○△, 60% or more and less than 70% was defined as △, 50% or more and less than 60% was defined as X, and less than 50% was defined as XX.

(Post-storage Gel Fraction Retention Rate)

The prepared coating solution was stored at 40° C. for 10 days. Thereafter, it was applied with an applicator so that the thickness of a film became 40 μm after drying. It was then baked at 90° C. for 30 minutes to obtain a cured coating film. After baking, the cured coating film was left at 20° C. for 1 hour and was then immersed in acetone at 20° C. for 24 hours. Thereafter, the value of the mass of an undissolved portion to the mass before immersion (post-storage gel fraction) was calculated. The case of post-storage gel fraction/initial gel fraction=0.90 or more was defined as ⊚, 0.85 or more and less than 0.90 was defined as ◯, 0.80 or more and less than 0.85 was defined as Δ, 0.75 or more and less than 0.80 was defined as X, and less than 0.75 was defined as XX.

(Moisture Stability Test)

30 mmol of a blocked polyisocyanate composition (relative to effective NCO groups) was fractionated, and 5.4 g of water (equivalent to 300 mmol) was then added thereto. Thereafter, diethylene glycol dimethyl ether was added to the mixed solution so that the mass of the entire solution became 200 g. Thus obtained mixture was stirred to obtain a test solution. The solution was transferred into an Erlenmeyer flask (internal volume: 300 cc), and a measuring pipette capped with a silicon rubber stopper was then immobilized in the solution in a state in which the tip of the measuring pipette was immersed in the solution. It was then placed in a water bath at 40° C., and the amount of gas generated was then measured by observing the height of the liquid surface of the measuring pipette. The test solution was stored at 40° C. for 10 days. The case in which the amount of the gas (carbon dioxide) generated during the 10 days was less than 4 cc was defined as ⊚⊚, 4 cc or more and less than 8 cc was defined as ⊚, 8 cc or more and less than 16 cc was defined as Δ, 16 cc or more and less than 24 cc was defined as Δ, 24 cc or more and less than 32 cc was defined as X, and 32 cc or more was defined as XX.

(Appearance of Coating Solution)

The coating solution, to which various components had been added, was left at room temperature for 2 hours, and the state after leaving was then observed by naked eyes. The case in which the solution was emulsified, dispersed or dissolved was defined as ◯, the case in which the dispersed state was partially changed and the whitening of the coating solution progressed was defined as Δ, and the case in which abnormality such as separation or sedimentation occurred was defined as X.

(pH Adjustment during Preparation of Coating Solution)

The case in which the pH of a coating solution (an aqueous coating composition) could be adjusted to 8.5 with dimethylethanolamine during the mixing of the coating solution was defined as ◯, the case in which the pH of the coating solution could not be adjusted to the aforementioned pH value was defined as X, and further, the case in which the pH of the prepared coating solution exceeded 9.0 even when dimethylethanolamine was not added was also defined as X.

(pH Change in Coating Solution before and after Storage)

The pH of an initial coating solution prepared was adjusted to 8.5. The case in which a difference between the initial pH value and the pH of the coating solution after storage at 40° C. for 10 days was 0.2 or less was defined as ⊚⊚, the case in which the aforementioned difference was more than 0.2 and 0.4 or less was defined as ⊚, the case in which the aforementioned difference was more than 0.4 and 0.6 or less was defined as ◯, the case in which the aforementioned difference was more than 0.6 and 0.9 or less was defined as Δ, the case in which the aforementioned difference was more than 0.9 and 1.2 or less was defined as X, and the case in which the aforementioned difference was more than 1.2 was defined as XX.

(Gas Generation Test during Storage)

30 mmol of a blocked polyisocyanate composition (relative to effective NCO groups) was fractionated, and water was then added thereto so that the mass of the entire solution became 200 g thereby obtaining a test solution. The solution was transferred into an Erlenmeyer flask (internal volume: 300 cc), and a measuring pipette capped with a silicon rubber stopper was then immobilized in the solution in a state in which the tip of the measuring pipette was immersed in the solution. It was then placed in a water bath at 40° C., and the amount of gas generated was then measured by observing the height of the liquid surface of the measuring pipette. The test solution was stored at 40° C. for 10 days. The case in which the amount of the gas (carbon dioxide) generated during the 10 days was less than 4 cc was defined as ⊚⊚, the case in which the amount of the generated gas was 4 cc or more and less than 8 cc was defined as ⊚, the case in which the amount of the generated gas was 8 cc or more and less than 16 cc was defined as ◯, the case in which the amount of the generated gas was 16 cc or more and less than 24 cc was defined as Δ, the case in which the amount of the generated gas was 24 cc or more and less than 32 cc was defined as X, and the case in which the amount of the generated gas was 32 cc or more was defined as XX.

Production Example 1

Production of an HDI-based Isocyanulate-type Polyisocyanate

The inside of a four-necked flask equipped with a stirrer, a thermometer, a reflux condenser and a nitrogen-supplying pipe was substituted with nitrogen, and 1000 g of HDI was then charged into the flask. While stirring at 60° C., 0.1 g of trimethylbenzylammonium-hydroxide was added thereto as a catalyst. Four hours later, when the conversion rate of the reaction solution became 38%, 0.2 g of phosphoric acid was added thereto to terminate the reaction. Thereafter, the reaction solution was filtrated and an unreacted HDI monomer was then removed by thin film distillation.

The viscosity of the obtained polyisocyanate at 25° C. was 2,700 mPa·s, the content of isocyanate groups was 22.2 mass %, the number average molecular weight thereof was 650, and the average number of isocyanate groups was 3.4. Thereafter, the presence of the isocyanulate bond was confirmed by NMR measurement.

Production Example 2

Production of an HDI-based Urethane Bond- and Allophanate Bond-containing Isocyanulate-type Polyisocyanate The inside of a four-necked flask equipped with a stirrer, a thermometer, a reflux condenser and a nitrogen-supplying pipe was turned into nitrogen atmosphere. Thereafter, 1000 parts by mass of HDI and 22 parts by mass of trimethylolpropane (molecular weight: 134) that was a trihydric alcohol were charged into the flask. While stirring, the temperature in the reactor was maintained at 90° C. for 1 hour for urethanation. Thereafter, the temperature of the reaction solution was maintained at 60° C., and trimethylbenzylammonium.hydroxide was then added thereto as an isocyanulation catalyst. When the conversion rate became 48%, phosphoric acid was added thereto to terminate the reaction. Thereafter, the reaction solution was filtrated and unreacted HDI was then removed using a thin film distillation apparatus.

The viscosity of the obtained polyisocyanate at 25° C. was 25,000 mPa·s, the content of isocyanate groups was 19.9 mass %, the number average molecular weight thereof was 1080, and the average number of isocyanate groups was 5.1. Thereafter, the presence of the urethane bond, the allophanate bond and the isocyanulate bond was confirmed by NMR measurement.

Production Example 3

Production of an HDI- and IPDI-based, Urethane Bond- and Allophanate Bond-containing Isocyanulate-type Polyisocyanate The inside of a four-necked flask equipped with a stirrer, a thermometer, a reflux condenser and a nitrogen-supplying pipe was turned into nitrogen atmosphere. Thereafter, 700 parts by mass of HDI, 300 parts by mass of IPDI, and 30 parts by mass of polycaprolactone polyester polyol "Placcel 303" (trade name by Daicel Chemical Industries, Ltd.; molecular weight: 300) that was a trihydric alcohol were charged into the flask. While stirring, the temperature in the reactor was maintained at 90° C. for 1 hour for urethanation. Thereafter, the temperature of the reaction solution was maintained at 60° C., and trimethylbenzylammonium.hydroxide was then added thereto as an isocyanulation catalyst. When the conversion rate became 42%, phosphoric acid was added thereto to terminate the reaction. Thereafter, the reaction solution was filtrated and unreacted HDI and IPDI were then removed using a thin film distillation apparatus.

The viscosity of the obtained polyisocyanate at 25° C. was 60,000 mPa·s, and the content of isocyanate groups was 18.9 mass %, and the number average molecular weight thereof was 900, and the average number of isocyanate groups was 4.1. Thereafter, the presence of the urethane bond, the allophanate bond and the isocyanulate bond was confirmed by NMR measurement.

Example 1

Production of a Blocked Polyisocyanate Composition

The inside of a four-necked flask equipped with a stirrer, a thermometer, a reflux condenser, a nitrogen-supplying pipe and a dropping funnel was turned into nitrogen atmosphere. Thereafter, 100 parts by mass of the polyisocyanate obtained in Production Example 1 (wherein the number of moles of isocyanate groups in this polyisocyanate was set at 100), 92.4 parts by mass of n-butyl acetate, and 88.9 parts by mass of diethyl malonate (corresponding to 105 mol % of the isocyanate groups in the polyisocyanate) were charged into the flask and the temperature in the flask was maintained at 60° C. Thereafter, 0.77 parts by mass of 28% sodium methylate was added thereto and the obtained mixture was then maintained for 4 hours. Subsequently, the disappearance of isocyanate groups was confirmed by infrared spectrum measurement, and 0.76 parts by mass of 2-ethylhexyl acid phosphate was then added thereto.

Subsequently, 53.5 parts by mass of diisopropylamine (corresponding to 100 mol % of the isocyanate groups in the polyisocyanate) was added thereto, and the temperature of the reaction solution was then maintained at 70° C. for 5 hours. Thereafter, this reaction solution was analyzed by gas chromatography, and it was confirmed that the reaction rate of diisopropylamine was 70%. Then, 19.6 parts of n-butanol was added thereto so as to obtain a blocked polyisocyanate composition having a solid concentration of 60 mass %. The physical properties of the obtained blocked polyisocyanate composition and the structure of the blocked polyisocyanate in the formula (I) are shown in Table 1.

Separately, the above blocked polyisocyanate composition was transferred into a round bottom flask. Using an evaporator, vacuum distillation was carried out at 60° C. at a degree of reduced pressure of 10 hPa for 60 minutes so as to remove a majority of solvent. Then, NMR measurement was carried out. As a result, x/y was 2.4 in the formula (I). In addition, the compositional ratio of keto form/enol form in the component A was 99/1.

Example 8

Production of a Blocked Polyisocyanate Composition

The inside of a four-necked flask equipped with a stirrer, a thermometer, a reflux condenser, a nitrogen-supplying pipe and a dropping funnel was turned into nitrogen atmosphere. Thereafter, 100 parts by mass of the polyisocyanate obtained in Production Example 2 (wherein the number of moles of isocyanate groups in this polyisocyanate was set at 100), 92.7 parts by mass of propylene glycol monomethyl ether acetate, and 60.7 parts by mass of diethyl malonate (corresponding to 80 mol % of the isocyanate groups in the polyisocyanate composition) were charged into the flask and the temperature in the flask was maintained at 60° C. Thereafter, 0.68 parts by mass of 28% sodium methylate was added thereto, and the obtained mixture was then maintained for 4 hours. Subsequently, it was confirmed by infrared spectrum measurement that the percentage of the remaining isocyanate groups was 22%, and 0.66 parts by mass of 2-ethylhexyl acid phosphate was then added thereto.

Subsequently, 47.9 parts by mass of diisopropylamine (corresponding to 100 mol % of the isocyanate groups in the polyisocyanate) was added thereto, and the temperature of the reaction solution was then maintained at 70° C. for 5 hours. Thereafter, this reaction solution was analyzed by gas chromatography, and it was confirmed that the reaction rate of diisopropylamine was 80%. Then, this reaction solution was transferred into a round bottom flask. Using an evaporator, vacuum distillation was carried out at 60° C. at a degree of reduced pressure of 10 hPa for 30 minutes. The mass was measured after completion of the vacuum distillation. As a result, the solid content in the reaction solution was 73 mass %. Thereafter, 53.9 parts by mass of propylene glycol monomethyl ether acetate was added thereto again so as to obtain a blocked polyisocyanate composition having a solid concentration of 60 mass %. The amounts of the remaining ethanol and diisopropylamine were measured by gas chromatography. As a result, the remaining amounts were 0.3 mass % and 0.4 mass %, respectively. The physical properties of the obtained blocked polyisocyanate composition and the structure of the blocked polyisocyanate in the formula (I) are shown in Table 1.

Examples 2-7 and 9-15, and Comparative Example 1

Production of Blocked Polyisocyanate Compositions

The blocked polyisocyanate compositions were produced in the same manner as in Example 1 with the exception that the components and ratios shown in Table 1 were used. The physical properties of the obtained blocked polyisocyanate compositions and the structures of the blocked polyisocyanates in the formula (I) are shown in Table 1.

Comparative Example 2

Production of a Blocked Polyisocyanate Composition

The inside of a four-necked flask equipped with a stirrer, a thermometer, a reflux condenser, a nitrogen-supplying pipe and a dropping funnel was turned into nitrogen atmosphere. Thereafter, 100 parts by mass of the polyisocyanate obtained in Production Example 1 (wherein the number of moles of isocyanate groups in this polyisocyanate was set at 100) and 97.8 parts by mass of n-butyl acetate were charged into the flask. The temperature in the flask was maintained at 40° C. Thereafter, 52.3 parts by mass of 3,5-dimethylpyrazole (corresponding to 103 mol % of the isocyanate groups in the polyisocyanate composition) was added thereto in five separate injections. After completion of the addition, the obtained mixture was stirred for 1 hour, and infrared spectrum measurement was then carried out by which the disappearance of isocyanate groups was confirmed. It was found that a blocked polyisocyanate composition having a solid concentration of 60 mass % was obtained. The physical properties of the obtained blocked polyisocyanate composition and the structure of the blocked polyisocyanate in the formula (I) are shown in Table 1.

Comparative Example 3

Production of a Blocked Polyisocyanate Composition

The inside of a four-necked flask equipped with a stirrer, a thermometer, a reflux condenser, a nitrogen-supplying pipe and a dropping funnel was turned into nitrogen atmosphere. Thereafter, 100 parts by mass of the polyisocyanate composition obtained in Production Example 2 (wherein the number of moles of isocyanate groups in this polyisocyanate was set at 100) and 92.9 parts by mass of n-butyl acetate were charged into the flask and the temperature in the flask was maintained at 40° C. Thereafter, 42.5 parts by mass of methylethylketoxime (corresponding to 103 mol % of the isocyanate groups in the polyisocyanate) was added thereto dropwise from the dropping funnel. After completion of the dropwise addition, the obtained mixture was stirred for 1 hour, and infrared spectrum measurement was then carried out by which the disappearance of isocyanate groups was confirmed, and a blocked polyisocyanate composition having a solid concentration of 60 mass % was obtained. The physical properties of the obtained blocked polyisocyanate composition and the structure of the blocked polyisocyanate in the formula (I) are shown in Table 1.

Comparative Example 4

Production of a Blocked Polyisocyanate Composition

The inside of a four-necked flask equipped with a stirrer, a thermometer, a reflux condenser, a nitrogen-supplying pipe and a dropping funnel was turned into nitrogen atmosphere. Thereafter, 100 parts by mass of the polyisocyanate obtained in Production Example 1 (wherein the number of moles of isocyanate groups in this polyisocyanate was set at 100), 92.4 parts by mass of n-butyl acetate, and 42.3 parts by mass of diethyl malonate (corresponding to 50 mol % of the isocyanate groups in the polyisocyanate) were charged into the flask and the temperature in the flask was maintained at 60° C. Thereafter, 0.58 parts by mass of 28% sodium methylate was added thereto, and the obtained mixture was then maintained for 4 hours. Infrared spectrum measurement was carried out by which the disappearance of isocyanate groups, which corresponded to the molar amount of the diethyl malonate added, was confirmed. Then, 0.57 parts by mass of 2-ethylhexyl acid phosphate was added thereto.

Subsequently, 26.8 parts by mass of diisopropylamine (corresponding to 50 mol % of the isocyanate groups in the polyisocyanate) was added thereto, and the temperature of the reaction solution was then maintained at 70° C. for 5 hours. Thereafter, the disappearance of isocyanate groups was confirmed by infrared spectrum measurement. It was confirmed by gas chromatography analysis that neither ethanol nor diisopropylamine was present. Thereafter, 20.3 parts of n-butanol was added thereto so as to obtain a blocked polyisocyanate composition having a solid concentration of 60 mass %. The physical properties of the obtained blocked polyisocyanate composition and the structure of the blocked polyisocyanate in the formula (I) are shown in Table 1.

TABLE 1-1

| | | | Example 1 | Example 2 | Example 3 |
|---|---|---|---|---|---|
| Polyisocyanate | | | Production Example 1 | Production Example 2 | Production Example 3 |
| | Average number of isocyanate groups | | 3.4 | 5.1 | 4.1 |
| | Part by mass | | 100 | 100 | 100 |
| Solvent | Type | | n-Butyl acetate | PMA *8 | n-Butyl acetate |
| | Part by mass | | 92.4 | 93.2 | 120.7 |
| Malonic diester (VII) | Type | | DEM *6 | DEM | DIPM *11 |
| Blocking agent structure | R1 | | Ethyl group | Ethyl group | Isopropyl group |
| | R2 | | Ethyl group | Ethyl group | Isopropyl group |
| | Part by mass | | 88.9 | 83.5 | 88.9 |
| | Mol %(b) *1 | | 105 | 110 | 105 |
| 28% Sodium methylate | Part by mass | | 0.77 | 0.74 | 0.77 |
| JP508T *2 | Part by mass | | 0.76 | 0.72 | 0.76 |
| Chain amine compound (c1) | Type | | DIPA *7 | DNBA *9 | ECHA *12 |
| Amine structure | R3 | | Isopropyl group | n-Butyl group | Ethyl group |
| | R4 | | Isopropyl group | n-Butyl group | Cyclohexyl group |
| | Part by mass | | 53.5 | 30.6 | 51.5 |
| | Mol % | | 100 | 50 | 90 |

TABLE 1-1-continued

|  |  | Example 1 | Example 2 | Example 3 |
|---|---|---|---|---|
| Nitrogen atom-containing cyclic amine compound (c2) | Type | None | 2,6-Dimethyl-piperidine | None |
|  | Part by mass | — | 32.2 | — |
|  | Mol % | 0 | 60 | 0 |
| (c1) + (c2)Mol % (c) |  | 100 | 110 | 90 |
| (c)/(b) |  | 0.95 | 1.0 | 0.9 |
| Amine reaction rate (%) *3 |  | 70 | 60 | 70 |
| Monohydric alcohol | Type | n-Butanol | n-Butanol | None |
|  | Part by mass | 19.6 | 16.9 | 0 |
| Solid content | Mass % | 60 | 60 | 60 |
| Mass % of effective NCO groups *4 |  | 6.2 | 5.6 | 5.2 |
| Structure A | R1 | Ethyl group | Ethyl group *10 | Isopropyl group |
|  | R3 | Isopropyl group |  | Ethyl group |
|  | R4 | Isopropyl group |  | Cyclohexyl group |
|  | x | 2.4 | 3.4 | 2.6 |
| B | R5 *5 | <DEM> | <DEM> | <DIPM> |
|  | y | 1.0 | 1.7 | 1.5 |
|  | x/y Ratio | 2.4 | 2.0 | 1.7 |

TABLE 1-2

|  |  | Example 4 | Example 5 | Example 6 |
|---|---|---|---|---|
| Polyisocyanate |  | N75BA *13 | ME20-100 *14 | T1890E *16 |
| Average number of isocyanate groups |  | 3.4 | 8.0 | 3.2 |
|  | Part by mass | 100 | 100 | 100 |
| Solvent | Type | n-Butyl acetate | n-Butyl acetate | n-Butyl acetate |
|  | Part by mass | 44.5 | 73.6 | 19.9 |
| Malonic diester (VII) | Type | DEM | DMM *15 | DEM |
| Blocking agent structure | R1 | Ethyl group | Methyl group | Ethyl group |
|  | R2 | Ethyl group | Methyl group | Ethyl group |
|  | Part by mass | 66.1 | 29.4 | 54.5 |
|  | Mol %(b) | 105 | 105 | 120 |
| 28% Sodium methylate | Part by mass | 0.58 | 0.54 | 0.48 |
| JP508T | Part by mass | 0.56 | 0.52 | 0.47 |
| Chain amine compound (c1) | Type | DIPA | DIPA | DIPA |
| Amine structure | R3 | Isopropyl group | Isopropyl group | Isopropyl group |
|  | R4 | Isopropyl group | Isopropyl group | Isopropyl group |
|  | Part by mass | 39.8 | 20.5 | 43.0 |
|  | Mol % | 100 | 100 | 150 |
| Nitrogen atom-containing cyclic amine compound (c2) | Type | None | None | None |
|  | Part by mass | — | — | — |
|  | Mol % | 0 | 0 | 0 |
| (c1) + (c2)Mol % (c) |  | 100 | 100 | 150 |
| (c)/(b) |  | 0.95 | 0.95 | 1.25 |
| Amine reaction rate (%) |  | 70 | 70 | 50 |
| Monohydric alcohol | Type | Isobutanol | 2-Butanol | None |
|  | Part by mass | 14.5 | 7.5 | 0 |
| Solid content | Mass % | 60 | 60 | 60 |
| Mass % of effective NCO groups |  | 6.2 | 3.7 | 5.5 |
| Structure A | R1 | Ethyl group | Methyl group | Ethyl group |
|  | R3 | Isopropyl group | Isopropyl group | Isopropyl group |
|  | R4 | Isopropyl group | Isopropyl group | Isopropyl group |
|  | x | 2.4 | 5.6 | 2.4 |
| B | R5 | <DEM> | <DMM> | <DEM> |
|  | y | 1.0 | 2.4 | 0.8 |
|  | x/y Ratio | 2.4 | 2.3 | 3.0 |

TABLE 1-3

|  |  | Example 7 | Example 8 | Example 9 |
|---|---|---|---|---|
| Polyisocyanate |  | Coronate L *17 | Production Example 2 | Production Example 2 |
| Average number of isocyanate groups |  | 3.5 | 5.1 | 5.1 |
|  | Part by mass | 100 | 100 | 100 |
| Solvent | Type | n-Butyl acetate | PMA | n-Butyl acetate |
|  | Part by mass | 40.5 | 92.7 | 106.0 |
| Malonic diester (VII) | Type | DEM | DEM | DEM |
| Blocking agent structure | R1 | Ethyl group | Ethyl group | Ethyl group |
|  | R2 | Ethyl group | Ethyl group | Ethyl group |
|  | Part by mass | 52.9 | 60.7 | 75.9 |
|  | Mol %(b) | 105 | 80 | 100 |
| 28% Sodium methylate | Part by mass | 0.55 | 0.68 | 0.74 |
| JP508T | Part by mass | 0.53 | 0.66 | 0.72 |
| Chain amine compound (c1) | Type | DEPA | DIPA | DIPA |
| Amine structure | R3 | Isopropyl group | Isopropyl group | Isopropyl group |
|  | R4 | Isopropyl group | Isopropyl group | Isopropyl group |
|  | Part by mass | 31.8 | 47.9 | 38.4 |
|  | Mol % | 100 | 100 | 80 |
| Nitrogen atom-containing cyclic amine compound (c2) | Type | None | None | 2,2,6,6-Tetramethyl-piperidine |
|  | Part by mass | — | — | 26.8 |
|  | Mol % | 0 | 0 | 40 |
| (c1) + (c2)Mol % (c) |  | 100 | 100 | 120 |
| (c)/(b) |  | 0.95 | 1.25 | 1.2 |
| Amine reaction rate (%) |  | 70 | 80 | 60 |
| Monohydric alcohol | Type | n-Butanol | None | n-Butanol |
|  | Part by mass | 11.6 | 0 | 16.9 |
| Solid content | Mass % | 60 | 60 | 60 |
| Mass % of effective NCO groups |  | 5.6 | 6.4 | 5.4 |
| Structure A | R1 | Ethyl group | Ethyl group | Ethyl group |
|  | R3 | Isopropyl group | Isopropyl group | *19 |
|  | R4 | Isopropyl group | Isopropyl group |  |
|  | x | 2.4 | 3.1 | 3.7 |
| B | R5 | <DEM> | <DEM> <DIPA> *18 | <DEM> |
|  | y | 1.1 | 2.0 | 1.4 |
|  | x/y Ratio | 2.2 | 1.6 | 2.6 |

TABLE 1-4

|  |  | Example 10 | Example 11 |
|---|---|---|---|
| Polyisocyanate |  | Production Example 2 | Production Example 2/ T1890E = 50/50 |
| Average number of isocyanate groups |  | 5.1 | 3.9 |
|  | Part by mass | 100 | 100 |
| Solvent | Type | PMA | n-Butyl acetate |
|  | Part by mass | 94.6 | 7.3 |
| Malonic diester (VII) | Type | DEM | DEM |
| Blocking agent structure | R1 | Ethyl group | Ethyl group |
|  | R2 | Ethyl group | Ethyl group |
|  | Part by mass | 79.7 | 72.8 |
|  | Mol %(b) | 105 | 120 |
| 28% Sodium methylate | Part by mass | 0.74 | 0.61 |
| JP508T | Part by mass | 0.72 | 0.60 |
| Chain amine compound (c1) | Type | DIPA | DIPA |
| Amine structure | R3 | Isopropyl group | Isopropyl group |
|  | R4 | Isopropyl group | Isopropyl group |
|  | Part by mass | 47.9 | 57.5 |
|  | Mol % | 100 | 150 |
| Nitrogen atom-containing cyclic amine compound (c2) | Type | None | 2-Methyl-piperidine |
|  | Part by mass | — | 37.6 |
|  | Mol % | 0 | 100 |
| (c1) + (c2)Mol % (c) |  | 100 | 250 |
| (c)/(b) |  | 0.95 | 2.1 |
| Amine reaction rate (%) |  | 70 | 36 |
| Monohydric alcohol | Type | None | None |
|  | Part by mass | 0 | 0 |
| Solid content | Mass % | 60 | 60 |
| Mass % of effective NCO groups |  | 6.1 | 5.8 |
| Structure A | R1 | Ethyl group | Ethyl group |
|  | R3 | Isopropyl group | Isopropyl group |
|  | R4 | Isopropyl group | Isopropyl group |
|  | x | 3.6 | 3.5 |
| B | R5 | <DEM> | <DEM> |
|  | y | 1.5 | 0.4 |
|  | x/y Ratio | 2.4 | 8.8 |

TABLE 1-5

|  |  | Example 12 | Example 13 | Example 14 |
|---|---|---|---|---|
| Polyisocyanate |  | Production Example 2 | Production Example 2 | Production Example 2 |
|  | Average number of isocyanate groups | 5.1 | 5.1 | 5.1 |
|  | Part by mass | 100 | 100 | 100 |
| Solvent | Type | PMA | PMA | PMA |
|  | Part by mass | 120.0 | 96.8 | 111.4 |
| Malonic diester (VII) | Type | DPhM *20 | DEM | DEM |
| Blocking agent structure | R1 | Phenyl group | Ethyl group | Ethyl group |
|  | R2 | Phenyl group | Ethyl group | Ethyl group |
|  | Part by mass | 127.4 | 79.7 | 79.7 |
|  | Mol %(b) | 105 | 105 | 105 |
| 28% Sodium methylate | Part by mass | 0.94 | 0.74 | 0.74 |
| JP508T | Part by mass | 0.92 | 0.72 | 0.72 |
| Chain amine compound (c1) | Type | DIPA | DNBA | None |
| Amine structure | R3 | Isopropyl group | n-Butyl group |  |
|  | R4 | Isopropyl group | n-Butyl group |  |
|  | Part by mass | 47.9 | 61.2 | — |
|  | Mol % | 100 | 100 | 0 |
| Nitrogen atom-containing cyclic amine compound (c2) | Type | None | None | 2,6-Dimethyl-piperidine |
|  | Part by mass | — | — | 53.6 |
|  | Mol % | 0 | 0 | 100 |
| (c1) + (c2)Mol % (c) |  | 100 | 100 | 100 |
| (c)/(b) |  | 0.95 | 0.95 | 0.95 |
| Amine reaction rate (%) |  | 65 | 70 | 70 |
| Monohydric alcohol | Type | None | None | None |
|  | Part by mass | 0 | 0 | 0 |
| Solid content | Mass % | 60 | 60 | 60 |
| Mass % of effective NCO groups |  | 5.0 | 5.9 | 5.7 |
| Structure | A R1 | Phenyl group | Ethyl group | Ethyl group |
|  | R3 | Isopropyl group | Isopropyl group | *21 |
|  | R4 | Isopropyl group | Isopropyl group |  |
|  | x | 3.3 | 3.6 | 3.6 |
|  | B R5 | <DPhM> | <DEM> | <DEM> |
|  | y | 1.8 | 1.5 | 1.5 |
|  | x/y Ratio | 1.8 | 2.4 | 2.4 |

TABLE 1-6

|  |  | Example 15 | Comparative Example 1 | Comparative Example 2 |
|---|---|---|---|---|
| Polyisocyanate |  | Production Example 2 | Production Example 1 | Production Example 1 |
|  | Average number of isocyanate groups | 5.1 | 3.4 | 3.4 |
|  | Part by mass | 100 | 100 | 100 |
| Solvent | Type | PMA | n-Butyl acetate | n-Butyl acetate |
|  | Part by mass | 94.6 | 87.2 | 97.8 |
| Malonic diester (VII) | Type | DEM | DIPM | 3,5-Dimethyl-pyrazole |
| Blocking agent structure | R1 | Ethyl group | Isopropyl group | — |
|  | R2 | Ethyl group | Isopropyl group | — |
|  | Part by mass | 49.3 | 104.5 | 52.3 |
|  | Mol %(b) | 65 | 105 | 103 |
| 28% Sodium methylate | Part by mass | 0.61 | 0.84 | — |
| JP508T | Part by mass | 0.59 | 0.82 | — |
| Chain amine compound (c1) | Type | DIPA | None | None |
| Amine structure | R3 | Isopropyl group | — | — |
|  | R4 | Isopropyl group | — | — |
|  | Part by mass | 47.9 | — | — |
|  | Mol % | 100 | 0 | 0 |
| Nitrogen atom-containing | Type | None | None | None |

TABLE 1-6-continued

|  |  | Example 15 | Comparative Example 1 | Comparative Example 2 |
|---|---|---|---|---|
| cyclic amine compound (c2) | Part by mass | — | — | — |
|  | Mol % | 0 | 0 | 0 |
| (c1) + (c2)Mol %(c) |  | 100 | 0 | 0 |
| (c)/(b) |  | 1.5 | 0 | — |
| Amine reaction rate (%) |  | 80 | 0 | 0 |
| Monohydric alcohol | Type | None | 2-Butanol | None |
|  | Part by mass | 0 | 39.1 | 0 |
| Solid content | Mass % | 60 | 60 | 60 |
| Mass % of effective NCO groups |  | 6.7 | 6.7 | 8.4 |
| Structure A | R1 | Ethyl group | — | — |
|  | R3 | Isopropyl group | — | — |
|  | R4 | Isopropyl group | — | — |
|  | x | 2.3 | 0 | 0 |
| B | R5 | \<DEM\> \<DIPA\> *18 | \<DIPM\> | \<3,5-Dimethyl-pyrazole\> |
|  | y | 2.8 | 3.4 | 3.4 |
|  | x/y Ratio | 0.8 | 0 | 0 |

TABLE 1-7

|  |  |  | Comparative Example 3 | Comparative Example 4 |
|---|---|---|---|---|
| Polyisocyanate |  |  | Production Example 2 | Production Example 1 |
|  | Average number of isocyanate groups |  | 5.1 | 3.4 |
|  | Part by mass |  | 100 | 100 |
| Solvent | Type |  | n-Butyl acetate | n-Butyl acetate |
|  | Part by mass |  | 92.9 | 92.4 |
| Malonic diester (VII) | Type |  | Methylethyl-ketoxime | DEM |
| Blocking agent structure | R1 |  | — | Ethyl group |
|  | R2 |  | — | Ethyl group |
|  | Part by mass |  | 42.5 | 42.3 |
|  | Mol %(b) |  | 103 | 50 |
| 28% Sodium methylate |  | Part by mass | — | 0.58 |
| JP508T |  | Part by mass | — | 0.57 |
| Chain amine compound (c1) | Type |  | None | DIPA |
| Amine structure | R3 |  | — | Isopropyl group |
|  | R4 |  | — | Isopropyl group |
|  | Part by mass |  | — | 26.8 |
|  | Mol % |  | 0 | 50 |
| Nitrogen atom-containing cyclic amine compound (c2) | Type |  | None | None |
|  | Part by mass |  | — | — |
|  | Mol % |  | 0 | 0 |
| (c1) + (c2)Mol %(c) |  |  | 0 | 50 |
| (c)/(b) |  |  | — | 1.0 |
| Amine reaction rate (%) |  |  | — | 100 |
| Monohydric alcohol | Type |  | None | n-Butanol |
|  | Part by mass |  | 0 | 20.3 |
| Solid content | Mass % |  | 60 | 60 |
| Mass % of effective NCO groups |  |  | 8.2 | 7.9 |
| Structure A | R1 |  | — | — |
|  | R3 |  | — | — |
|  | R4 |  | — | — |
|  | x |  | 0 | 0 |
| B | R5 |  | \<Methylethyl-ketoxime\> | \<DEM\> \<DIPA\> |
|  | y |  | 5.1 | 3.4 |
|  | x/y Ratio |  | 0 | 0 |

The numbers with the symbol * in Table 1 each represent the following notes.

*1 Mol % obtained by (number of moles of each compound)/ (number of moles of isocyanate groups in polyisocyanate)
*2 2-Ethylhexyl acid phosphate (trade name by Johoku Chemical Co., Ltd.)
*3 Value obtained by calculating (number of moles of disappeared amine)/(number of moles of amine added for reaction) from GC analysis
*4 Mass % (calculated value) of effective NCO groups as blend described in Table 1
*5 Residue of compound described in parentheses < >, from which active hydrogen is excluded
*6 DEM: diethyl malonate (R1: ethyl group, R2: ethyl group)
*7 DIPA: diisopropylamine (R3: isopropyl group, R4: isopropyl group)
*8 PMA: propylene glycol monomethyl ether acetate
*9 DNBA: di-n-butylamine (R3: n-butyl group, R4: n-butyl group)
*10 Mixture of R3 and R4, derived from DNBA as chain amine compound and 2,6-dimethylpiperidine as nitrogen atom-containing cyclic amine compound
*11 DIPM: diisopropyl malonate (R1: isopropyl group, R2: isopropyl group)
*12 ECHA: N-ethylcyclohexylamine (R3: ethyl group, R4: cyclohexyl group)
*13 N75BA (75% butyl acetate solution of biuret-type polyisocyanate composition of hexamethylene diisocyanate; trade name by Bayer Holding Ltd.)
*14 ME20-100 (urethane, allophanate-type polyisocyanate composition of hexamethylene diisocyanate and polyol; trade name by Asahi Kasei Chemicals Corporation)
*15 DMM: dimethyl malonate (R1: methyl group, R2: methyl group)
*16 VESTANAT T1890E (butyl acetate solution of 70% isocyanulate-type polyisocyanate composition of isophorone diisocyanate; trade name by Evonik Degussa GmbH)
*17 Coronate L (ethyl acetate solution of 75% urethane-type polyisocyanate composition of tolylene diisocyanate and trimethylol propane form; trade name by Nippon Polyurethane Industry Co., Ltd.)
*18 Mixture of residue of diethyl malonate from which active hydrogen is excluded, and residue of diisopropylamine from which active hydrogen is excluded
*19 Mixture of R3 and R4, derived from DIPA as chain amine compound and 2,2,6,6-tetramethylpiperidine as nitrogen atom-containing cyclic amine compound
*20 DPhM: diphenyl malonate (R1: phenyl group, R2: phenyl group)
*21 R3 and R4, derived from 2,6-dimethylpiperidine as nitrogen atom-containing cyclic amine compound Example 16

Measurement of Initial Gel Fraction and Post-Storage Gel Fraction Retention Rate, and Evaluation of Moisture Stability of Blocked Polyisocyanate Composition 100 parts by mass of an acrylic polyol (trade name "A801" by DIC Corporation; resin concentration: 50 mass %; hydroxyl value per unit of resin: 100 mg KOH/g) as a base resin was mixed with 60.4 parts by mass of the blocked polyisocyanate composition obtained in Example 1 (at an equivalent ratio of the blocked isocyanate groups to the hydroxyl groups in the base resin of 1.0), and butyl acetate was then added to the mixture so that the solid content of a coating material was adjusted to 40 mass %. Thus produced coating solution was applied with an applicator so that the thickness of a film became 40 μm after drying. It was baked at 90° C. for 30 minutes and the initial gel fraction was then measured. The result is shown in Table 2.

The coating solution produced in the above manner was stored at 40° C. for 10 days. Thereafter, a baked coating film was produced by the above-described method, and the post-storage gel fraction was then measured. The post-storage gel fraction retention rate is shown in Table 2. Furthermore, 5.4 g of water (corresponding to 300 mmol) was mixed with 20.3 g of the blocked polyisocyanate composition (corresponding to 30 mmol of effective NCO groups). Finally, 174.3 g of diethylene glycol dimethyl ether was added thereto in such a manner that the total amount of the three components was adjusted to 200 g, and the thus obtained mixture was then stirred so as to obtain a blocked polyisocyanate composition solution. The amount of gas (carbon dioxide) generated during the storage of this solution at 40° C. for 10 days was measured. The result is shown in Table 2.

Examples 17-30 and Comparative Examples 5-8

Measurement of Initial Gel Fraction and Post-storage Gel Fraction Retention Rate, and Evaluation of Moisture Stability of Blocked Polyisocyanate Compositions The blocked polyisocyanate compositions were produced in the same manner as in Example 16 with the exception that the components and ratios shown in Table 2 were used. Results regarding the initial gel fraction and post-storage gel fraction retention rates and the moisture stability of the obtained blocked polyisocyanate compositions are shown in Table 2.

Example 31

Measurement of Gel Fraction of a Blocked Polyisocyanate Composition

At first, 22.9 parts by mass of the blocked polyisocyanate composition obtained in Example 2, 16.5 parts by mass of water, and 3 parts by mass of dialkyl sodium sulfosuccinate (trade name "Newcol 290M" by Nippon Nyukazai Co., Ltd.; solid content: 70 mass %) were all charged and they were then blended with each other using a Homo Mixer. After blending, a milky water dispersion was obtained. Thereafter, this water dispersion was mixed with 100 parts by mass of an acrylic emulsion (resin concentration: 42 mass %; hydroxyl value per unit of resin: 40 mg KOH/g; Tg: 20° C.; number average molecular weight: 170,000). They were mixed at an equivalent ratio of the blocked isocyanate groups to the hydroxyl groups of 1.0 and the solid content of coating material was adjusted to 40 mass %. After mixing, a milky water dispersion was obtained. Thus produced coating solution was applied with an applicator so that the thickness of a film became 40 μm after drying. It was baked at 90° C. for 30 minutes, and the gel fraction was then measured. The result is shown in Table 2.

TABLE 2-1

|  |  | Example 16 | Example 17 | Example 18 |
|---|---|---|---|---|
| Base resin | Type | Base resin 1 *22 | Base resin 1 | Base resin 1 |
|  | Part by mass | 100 | 100 | 100 |
| Blocked polyisocyanate composition |  | Example 1 | Example 2 | Example 3 |
|  | Part by mass | 60.4 | 66.8 | 72.0 |
| Solvent | Butyl acetate Part by mass | 55.2 | 58.4 | 61.0 |
|  | Water Part by mass | — | — | — |
| Initial gel fraction |  | ⊚ | ○ | ○ |
| Post-storage gel fraction retention rate |  | ⊚ | ○ | ○ |
| Moisture stability |  | ○ | ○ | ○ |

TABLE 2-2

|  |  | Example 19 | Example 20 | Example 21 |
|---|---|---|---|---|
| Base resin | Type | Base resin 1 | Base resin 1 | Base resin 1 |
|  | Part by mass | 100 | 100 | 100 |
| Blocked polyisocyanate composition |  | Example 4 | Example 5 | Example 6 |
|  | Part by mass | 60.4 | 101.2 | 68.1 |
| Solvent | Butyl acetate Part by mass | 55.2 | 75.6 | 59.1 |
|  | Water Part by mass | — | — | — |
| Initial gel fraction |  | ⊚ | ⊚ | ○ |
| Post-storage gel fraction retention rate |  | ⊚ | ○ | ⊚ |
| Moisture stability |  | ○ | ○ | ○ |

TABLE 2-3

|  |  | Example 22 | Example 23 | Example 24 |
|---|---|---|---|---|
| Base resin | Type | Base resin 1 | Base resin 1 | Base resin 1 |
|  | Part by mass | 100 | 100 | 100 |
| Blocked polyisocyanate composition |  | Example 7 | Example 8 | Example 9 |
|  | Part by mass | 66.8 | 58.4 | 69.3 |
| Solvent | Butyl acetate Part by mass | 58.4 | 54.2 | 59.7 |
|  | Water Part by mass | — | — | — |
| Initial gel fraction |  | ○ | ○ | ⊚ |
| Post-storage gel fraction retention rate |  | ○ | ○ | ⊚ |
| Moisture stability |  | ○ | ○ | ○ |

TABLE 2-4

|  |  | Example 25 | Example 26 | Example 27 |
|---|---|---|---|---|
| Base resin | Type | Base resin 1 | Base resin 1 | Base resin 1 |
|  | Part by mass | 100 | 100 | 100 |
| Blocked polyisocyanate composition |  | Example 10 | Example 11 | Example 12 |
|  | Part by mass | 61.9 | 64.6 | 75.6 |
| Solvent | Butyl acetate Part by mass | 56.0 | 57.3 | 62.8 |
|  | Water Part by mass | — | — | — |
| Initial gel fraction |  | ⊚ | ○ | ○ |
| Post-storage gel fraction retention rate |  | ⊚ | ⊚ | ○ |
| Moisture stability |  | ○ | ○ | ○ |

TABLE 2-5

|  |  | Example 28 | Example 29 | Example 30 |
|---|---|---|---|---|
| Base resin | Type | Base resin 1 | Base resin 1 | Base resin 1 |
|  | Part by mass | 100 | 100 | 100 |
| Blocked polyisocyanate composition |  | Example 13 | Example 14 | Example 15 |
|  | Part by mass | 64.1 | 66.3 | 55.9 |
| Solvent | Butyl acetate Part by mass | 57.1 | 58.2 | 53.0 |
|  | Water Part by mass | — | — | — |
| Initial gel fraction |  | ○ | ⊚ | ○Δ |
| Post-storage gel fraction retention rate |  | ⊚ | ⊚ | ○ |
| Moisture stability |  | ○ | ○ | ○ |

TABLE 2-6

|  |  | Example 31 | Comparative Example 5 | Comparative Example 6 |
|---|---|---|---|---|
| Base resin | Type | Base resin 2 *23 | Base resin 1 | Base resin 1 |
|  | Part by mass | 100 | 100 | 100 |
| Blocked polyisocyanate composition |  | Example 2 | Comparative Example 1 | Comparative Example 2 |
|  | Part by mass | 22.9 | 55.9 | 44.6 |
| Solvent | Butyl acetate Part by mass | — | 53.0 | 47.3 |
|  | Water Part by mass | 16.5 | — | — |
| Initial gel fraction |  | ○ | ⊚ | XX |
| Post-storage gel fraction retention rate |  | ○ | X | ⊚ |
| Moisture stability |  | ○ | XX | ⊚ |

TABLE 2-7

|  |  | Comparative Example 7 | Comparative Example 8 |
|---|---|---|---|
| Base resin | Type | Base resin 1 | Base resin 1 |
|  | Part by mass | 100 | 100 |
| Blocked polyisocyanate composition |  | Comparative Example 3 | Comparative Example 4 |
|  | Part by mass | 44.6 | 47.4 |
| Solvent | Butyl acetate Part by mass | 47.3 | 48.7 |
|  | Water Part by mass | — | — |

TABLE 2-7-continued

|  | Comparative Example 7 | Comparative Example 8 |
|---|---|---|
| Initial gel fraction | XX | Δ |
| Post-storage gel fraction retention rate | ◉ | Δ |
| Moisture stability | ◉ | X |

The numbers with the symbol * in Table 2 represent the following notes, respectively.

*22 Acrylic polyol (trade name "A801" by DIC Corporation; resin concentration: 50 mass %; hydroxyl value per unit of resin: 100 mg KOH/g)

*23 Acrylic emulsion (resin concentration: 42 mass %; hydroxyl value per unit of resin: 40 mg KOH/g; Tg: 20° C.; number average molecular weight: 170,000)

Example 32

Production of a Blocked Polyisocyanate Composition

The inside of a four-necked flask equipped with a stirrer, a thermometer, a reflux condenser, a nitrogen-supplying pipe and a dropping funnel was turned into nitrogen atmosphere. Thereafter, 100 parts by mass of the polyisocyanate obtained in Production Example 1 (wherein the number of moles of isocyanate groups in this polyisocyanate was set at 100), 42.3 parts by mass of monomethoxy polyethylene glycol (trade name "Uniox M400" by NOF Corporation) having a number average molecular weight of 400 (corresponding to 20 mol % of the isocyanate groups in the polyisocyanate), and 117.1 parts by mass of diethylene glycol dimethyl ether were charged into the flask. The mixture was maintained at 80° C. for 6 hours. Then, the temperature of the reaction solution was cooled to 60° C. Thereafter, 72.0 parts by mass of diethyl malonate (corresponding to 85 mol % of the isocyanate groups in the polyisocyanate) and 0.88 parts by mass of a 28% methanol solution of sodium methylate were added thereto, and the obtained mixture was then maintained for 4 hours. Then, 0.86 parts by mass of 2-ethylhexyl acid phosphate was added thereto. Thereafter, 45.5 parts by mass of diisopropylamine (corresponding to 85 mol % of the isocyanate groups in the polyisocyanate) was added thereto, the temperature of the reaction solution was then increased to 70° C. and the reaction solution was maintained for 5 hours. By analyzing this reaction solution with gas chromatography, it was confirmed that the reaction rate of diisopropylamine was 70%. Thereafter, 14.2 parts by mass of n-butanol was added thereto so as to obtain a blocked polyisocyanate composition having a solid concentration of 60 mass %. The physical properties of the obtained blocked polyisocyanate composition and the structure of the blocked polyisocyanate in the formula (V) are shown in Table 3.

Examples 33-46

Production of Blocked Polyisocyanate Compositions

The blocked polyisocyanate compositions were produced in the same manner as in Example 32 with the exception that the components and ratios shown in Table 3 were used. The physical properties of the obtained blocked polyisocyanate compositions and the structures of the blocked polyisocyanates in the formula (V) are shown in Table 3.

Comparative Example 9

Production of a Blocked Polyisocyanate Composition

The inside of a four-necked flask equipped with a stirrer, a thermometer, a reflux condenser, a nitrogen-supplying pipe and a dropping funnel was turned into nitrogen atmosphere. Thereafter, 100 parts by mass of the polyisocyanate composition obtained in Production Example 1 (wherein the number of moles of isocyanate groups in this polyisocyanate was set at 100), 71.9 parts by mass of monomethoxy polyethylene glycol (trade name "MPG-081" by Nippon Nyukazai Co., Ltd.) having a number average molecular weight of 680 (corresponding to 20 mol % of the isocyanate groups in the polyisocyanate), and 137.6 parts by mass of diethylene glycol dimethyl ether were charged into the flask, and they were maintained at 80° C. for 6 hours. Thereafter, 84.6 parts by mass of diisopropyl malonate (corresponding to 85 mol % of the isocyanate groups in the polyisocyanate) and 1.06 parts by mass of a 28% methanol solution of sodium methylate were added thereto, and the obtained mixture was then maintained for 4 hours. Then, 24.5 parts by mass of 2-butanol was added thereto, and the obtained mixture was further maintained for 2 hours. Thereafter, the disappearance of isocyanate groups was confirmed by infrared spectrum measurement. Then, 1.03 parts by mass of 2-ethylhexyl acid phosphate was added thereto so as to obtain a blocked polyisocyanate composition having a solid concentration of 60 mass %. The physical properties of the obtained blocked polyisocyanate composition and the structure of the blocked polyisocyanate in the formula (V) are shown in Table 3.

Comparative Example 10

Production of a Blocked Polyisocyanate Composition

The inside of a four-necked flask equipped with a stirrer, a thermometer, a reflux condenser, a nitrogen-supplying pipe and a dropping funnel was turned into nitrogen atmosphere. Thereafter, 100 parts by mass of the polyisocyanate composition obtained in Production Example 1 (wherein the number of moles of isocyanate groups in this polyisocyanate was set at 100), 71.9 parts by mass of monomethoxy polyethylene glycol (trade name "MPG-081" by Nippon Nyukazai Co., Ltd.) having a number average molecular weight of 680 (corresponding to 20 mol % of the isocyanate groups in the polyisocyanate), and 116.2 parts by mass of diethylene glycol dimethyl ether were charged into the flask, and they were maintained at 80° C. for 6 hours. Thereafter, the temperature of the reaction solution was cooled to 60° C., and 41.7 parts by mass of 3,5-dimethylpyrazole (corresponding to 82 mol % of the isocyanate groups in the polyisocyanate) was then added thereto in five separate injections. After completion of the addition, the mixture was stirred for 1 hour, and the disappearance of isocyanate groups was then confirmed by infrared spectrum measurement. Then, 24.5 parts by mass of isobutanol was added thereto so as to obtain a blocked polyisocyanate composition having a solid concentration of 60 mass %. The physical properties of the obtained blocked polyisocyanate composition and the structure of the blocked polyisocyanate in the formula (V) are shown in Table 3.

Comparative Example 11

Production of a Blocked Polyisocyanate Composition

The inside of a four-necked flask equipped with a stirrer, a thermometer, a reflux condenser, a nitrogen-supplying pipe and a dropping funnel was turned into nitrogen atmosphere. Thereafter, 100 parts by mass of the polyisocyanate composition obtained in Production Example 1 (wherein the number of moles of isocyanate groups in this polyisocyanate was set at 100), 42.3 parts by mass of monomethoxy polyethylene glycol (trade name "Uniox M400" by NOF Corporation) having a number average molecular weight of 400 (corresponding to 20 mol % of the isocyanate groups in the polyisocyanate), and 130.3 parts by mass of diethylene glycol dimethyl ether were charged into the flask, and they were maintained at 80° C. for 6 hours. Thereafter, the temperature of the reaction solution was cooled to 60° C. Then, 33.9 parts by mass of diethyl malonate (corresponding to 40 mol % of the isocyanate groups in the polyisocyanate) and 0.72 parts by mass of a 28% methanol solution of sodium methylate were added thereto, and the obtained mixture was then maintained for 4 hours. Thereafter, 0.70 parts by mass of 2-ethylhexyl acid phosphate was added thereto. Subsequently, 21.4 parts by mass of diisopropylamine (corresponding to 40 mol % of the isocyanate groups in the polyisocyanate) was added thereto, the temperature of the reaction solution was then increased to 70° C., and the reaction solution was maintained for 5 hours. This reaction solution was analyzed by gas chromatography, by which it was confirmed that neither ethanol nor diisopropylamine was present. The physical properties of the obtained blocked polyisocyanate composition and the structure of the blocked polyisocyanate in the formula (V) are shown in Table 3.

TABLE 3-1

|  |  |  | Example 32 | Example 33 | Example 34 |
|---|---|---|---|---|---|
| Polyisocyanate |  |  | Production Example 1 | Production Example 2 | Production Example 3 |
|  | Average number of isocyanate groups |  | 3.4 | 5.1 | 4.1 |
|  | Part by mass |  | 100 | 100 | 100 |
| Solvent | Type |  | DMDG *6 | DMDP *10 | DMDP |
|  | Part by mass |  | 117.1 | 119.8 | 129.0 |
| Active hydrogen-containing hydrophilic compound | Type |  | M400 *7 | M550 *11 | M1000 *14 |
|  | Part by mass |  | 42.3 | 39.1 | 22.5 |
|  | Mol % *1 |  | 20 | 15 | 5 |
| Malonic diester (VII) | Type |  | DEM *8 | DEM | DIPM *15 |
| Blocking agent structure | R1 |  | Ethyl group | Ethyl group | Isopropyl group |
|  | R2 |  | Ethyl group | Ethyl group | Isopropyl group |
|  | Part by mass |  | 72.0 | 68.3 | 88.9 |
|  | Mol %(b) |  | 85 | 90 | 105 |
| 28% Sodium methylate | Part by mass |  | 0.88 | 0.86 | 0.85 |
| JP508T *2 | Part by mass |  | 0.86 | 0.84 | 0.83 |
| Chain amine compound (c1) | Type |  | DIPA *9 | DNBA *12 | ECHA *16 |
| Amine structure | R3 |  | Isopropyl group | n-Butyl group | Ethyl group |
|  | R4 |  | Isopropyl group | n-Butyl group | Cyclohexyl group |
|  | Part by mass |  | 45.5 | 24.5 | 51.5 |
|  | Mol % |  | 85 | 40 | 90 |
| Nitrogen atom-containing cyclic amine compound (c2) | Type |  | None | 2,6-Dimethyl-piperidine | None |
|  | Part by mass |  | — | 42.9 | — |
|  | Mol % |  | 0 | 80 | 0 |
| (c1) + (c2)Mol %(c) |  |  | 85 | 120 | 90 |
| (c)/(b) |  |  | 1.0 | 1.3 | 0.9 |
| Amine reaction rate (%) *3 |  |  | 70 | 60 | 70 |
| Monohydric alcohol | Type |  | n-Butanol | n-Butanol | None |
|  | Part by mass |  | 14.2 | 12.6 | 0 |
| Solid content | Mass % |  | 60 | 60 | 60 |
| Mass % of effective NCO groups *4 |  |  | 4.5 | 4.1 | 4.6 |
| Structure | A | R1 | Ethyl group | Ethyl group *13 | Isopropyl group |
|  |  | R3 | Isopropyl group |  | Ethyl group |
|  |  | R4 | Isopropyl group |  | Cyclohexyl group |
|  |  | x | 1.9 | 3.7 | 2.2 |
|  | B | R5 *5 | <DEM> | <DEM> | <DIPM> |
|  |  | y | 0.8 | 0.6 | 1.7 |
|  | C | R6 *5 | <M400> | <M550> | <M1000> |
|  |  | z | 0.7 | 0.8 | 0.2 |
| (x + y)/z Ratio |  |  | 3.9 | 5.4 | 19.5 |
| x/y Ratio |  |  | 2.4 | 6.2 | 1.3 |

TABLE 3-2

|  |  | Example 35 | Example 36 | Example 37 |
|---|---|---|---|---|
| Polyisocyanate |  | N75BA *17 | ME20-100 *18 | T1890E *21 |
| Average number of isocyanate groups |  | 3.4 | 8.0 | 3.2 |
| Part by mass |  | 100 | 100 | 100 |
| Solvent | Type | DMDG | DMDG | DMDG |
|  | Part by mass | 76.3 | 90.7 | 43.8 |
| Active hydrogen-containing hydrophilic compound | Type | M400 | MPG081 *19 | M550 |
|  | Part by mass | 55.0 | 27.5 | 31.2 |
|  | Mol % | 35 | 20 | 20 |
| Malonic diester (VII) | Type | DEM | DMM *20 | DEM |
| Blocking agent structure | R1 | Ethyl group | Methyl group | Ethyl group |
|  | R2 | Ethyl group | Methyl group | Ethyl group |
|  | Part by mass | 44.1 | 23.8 | 40.8 |
|  | Mol %(b) | 70 | 85 | 90 |
| 28% Sodium methylate | Part by mass | 0.72 | 0.63 | 0.58 |
| JP508T | Part by mass | 0.70 | 0.61 | 0.57 |
| Chain amine compound (c1) | Type | DIPA | DIPA | DIPA |
| Amine structure | R3 | Isopropyl group | Isopropyl group | Isopropyl group |
|  | R4 | Isopropyl group | Isopropyl group | Isopropyl group |
|  | Part by mass | 35.8 | 17.4 | 34.4 |
|  | Mol % | 90 | 85 | 120 |
| Nitrogen atom-containing cyclic amine compound (c2) | Type | None | None | None |
|  | Part by mass | — | — | — |
|  | Mol % | 0 | 0 | 0 |
| (c1) + (c2)Mol %(c) |  | 90 | 85 | 120 |
| (c)/(b) |  | 1.3 | 1.0 | 1.3 |
| Amine reaction rate (%) |  | 60 | 70 | 60 |
| Monohydric alcohol | Type | 2-Butanol | Isobutanol | None |
|  | Part by mass | 6.5 | 5.3 | 0 |
| Solid content Mass % |  | 60 | 60 | 60 |
| Mass % of effective NCO groups |  | 2.8 | 2.6 | 3.8 |
| Structure | A R1 | Ethyl group | Methyl group | Ethyl group |
|  | R3 | Isopropyl group | Isopropyl group | Isopropyl group |
|  | R4 | Isopropyl group | Isopropyl group | Isopropyl group |
|  | x | 1.8 | 4.8 | 2.3 |
|  | B R5 | <DEM> | <DMM> | <DEM> |
|  | y | 0.4 | 1.6 | 0.3 |
|  | C R6 | <M400> | <MPG081> | <M550> |
|  | z | 1.2 | 1.6 | 0.6 |
|  | (x + y)/z Ratio | 1.8 | 4.0 | 4.3 |
|  | x/y Ratio | 4.5 | 3.0 | 7.7 |

TABLE 3-3

|  |  | Example 38 | Example 39 | Example 40 |
|---|---|---|---|---|
| Polyisocyanate |  | Coronate L *22 | Production Example 2 | Production Example 2 |
| Average number of isocyanate groups |  | 3.5 | 5.1 | 5.1 |
| Part by mass |  | 100 | 100 | 100 |
| Solvent | Type | DMDG | DMDG | DMDG |
|  | Part by mass | 66.8 | 132.6 | 102.4 |
| Active hydrogen-containing hydrophilic compound | Type | M550 | M1000 | HPA *24 |
|  | Part by mass | 43.2 | 47.4 | 11.2 |
|  | Mol % | 25 | 10 | 20 |
| Malonic diester (VII) | Type | DEM | DEM | DEM |
| Blocking agent structure | R1 | Ethyl group | Ethyl group | Ethyl group |
|  | R2 | Ethyl group | Ethyl group | Ethyl group |
|  | Part by mass | 40.3 | 60.7 | 64.5 |
|  | Mol %(b) | 80 | 80 | 85 |
| 28% Sodium methylate | Part by mass | 0.66 | 0.87 | 0.72 |
| JP508T | Part by mass | 0.64 | 0.85 | 0.71 |
| Chain amine compound (c1) | Type | DIPA | DIPA | DIPA |
| Amine structure | R3 | Isopropyl group | Isopropyl group | Isopropyl group |
|  | R4 | Isopropyl group | Isopropyl group | Isopropyl group |
|  | Part by mass | 25.4 | 45.6 | 38.4 |
|  | Mol % | 80 | 95 | 80 |

TABLE 3-3-continued

|  |  |  | Example 38 | Example 39 | Example 40 |
|---|---|---|---|---|---|
| Nitrogen atom-containing cyclic amine compound (c2) | Type |  | None | None | 2,2,6,6-Tetramethyl-piperidine |
|  | Part by mass |  | — | — | 20.1 |
|  | Mol % |  | 0 | 0 | 30 |
| (c1) + (c2)Mol %(c) |  |  | 80 | 100 | 110 |
| (c)/(b) |  |  | 1.0 | 1.2 | 1.3 |
| Amine reaction rate (%) |  |  | 70 | 70 | 60 |
| Monohydric alcohol | Type |  | n-Butanol | None | n-Butanol |
|  | Part by mass |  | 7.3 | 0 | 13.8 |
| Solid content | Mass % |  | 60 | 60 | 60 |
| Mass % of effective NCO groups |  |  | 3.5 | 4.6 | 4.5 |
| Structure | A | R1 | Ethyl group | Ethyl group | Ethyl group |
|  |  | R3 | Isopropyl group | Isopropyl group | *25 |
|  |  | R4 | Isopropyl group | Isopropyl group |  |
|  |  | x | 2.0 | 3.6 | 3.4 |
|  | B | R5 | <DEM> | <DEM> <DIPA> *23 | <DEM> |
|  |  | y | 0.6 | 1.0 | 0.7 |
|  | C | R6 | <M550> | <M1000> | <HPA> |
|  |  | z | 0.9 | 0.5 | 1.0 |
|  | (x + y)/z Ratio |  | 2.9 | 9.2 | 4.1 |
|  | x/y Ratio |  | 3.3 | 3.6 | 4.9 |

TABLE 3-4

|  |  |  | Example 41 | Example 42 | Example 43 |
|---|---|---|---|---|---|
| Polyisocyanate |  |  | Production Example 2 | Production Example 2/ T1890E = 50/50 | Production Example 2 |
|  | Average number of isocyanate groups |  | 5.1 | 3.9 | 5.1 |
|  | Part by mass |  | 100 | 100 | 100 |
| Solvent | Type |  | DMDG | DMDG | DMDG |
|  | Part by mass |  | 114.8 | 57.7 | 92.4 |
| Active hydrogen-containing hydrophilic compound | Type |  | 205BA *26 | MPG081 | MPG250 *28 |
|  | Part by mass |  | 11.9 | 51.5 | 11.8 |
|  | Mol % |  | 10 | 20 | 10 |
| Malonic diester (VII) | Type |  | DEM | DEM | DEM |
| Blocking agent structure | R1 |  | Ethyl group | Ethyl group | Ethyl group |
|  | R2 |  | Ethyl group | Ethyl group | Ethyl group |
|  | Part by mass |  | 72.1 | 60.6 | 72.1 |
|  | Mol %(b) |  | 95 | 100 | 95 |
| 28% Sodium methylate | Part by mass |  | 0.76 | 0.78 | 0.75 |
| JP508T | Part by mass |  | 0.74 | 0.77 | 0.73 |
| Chain amine compound (c1) | Type |  | None | DIPA | DIPA |
| Amine structure | R3 |  | — | Isopropyl group | Isopropyl group |
|  | R4 |  | — | Isopropyl group | Isopropyl group |
|  | Part by mass |  | — | 38.3 | 45.6 |
|  | Mol % |  | 0 | 100 | 95 |
| Nitrogen atom-containing cyclic amine compound (c2) | Type |  | 2,6-Dimethyl-piperidine | 2-Methyl-piperidine | None |
|  | Part by mass |  | 51.0 | 18.8 | — |
|  | Mol % |  | 95 | 50 | 0 |
| (c1) + (c2)Mol %(c) |  |  | 95 | 150 | 95 |
| (c)/(b) |  |  | 1.0 | 1.5 | 1.0 |
| Amine reaction rate (%) |  |  | 70 | 50 | 70 |
| Monohydric alcohol | Type |  | None | None | None |
|  | Part by mass |  | 0 | 0 | 0 |
| Solid content | Mass % |  | 60 | 60 | 60 |
| Mass % of effective NCO groups |  |  | 5.1 | 3.9 | 5.4 |
| Structure | A | R1 | Ethyl group | Ethyl group | Ethyl group |
|  |  | R3 | *27 | Isopropyl group | Isopropyl group |
|  |  | R4 |  | Isopropyl group | Isopropyl group |
|  |  | x | 3.3 | 2.9 | 3.4 |
|  | B | R5 | <DEM> | <DEM> | <DEM> |
|  |  | y | 0.8 | 0.2 | 1.2 |

TABLE 3-4-continued

|   |   |   | Example 41 | Example 42 | Example 43 |
|---|---|---|---|---|---|
| C | R6 |   | <205BA> | <MPG081> | <MPG250> |
|   | z |   | 1.0 | 0.8 | 0.5 |
|   | (x + y)/z Ratio |   | 4.1 | 3.9 | 9.2 |
|   | x/y Ratio |   | 4.1 | 14.5 | 2.8 |

TABLE 3-5

|   |   |   | Example 44 | Example 45 | Example 46 |
|---|---|---|---|---|---|
| Polyisocyanate |   |   | Production Example 2 | Production Example 2 | Production Example 2 |
|   | Average number of isocyanate groups |   | 5.1 | 5.1 | 5.1 |
|   | Part by mass |   | 100 | 100 | 100 |
| Solvent | Type |   | DMDG | DMDG | DMDG |
|   | Part by mass |   | 114.8 | 122.2 | 122.3 |
| Active hydrogen-containing hydrophilic compound | Type |   | M1000 | M1000 | M1000 |
|   | Part by mass |   | 47.4 | 47.4 | 47.4 |
|   | Mol % |   | 10 | 10 | 10 |
| Malonic diester (VII) | Type |   | DEM | DEM | DEM |
| Blocking agent structure | R1 |   | Ethyl group | Ethyl group | Ethyl group |
|   | R2 |   | Ethyl group | Ethyl group | Ethyl group |
|   | Part by mass |   | 72.1 | 53.1 | 41.7 |
|   | Mol %(b) |   | 95 | 70 | 55 |
| 28% Sodium methylate | Part by mass |   | 0.76 | 0.68 | 0.65 |
| JP508T | Part by mass |   | 0.74 | 0.66 | 0.63 |
| Chain amine compound (c1) | Type |   | DIPA | DIPA | DIPA |
| Amine structure | R3 |   | Isopropyl group | Isopropyl group | Isopropyl group |
|   | R4 |   | Isopropyl group | Isopropyl group | Isopropyl group |
|   | Part by mass |   | 45.6 | 48.0 | 48.0 |
|   | Mol % |   | 95 | 100 | 100 |
| Nitrogen atom-containing cyclic amine compound (c2) | Type |   | None | None | None |
|   | Part by mass |   | — | — | — |
|   | Mol % |   | 0 | 0 | 0 |
| (c1) + (c2)Mol %(c) |   |   | 95 | 100 | 100 |
| (c)/(b) |   |   | 1.0 | 1.4 | 1.8 |
| Amine reaction rate (%) |   |   | 70 | 70 | 75 |
| Monohydric alcohol | Type |   | None | None | None |
|   | Part by mass |   | 0 | 0 | 0 |
| Solid content | Mass % |   | 60 | 60 | 60 |
| Mass % of effective NCO groups |   |   | 4.6 | 4.8 | 5.0 |
| Structure | A | R1 | Ethyl group | Ethyl group | Ethyl group |
|   |   | R3 | Isopropyl group | Isopropyl group | Isopropyl group |
|   |   | R4 | Isopropyl group | Isopropyl group | Isopropyl group |
|   |   | x | 3.4 | 2.5 | 2.0 |
|   | B | R5 | <DEM> | <DEM> <DIPA> *23 | <DEM> <DIPA> *23 |
|   |   | y | 1.2 | 2.1 | 2.6 |
|   | C | R6 | <M1000> | <M1000> | <M1000> |
|   |   | z | 0.5 | 0.5 | 0.5 |
|   | (x + y)/z Ratio |   | 9.2 | 9.2 | 9.2 |
|   | x/y Ratio |   | 2.8 | 1.2 | 0.8 |

TABLE 3-6

|   |   |   | Comparative Example 9 | Comparative Example 10 | Comparative Example 11 |
|---|---|---|---|---|---|
| Polyisocyanate |   |   | Production Example 1 | Production Example 1 | Production Example 1 |
|   | Average number of isocyanate groups |   | 3.4 | 3.4 | 3.4 |
|   | Part by mass |   | 100 | 100 | 100 |
| Solvent | Type |   | DMDG | DMDG | DMDG |
|   | Part by mass |   | 137.6 | 116.2 | 130.3 |
| Active hydrogen-containing hydrophilic compound | Type |   | MPG081 | MPG081 | M400 |
|   | Part by mass |   | 71.9 | 71.9 | 42.3 |
|   | Mol % |   | 20 | 20 | 20 |

TABLE 3-6-continued

|  |  |  | Comparative Example 9 | Comparative Example 10 | Comparative Example 11 |
|---|---|---|---|---|---|
| Malonic diester (VII) |  | Type | DIPM | 3,5-Dimethylpyrazole | DEM |
| Blocking agent structure | R1 |  | Isopropyl group | — | Ethyl group |
|  | R2 |  | Isopropyl group | — | Ethyl group |
|  |  | Part by mass | 84.6 | 41.7 | 33.9 |
|  |  | Mol %(b) | 85 | 82 | 40 |
| 28% Sodium methylate |  | Part by mass | 1.06 | — | 0.72 |
| JP508T |  | Part by mass | 1.03 | — | 0.70 |
| Chain amine compound (c1) |  | Type | None | None | DIPA |
| Amine structure | R3 |  | — | — | Isopropyl group |
|  | R4 |  | — | — | Isopropyl group |
|  |  | Part by mass | — | — | 21.4 |
|  |  | Mol % | 0 | 0 | 40 |
| Nitrogen atom-containing cyclic amine compound (c2) |  | Type | None | None | None |
|  |  | Part by mass | — | — | — |
|  |  | Mol % | 0 | 0 | 0 |
| (c1) + (c2)Mol %(c) |  |  | 0 | 0 | 40 |
| (c)/(b) |  |  | 0 | 0 | 1.0 |
| Amine reaction rate (%) |  |  | — | — | 100 |
| Monohydric alcohol |  | Type | Isobutanol | Isobutanol | None |
|  |  | Part by mass | 24.5 | 24.5 | 0 |
| Solid content | Mass % |  | 60 | 60 | 60 |
| Mass % of effective NCO groups |  |  | 4.2 | 5.0 | 5.4 |
| Structure | A | R1 | — | — | — |
|  |  | R3 | — | — | — |
|  |  | R4 | — | — | — |
|  |  | x | 0 | 0 | 0 |
|  | B | R5 | <DIPM> | <3,5-Dimethylpyrazole> | <DEM> <DIPA> |
|  |  | y | 2.7 | 2.7 | 2.7 |
|  | C | R6 | <MPG081> | <MPG081> | <M400> |
|  |  | z | 0.7 | 0.7 | 0.7 |
|  | (x + y)/z Ratio |  | 3.9 | 3.9 | 3.9 |
|  | x/y Ratio |  | 0 | 0 | 0 |

The numbers with the symbol * in Table 3 represent the following notes, respectively.

*1 Mol % obtained by (number of moles of each compound)/(number of moles of isocyanate groups in polyisocyanate)
*2 2-Ethylhexyl acid phosphate (trade name by Johoku Chemical Co., Ltd.)
*3 Value obtained by calculating (number of moles of disappeared amine)/(number of moles of amine added for reaction) from GC analysis
*4 Mass % (calculated value) of effective NCO groups as blend described in Table 3
*5 Residue of compound described in parentheses < >, from which active hydrogen is excluded
*6 DMDG: diethylene glycol dimethyl ether
*7 Uniox M400 (monomethoxy polyethylene glycol having number average molecular weight of 400; trade name by NOF Corporation ("M400" in the table))
*8 DEM: diethyl malonate (R1: ethyl group, R2: ethyl group)
*9 DIPA: diisopropylamine (R3: isopropyl group, R4: isopropyl group)
*10 DMDP: dipropylene glycol dimethyl ether
*11 Uniox M550 (monomethoxy polyethylene glycol having number average molecular weight of 550; trade name by NOF Corporation ("M550" in the table))
*12 DNBA: di-n-butylamine (R3: n-butyl group, R4: n-butyl group)
*13 Mixture of R3 and R4, derived from DNBA as chain amine compound and 2,6-dimethylpiperidine as nitrogen atom-containing cyclic amine compound
*14 Uniox M1000 (monomethoxy polyethylene glycol having number average molecular weight of 1000; trade name by NOF Corporation ("M1000" in the table))
*15 DIPM: diisopropyl malonate (R1: isopropyl group, R2: isopropyl group)
*16 ECHA: N-ethylcyclohexylamine (R3: ethyl group, R4: cyclohexyl group)
*17 N75BA (75% butyl acetate solution of biuret-type polyisocyanate of hexamethylene diisocyanate; trade name by Bayer Holding Ltd.)
*18 ME20-100 (urethane, allophanate-type polyisocyanate of hexamethylene diisocyanate and polyol; trade name by Asahi Kasei Chemicals Corporation)
*19 MPG-081 (monomethoxy polyethylene glycol having number average molecular weight of 680; trade name by Nippon Nyukazai Co., Ltd.)
*20 DMM: dimethyl malonate (R1: methyl group, R2: methyl group)
*21 VESTANAT T1890E (70% butyl acetate solution of isocyanulate-type polyisocyanate of isophorone diisocyanate; trade name by Evonik Degussa GmbH ("T1890E" referred to in the table))
*22 Coronate L (75% ethyl acetate solution of urethane-type polyisocyanate of tolylene diisocyanate and trimethylol propane form; trade name by Nippon Polyurethane Industry Co., Ltd.)
*23 Mixture of residue of diethyl malonate from which active hydrogen is excluded, and residue of diisopropylamine from which active hydrogen is excluded

*24 HPA: hydroxypivalic acid
*25 Mixture of R3 and R4, derived from DIPA as chain amine compound and 2,2,6,6-tetramethylpiperidine as nitrogen atom-containing cyclic amine compound
*26 Placcel 205BA (2,2-dimethylol butanoic acid derivative; trade name by Daicel Chemical Industries, Ltd. ("205BA" referred to in the table))
*27 R3 and R4, derived from 2,6-dimethylpiperidine as nitrogen atom-containing cyclic amine compound
*28 MPG (250) (monomethoxy polyethylene glycol having number average molecular weight of 250)

Example 47

Evaluation of Blocked Polyisocyanate Composition 100 parts by mass of an acrylic emulsion (hydroxyl value per unit of resin: 40 mg KOH/g; acid value per unit of resin: 13 mg KOH/g resin; Tg: 20° C.; number average molecular weight: 100,000; resin concentration: 42 mass %; adjusted to pH 8.5 with dimethylethanolamine) as a base resin, 8.45 parts by mass of the blocked polyisocyanate composition obtained in Example 32 (wherein the components were mixed so that the ratio (H/G) of the molar equivalent H of effective NCO groups in the blocked polyisocyanate composition to the molar equivalent G of hydroxy groups in the base resin could be H/G=0.3), and 26.0 parts by mass of water were mixed with each other (wherein they were mixed so that the solid content of coating material could be 35 mass %). Thereafter, the mixture was finally adjusted so that the coating solution could have a pH of 8.5 by adding dimethylethanolamine thereto. Thus produced coating solution was left at room temperature for 2 hours, and the appearance of the coating solution was then observed. Thereafter, the coating solution was applied with an applicator so that the thickness of a film became 40 μm after drying. It was baked at 90° C. for 30 minutes, and the initial gel fraction was then measured. The result is shown in Table 4.

After the production of this coating solution, it was stored at 40° C. for 10 days. After the storage, the coating solution was applied by the same method as that described above, and the post-storage gel fraction was then measured. The result of the post-storage gel fraction retention rate is shown in Table 4. Moreover, the pH of the coating solution was measured after storage at 40° C. for 10 days. Thereafter, 28.0 g of the blocked polyisocyanate composition obtained in Example 32 (corresponding to 30 mmol of effective NCO groups) was mixed with 172.0 g of water (in such a manner that the total mass became 200.0 g) so as to obtain an aqueous solution of the blocked polyisocyanate composition. The amount of gas (carbon dioxide) generated during storage of this solution at 40° C. for 10 days was measured. The results are shown in Table 4.

Examples 48-61, Reference Example 1, and Comparative Examples 12-14

Evaluation of Blocked Polyisocyanate Compositions

The blocked polyisocyanate compositions were produced in the same manner as in Example 47 with the exception that the components and ratios shown in Table 4 were used. The evaluation results of the obtained blocked polyisocyanate compositions are shown in Table 4.

TABLE 4-1

| | | Example 47 | Example 48 | Example 49 |
|---|---|---|---|---|
| Base resin | Type | Base resin 3 *29 | Base resin 3 | Base resin 3 |
| | Part by mass | 100 | 100 | 100 |
| Blocked polyisocyanate composition | | Example 32 | Example 33 | Example 34 |
| | Part by mass | 8.4 | 9.2 | 8.2 |
| Water | Part by mass | 26.0 | 26.6 | 25.6 |
| Appearance of coating solution | | ○ | ○ | ○ |
| Initial gel fraction | | ⊚ | ○ | ○ |
| Post-storage gel fraction retention rate | | ⊚ | ○ | ○ |
| pH change in coating solution before and after storage | | ○ | ○ | ○ |
| Gas generation test | | ○ | ○ | ○ |

TABLE 4-2

| | | Example 50 | Example 51 | Example 52 |
|---|---|---|---|---|
| Base resin | Type | Base resin 3 | Base resin 3 | Base resin 3 |
| | Part by mass | 100 | 100 | 100 |
| Blocked polyisocyanate composition | | Example 35 | Example 36 | Example 37 |
| | Part by mass | 11.1 | 14.5 | 9.9 |
| Water | Part by mass | 27.9 | 30.4 | 27.1 |
| Appearance of coating solution | | ○ | ○ | ○ |
| Initial gel fraction | | ⊚ | ⊚ | ○ |
| Post-storage gel fraction retention rate | | ⊚ | ○ | ⊚ |
| pH change in coating solution before and after storage | | ○ | ○ | ○ |
| Gas generation test | | ○ | ○ | ○ |

TABLE 4-3

| | | Example 53 | Example 54 | Example 55 |
|---|---|---|---|---|
| Base resin | Type | Base resin 3 | Base resin 3 | Base resin 3 |
| | Part by mass | 100 | 100 | 100 |
| Blocked polyisocyanate composition | | Example 38 | Example 39 | Example 40 |
| | Part by mass | 10.8 | 8.6 | 8.4 |
| Water | Part by mass | 27.7 | 26.1 | 26.0 |
| Appearance of coating solution | | ○ | ○ | ○ |
| Initial gel fraction | | ○ | ○ | ⊚ |
| Post-storage gel fraction retention rate | | ○ | ⊚ | ⊚ |
| pH change in coating solution before and after storage | | ○ | ○ | ○ |
| Gas generation test | | ○ | ○ | ○ |

TABLE 4-4

| | | Example 56 | Example 57 | Example 58 |
|---|---|---|---|---|
| Base resin | Type | Base resin 3 | Base resin 3 | Base resin 3 |
| | Part by mass | 100 | 100 | 100 |
| Blocked polyisocyanate composition | | Example 41 | Example 42 | Example 43 |
| | Part by mass | 8.2 | 9.7 | 7.0 |
| Water | Part by mass | 25.9 | 26.9 | 25.0 |
| Appearance of coating solution | | ○ | ○ | Δ |
| Initial gel fraction | | ⊚ | ○ | ○ |
| Post-storage gel fraction retention rate | | ⊚ | ⊚ | ○ |

TABLE 4-4-continued

|  | Example 56 | Example 57 | Example 58 |
|---|---|---|---|
| pH change in coating solution before and after storage | ○ | ○ | ○ |
| Gas generation test | ○ | ○ | ○ |

TABLE 4-5

|  |  | Example 59 | Example 60 | Example 61 |
|---|---|---|---|---|
| Base resin | Type | Base resin 3 | Base resin 3 | Base resin 3 |
|  | Part by mass | 100 | 100 | 100 |
| Blocked polyisocyanate composition |  | Example 44 | Example 45 | Example 46 |
|  | Part by mass | 8.2 | 7.9 | 7.6 |
| Water | Part by mass | 25.9 | 25.6 | 25.4 |
| Appearance of coating solution |  | ○ | ○ | ○ |
| Initial gel fraction |  | ◎ | ○ | ○△ |
| Post-storage gel fraction retention rate |  | ◎ | ◎ | ◎ |
| pH change in coating solution before and after storage |  | ○ | ○ | ○ |
| Gas generation test |  | ○ | ○ | ○ |

TABLE 4-6

|  |  | Reference Example 1 | Comparative Example 12 | Comparative Example 13 | Comparative Example 14 |
|---|---|---|---|---|---|
| Base resin | Type | Base resin 3 | Base resin 3 | Base resin 3 | Base resin 3 |
|  | Part by mass | 100 | 100 | 100 | 100 |
| Blocked polyisocyanate composition |  | Example 1 in Table 1 | Comparative Example 9 | Comparative Example 10 | Comparative Example 11 |
|  | Part by mass | 6.1 | 9.0 | 7.5 | 7.0 |
| Water | Part by mass | 24.4 | 26.4 | 25.4 | 25.0 |
| Appearance of coating solution |  | X | ○ | ○ | ○ |
| Initial gel fraction |  | –*30 | ◎ | XX | Δ |
| Post-storage gel fraction retention rate |  | –*30 | X | ◎ | Δ |
| pH change in coating solution before and after storage |  | –*30 | XX | ◎ | X |
| Gas generation test |  | –*30 | XX | ◎ | X |

The numbers with the symbol * in Table 4 represent the following notes, respectively.

*29 Acrylic emulsion (resin concentration: 42 mass %; hydroxyl value per unit of resin: 40 mg KOH/g; Tg: 20° C.; number average molecular weight: 100,000)

*30 Since the coating solution was separated in Reference Example 1, the physical properties thereof were not evaluated.

Example 62

Production of a Blocked Polyisocyanate Composition

The inside of a four-necked flask equipped with a stirrer, a thermometer, a reflux condenser, a nitrogen-supplying pipe and a dropping funnel was turned into with nitrogen atmosphere. Thereafter, 100 parts by mass of the polyisocyanate obtained in Production Example 1 (wherein the number of moles of isocyanate groups in this polyisocyanate was set to 100), 42.3 parts by mass of monomethoxy polyethylene glycol (trade name "Uniox M400" by NOF Corporation) having a number average molecular weight of 400 (corresponding to 20 mol % of the isocyanate groups in the polyisocyanate), and 107.1 parts by mass of diethylene glycol dimethyl ether were charged into the flask and they were maintained at 80° C. for 6 hours. Then, the temperature of the reaction solution was cooled to 60° C. Thereafter, 72.0 parts by mass of diethyl malonate (corresponding to 85 mol % of the isocyanate groups in the polyisocyanate) and 0.88 parts by mass of a 28% methanol solution of sodium methylate were added thereto, and the obtained mixture was then maintained for 4 hours. Then, 0.86 parts by mass of 2-ethylhexyl acid phosphate was added thereto. Thereafter, 45.5 parts by mass of diisopropylamine (corresponding to 85 mol % of the isocyanate groups in the polyisocyanate) was added thereto, then the temperature of the reaction solution was increased to 70° C. and the reaction solution was maintained for 5 hours. This reaction solution was analyzed by gas chromatography, by which it was confirmed that the reaction rate of diisopropylamine was 70%. Thereafter, this reaction solution was transferred into a round bottom flask, and vacuum distillation was then carried out using an evaporator at 60° C. at a degree of reduced pressure of 10 hPa for 30 minutes. The reaction solution was analyzed by gas chromatography, by which it was confirmed that 2.1 parts by mass of diisopropylamine remained (corresponding to 5 mol % of the blocked isocyanate groups) and 1.0 part by mass of ethanol remained (corresponding to 5 mol % of the blocked isocyanate groups). Thereafter, 24.2 parts by mass of N-ethylmorpholine (corresponding to 50 mol % of the blocked isocyanate groups) and diethylene glycol dimethyl ether were added thereto so as to obtain a blocked polyisocyanate composition having a solid concentration of 60 mass %. The physical properties of the obtained blocked polyisocyanate composition are shown in Table 5.

Examples 63-73, Comparative Example 15, and Reference Examples 2 and 3

Production of Blocked Polyisocyanate Compositions

The blocked polyisocyanate compositions were produced in the same manner as in Example 62 with the exception that the components and ratios shown in Table 5 were used. The physical properties of the obtained blocked polyisocyanate compositions are shown in Table 5.

TABLE 5-1

|  |  | Example 62 | Example 63 | Example 64 |
|---|---|---|---|---|
| Polyisocyanate |  | Production Example 1 | Production Example 2 | Production Example 3 |
| Average number of isocyanate groups(Part by mass) |  | 3.4 (100) | 5.1 (100) | 4.1 (100) |
| Solvent | Type | DMDG | DEDG | DEDG |
|  | Part by mass | 107.1 | 120.5 | 85.4 |
| Active hydrogen-containing hydrophilic compound |  | M400 | M550 | M1000 |
|  | Part by mass (Mol %) | 42.3 (20) | 39.1 (15) | 22.5 (5) |
| Malonic diester | Type | DEM | DEM | DIPM |
|  | Part by mass (Mol %) (b) | 72.0 (85) | 68.3 (90) | 88.9 (105) |
| 28% Sodium methylate | Part by mass | 0.88 | 0.86 | 0.85 |
| JP508T | Part by mass | 0.86 | 0.84 | 0.83 |
| Chain amine compound (c1) | Type | DIPA | DNBA | ECHA |
|  | Part by mass (Mol %) | 45.5 (85) | 24.5 (40) | 51.5 (90) |
| Nitrogen atom-containing cyclic amine compound (c2) | Type | None | 2,6-Dimethyl-piperidine | None |
|  | Part by mass (Mol %) | — (0) | 42.9 (80) | — (0) |
| (c1) + (c2)Mol %(c) |  | 85 | 120 | 90 |
| (c)/(b) |  | 1.0 | 1.3 | 0.9 |
| Amine reaction rate (%) |  | 70 | 60 | 70 |
| Operation or non-operation of third step (removal and purification) |  | Performed | Performed | Not performed |
| Remaining free amine amount |  |  |  |  |
| Mol % to BI group |  | 5 | 10 | 25 |
| Remaining alcohol amount *1 |  |  |  |  |
| Type of alcohol |  | Ethanol | Ethanol | Isopropanol |
| Mol % to BI group *2 |  | 5 | 5 | 75 |
| Basic compound | Type | NEMO *3 | TEA *4 | NMMO *6 |
|  | PKa | 7.7 | 7.8 | 7.4 |
|  | Part by mass | 24.2 | 11.9 | 43.5 |
| Mol % to BI group |  | 50 | 20 | 100 |
| Solid content Mass % |  | 60 | 60 | 60 |
| Mass % of effective NCO groups |  | 4.5 | 4.1 | 4.6 |
| Structure A | R1 | Ethyl group | Ethyl group | Isopropyl group |
|  | R3 | Isopropyl group | *5 | Ethyl group |
|  | R4 | Isopropyl group |  | Cyclohexyl group |
|  | x | 1.9 | 3.7 | 2.2 |
| B | R5 | <DEM> | <DEM> | <DIPM> |
|  | y | 0.8 | 0.6 | 1.7 |
| C | R6 | <M400> | <M550> | <M1000> |
|  | z | 0.7 | 0.8 | 0.2 |
| (x + y)/z Ratio |  | 3.9 | 5.4 | 19.5 |
| x/y Ratio |  | 2.4 | 6.2 | 1.3 |

45

TABLE 5-2

|  |  | Example 65 | Example 66 | Example 67 |
|---|---|---|---|---|
| Polyisocyanate |  | N75BA | ME20-100 | T1890E |
| Average number of isocyanate groups(Part by mass) |  | 3.4 (100) | 8.0 (100) | 3.2 (100) |
| Solvent | Type | DMP | DMDP | DMDG |
|  | Part by mass | 69.4 | 91.5 | 35.9 |
| Active hydrogen-containing hydrophilic compound |  | M400 | MPG081 | M550 |
|  | Part by mass (Mol %) | 55.0 (35) | 27.5 (20) | 31.2 (20) |
| Malonic diester | Type | DEM | DMM | DEM |
|  | Part by mass (Mol %) (b) | 44.1 (70) | 23.8 (85) | 40.8 (90) |
| 28% Sodium methylate | Part by mass | 0.72 | 0.63 | 0.58 |
| JP508T | Part by mass | 0.70 | 0.61 | 0.57 |
| Chain amine compound (c1) | Type | DIPA | DIPA | DIPA |
|  | Part by mass (Mol %) | 35.8 (90) | 17.4 (85) | 34.4 (120) |
| Nitrogen atom-containing cyclic amine compound (c2) | Type | None | None | None |
|  | Part by mass (Mol %) | — (0) | — (0) | — (0) |
| (c1) + (c2)Mol %(c) |  | 90 | 85 | 120 |
| (c)/(b) |  | 1.3 | 1.0 | 1.3 |

TABLE 5-2-continued

|  |  |  | Example 65 | Example 66 | Example 67 |
|---|---|---|---|---|---|
| Amine reaction rate (%) |  |  | 60 | 70 | 60 |
| Operation or non-operation of third step (removal and purification) |  |  | Performed | Performed | Performed |
| Remaining free amine amount |  |  |  |  |  |
| Mol % to BI group |  |  | 5 | 5 | 10 |
| Remaining alcohol amount |  |  |  |  |  |
| Type of alcohol |  |  | Ethanol | Ethanol | Ethanol |
| Mol % to BI group |  |  | 5 | 5 | 5 |
| Basic compound | Type |  | 2MIM *7 | IM *8 | MO *9 |
|  | PKa |  | 7.8 | 7.0 | 8.4 |
|  | Part by mass |  | 21.2 | 4.5 | 7.9 |
| Mol % to BI group |  |  | 100 | 40 | 40 |
| Solid content | Mass % |  | 60 | 60 | 60 |
| Mass % of effective NCO groups |  |  | 3.4 | 2.6 | 3.8 |
| Structure | A | R1 | Ethyl group | Methyl group | Ethyl group |
|  |  | R3 | Isopropyl group | Isopropyl group | Isopropyl group |
|  |  | R | Isopropyl group | Isopropyl group | Isopropyl group |
|  |  | x | 1.8 | 4.8 | 2.3 |
|  | B | R5 | <DEM> | <DMM> | <DEM> |
|  |  | y | 0.4 | 1.6 | 0.3 |
|  | C | R6 | <M400> | <MPG081> | <M550> |
|  |  | z | 1.2 | 1.6 | 0.6 |
| (x + y)/z Ratio |  |  | 1.8 | 4.0 | 4.3 |
| x/y Ratio |  |  | 4.5 | 3.0 | 7.7 |

TABLE 5-3

|  |  | Example 68 | Example 69 | Example 70 |
|---|---|---|---|---|
| Polyisocyanate |  | Coronate L | Production Example 2 | Production Example 2 |
| Average number of isocyanate groups(Part by mass) |  | 3.5 (100) | 5.1 (100) | 5.1 (100) |
| Solvent | Type | DEDG | DEDG | DEDG |
|  | Part by mass | 55.0 | 89.8 | 94.7 |
| Active hydrogen-containing hydrophilic compund |  | M550 | M1000 | HPA |
|  | Part by mass (Mol %) | 43.2 (25) | 47.4 (10) | 11.2 (20) |
| Malonic diester | Type | DEM | DEM | DEM |
|  | Part by mass (Mol %) (b) | 40.3 (80) | 60.7 (80) | 64.5 (85) |
| 28% Sodium methylate | Part by mass | 0.66 | 0.87 | 0.72 |
| JP508T | Part by mass | 0.64 | 0.85 | 0.71 |
| Chain amine compound (c1) | Type | DIPA | DIPA | DIPA |
|  | Part by mass (Mol %) | 25.4 (80) | 47.9 (100) | 38.4 (80) |
| Nitrogen atom-containing cyclic amine compound (c2) | Type | None | None | 2,2,6,6-Tetramethyl-piperidine |
|  | Part by mass (Mol %) | — (0) | — (0) | 20.1 (30) |
| (c1) + (c2)Mol %(c) |  | 80 | 100 | 110 |
| (c)/(b) |  | 1.0 | 1.3 | 1.3 |
| Amine reaction rate (%) |  | 70 | 70 | 60 |
| Operation or non-operation of third step (removal and purification) |  | Performed | Performed | Performed |
| Remaining free amine amount |  |  |  |  |
| Mol % to BI group |  | 5 | 5 | 10 |
| Remaining alcohol amount |  |  |  |  |
| Type of alcohol |  | Ethanol | Ethanol | Ethanol |
| Mol % to BI group |  | 5 | 5 | 5 |
| Basic compound | Type | NEMO | NMMO | NMMO |
|  | PKa | 7.7 | 7.4 | 7.4 |
|  | Part by mass | 19.1 | 42.8 | 21.5 |
| Mol % to BI group |  | 70 | 100 | 50 |
| Solid content Mass % |  | 60 | 60 | 60 |
| Mass % of effective NCO groups |  | 3.5 | 4.4 | 4.5 |
| Structure A | R1 | Ethyl group | Ethyl group | Ethyl group |
|  | R3 | Isopropyl group | Isopropyl group | *10 |

TABLE 5-3-continued

|   |    |             | Example 68      | Example 69      | Example 70 |
|---|----|-------------|-----------------|-----------------|------------|
|   |    | R           | Isopropyl group | Isopropyl group |            |
|   |    | x           | 2.0             | 3.6             | 3.4        |
| B | R5 |             | <DEM>           | <DEM><DIPA>     | <DEM>      |
|   |    | y           | 0.6             | 1.0             | 0.7        |
| C | R6 |             | <M550>          | <M1000>         | <HPA>      |
|   |    | z           | 0.9             | 0.5             | 1.0        |
| (x + y)/z Ratio | | |  2.9            | 9.2             | 4.1        |
| x/y Ratio |     | |  3.3            | 3.6             | 4.9        |

TABLE 5-4

|   |   |   | Example 71 | Example 72 | Example 73 |
|---|---|---|------------|------------|------------|
| Polyisocyanate | | | Production Example 2 | Production Example 2/ T1890E = 50/50 | Production Example 2 |
| Average number of isocyanate groups(Part by mass) | | | 5.1 (100) | 3.9 (100) | 5.1 (100) |
| Solvent | Type | | DEDG | DEDG | DEDG |
|  | Part by mass | | 101.8 | 57.7 | 111.2 |
| Active hydrogen-containing hydrophilic compound | | | 205BA | MPG081 | M1000 |
|  | Part by mass (Mol %) | | 11.9 (10) | 51.5 (20) | 47.4 (10) |
| Malonic diester | Type | | DEM | DEM | DEM |
|  | Part by mass (Mol %) (b) | | 72.1 (95) | 60.6 (100) | 60.7 (80) |
| 28% Sodium methylate | Part by mass | | 0.76 | 0.78 | 0.87 |
| JP508T | Part by mass | | 0.74 | 0.77 | 0.85 |
| Chain amine compound (c1) | Type | | None | DIPA | DIPA |
|  | Part by mass (Mol %) | | — (0) | 38.3 (100) | 47.9 (100) |
| Nitrogen atom-containing cyclic amine compound (c2) | Type | | 2,6-Dimethyl-piperidine | 2-Methyl-piperidine | None |
|  | Part by mass (Mol %) | | 51.0 (95) | 18.8 (50) | — (0) |
| (c1) + (c2)Mol %(c) | | | 95 | 150 | 100 |
| (c)/(b) | | | 1.0 | 1.5 | 1.3 |
| Amine reaction rate (%) | | | 70 | 50 | 70 |
| Operation or non-operation of third step (removal and purification) | | | Performed | Performed | Not performed |
| Remaining free amine amount | | | | | |
| Mol % to BI group | | | 10 | 10 | 30 |
| Remaining alcohol amount | | | | | |
| Type of alcohol | | | Ethanol | Ethanol | Ethanol |
| Mol % to BI group | | | 5 | 5 | 60 |
| Basic compound | Type | | NEMO | NMMO | NMMO |
|  | PKa | | 7.7 | 7.4 | 7.4 |
|  | Part by mass | | 13.0 | 21.6 | 21.4 |
| Mol % to BI group | | | 30 | 50 | 50 |
| Solid content | Mass % | | 60 | 60 | 60 |
| Mass % of effective NCO groups | | | 5.1 | 3.9 | 4.4 |
| Structure | A | R1 | Ethyl group | Ethyl group | Ethyl group |
|  |  | R3 | *5 | Isopropyl group | Isopropyl group |
|  |  | R  |  | Isopropyl group | Isopropyl group |
|  |  | x  | 3.3 | 2.9 | 3.1 |
|  | B | R5 | <DEM> | <DEM> | <DEM><DIPA> |
|  |  | y  | 0.8 | 0.2 | 1.5 |
|  | C | R6 | <205BA> | <MPG081> | <M1000> |
|  |  | z  | 1.0 | 0.8 | 0.5 |
| (x + y)/z Ratio | | | 4.1 | 3.9 | 9.2 |
| x/y Ratio | | | 4.1 | 14.5 | 2.1 |

TABLE 5-5

|  | Reference Example 2 | Reference Example 3 | Comparative Example 15 |
|---|---|---|---|
| Polyisocyanate | Production Example 2 | Production Example 3 | Production Example 1 |
| Average number of isocyanate groups(Part by mass) | 5.1 (100) | 4.1 (100) | 3.4 (100) |
| Solvent Type | DEDG | DEDG | DMDG |
| Part by mass | 76.1 | 41.9 | 130.3 |
| Active hydrogen-containing hydrophilic compound | M1000 | M1000 | M400 |
| Part by mass (Mol %) | 47.4 (10) | 22.5 (5) | 42.3 (20) |
| Malonic diester Type | DEM | DIPM | DEM |
| Part by mass (Mol %) (b) | 60.7 (80) | 88.9 (105) | 33.9 (40) |
| 28% Sodium methylate Part by mass | 0.87 | 0.85 | 0.72 |
| JP508T Part by mass | 0.85 | 0.83 | 0.70 |
| Chain amine compound (c1) Type | DIPA | ECHA | DIPA |
| Part by mass (Mol %) | 47.9 (100) | 51.5 (90) | 21.4 (40) |
| Nitrogen atom-containing cyclic amine compound (c2) Type | None | None | None |
| Part by mass (Mol %) | — (0) | — (0) | — (0) |
| (c1) + (c2)Mol %(c) | 100 | 90 | 40 |
| (c)/(b) | 1.3 | 0.9 | 1.0 |
| Amine reaction rate (%) | 70 | 70 | 100 |
| Operation or non-operation of third step (removal and purification) | Performed | Performed | Performed |
| Remaining free amine amount |  |  |  |
| Mol % to BI group | 5 | 10 | 0 |
| Remaining alcohol amount |  |  |  |
| Type of alcohol | Ethanol | Isopropanol | None |
| Mol % to BI group | 5 | 10 | 0 |
| Basic compound Type | DMEA *11 | Pyridine *12 | None |
| PKa | 9.4 | 5.1 | — |
| Part by mass | 56.5 | 34.1 | — |
| Mol % to BI group | 150 | 100 | 0 |
| Solid content Mass % | 60 | 60 | 60 |
| Mass % of effective NCO groups | 4.4 | 4.6 | 5.4 |
| Structure A R1 | Ethyl group | Isopropyl group | — |
| R3 | Isopropyl group | Ethyl group | — |
| R | Isopropyl group | Cyclohexyl group | — |
| x | 3.1 | 2.2 | 0 |
| B R5 | <DEM><DIPA> | <DIPM><DIPA> | <DEM><DIPA> |
| y | 1.5 | 1.7 | 2.7 |
| C R6 | <M1000> | <M1000> | <M400> |
| z | 0.5 | 0.2 | 0.7 |
| (x + y)/z Ratio | 9.2 | 19.5 | 3.9 |
| x/y Ratio | 2.1 | 1.3 | 0 |

The numbers with the symbol * in Table 5 represent the following notes, respectively. In Table 5, the same abbreviations as those used in Tables 1 and 3 have the same definitions as those used in the tables.

*1 Amount of remaining alcohol compound dissociated as result of reaction of ester groups in reaction product of polyisocyanate with malonic diester of the first step, with organic amine compound
*2 Mol % to blocked isocyanate groups
*3 NEMO: N-ethylmorpholine, Pka: 7.7
*4 TEA: triethanolamine, Pka: 7.8
*5 Mixture of R3 and R4, derived from DNBA as chain amine compound and 2,6-dimethylpiperidine as nitrogen atom-containing cyclic amine compound
*6 NMMO: N-methylmorpholine, Pka: 7.4
*7 2MIM: 2-methylimidazole, Pka: 7.8
*8 IM: imidazole, Pka: 7.0
*9 MO: morpholine, Pka: 8.4
*10 Mixture of R3 and R4, derived from DIPA as chain amine compound and 2,2,6,6-tetramethylpiperidine as nitrogen atom-containing cyclic amine compound
*11 DMEA: dimethylethanolamine, Pka: 9.4
*12 Pyridine, Pka: 5.4

Example 74

Evaluation of Blocked Polyisocyanate Composition 100 parts by mass of an acrylic emulsion (hydroxyl value per unit of resin: 40 mg KOH/g; acid value per unit of resin: 13 mg KOH/g; Tg: 20° C.; number average molecular weight: 100,000; resin concentration: 42 mass %; adjusted to pH 8.5 with dimethylethanolamine) as a base resin, 14.0 parts by mass of the blocked polyisocyanate composition obtained in Example 62 (wherein the components were mixed so that the ratio (A/B) of the molar equivalent A of effective NCO groups in the blocked polyisocyanate composition to the molar equivalent B of hydroxyl groups in the base resin could be A/B=0.5), and 30.0 parts by mass of water were mixed with each other (wherein they were mixed so that the solid content of coating material could be 35 mass %). Thereafter, the mixture was finally adjusted so that the pH of the coating solution could have 8.5 by adding dimethylethanolamine thereto. Thus produced coating solution was left at room temperature for 2 hours, and the appearance of the coating solution was then observed. Thereafter, the coating solution was applied with an applicator so that the thickness of a film became 40 μm after drying. Then, it was baked at 90° C. for 30 minutes and the initial gel fraction was measured. The result is shown in Table 6. After the mixing of this coating material, it was stored at 40° C. for 10 days. Thereafter, the coating solution was applied by the same method as that described above, and the post-storage gel fraction was then measured. The result of the post-storage gel fraction retention rate is shown in Table 6. Moreover, the pH of the coating solution was measured after storage at 40° C. for 10 days. The result is shown in Table 6.

28.0 g of the blocked polyisocyanate composition obtained in Example 62 (corresponding to 30 mmol of effective NCO groups) was mixed with 172.0 g of water (in such a manner that the total mass became 200.0 g) so as to obtain an aqueous solution of the blocked polyisocyanate composition. The amount of gas (carbon dioxide) generated during storage of this solution at 40° C. for 10 days was measured. The result is shown in Table 6.

Reference Example 5

Evaluation of Blocked Polyisocyanate Composition 100 parts by mass of an acrylic emulsion (hydroxyl value per unit of resin: 40 mg KOH/g; acid value per unit of resin: 13 mg KOH/g; Tg: 20° C.; number average molecular weight: 100,000; resin concentration: 42 mass %; adjusted to pH 8.5 with dimethylethanolamine) as a base resin, 8.6 parts by mass of the blocked polyisocyanate composition obtained in Reference Example 2 (wherein these components were mixed with each other so that the ratio (A/B) of the molar equivalent A of effective NCO groups in the blocked polyisocyanate composition to the molar equivalent B of hydroxyl groups in the base resin could be A/B=0.3), and 26.1 parts by mass of water were mixed with each other so that the solid content of coating material could be adjusted to 35 mass %. At this point, the pH of the coating solution was measured. The pH had already reached 9.6, and the pH of the coating solution could not be adjusted to 8.5. Thus produced coating solution was left at room temperature for 2 hours, and the appearance of the coating solution was then observed. Thereafter, the coating solution was applied with an applicator so that the thickness of a film became 40 μm after drying. Then, it was baked at 90° C. for 30 minutes and the initial gel fraction was measured. The result is shown in Table 6. After the mixing of this coating material, it was stored at 40° C. for 10 days. Thereafter, the coating solution was applied by the same method as that described above, and the post-storage gel fraction was then measured. The result of the post-storage gel fraction retention rate is shown in Table 6. Moreover, the pH of the coating solution was measured after storage at 40° C. for 10 days. The result is shown in Table 6. The pH change in this case was measured as an amount changed from the initial value as in the case of Example 74. However, since the initial value was different from that in the example (i.e. higher than 8.5), the value was described in the parentheses ( ).

28.6 g of the blocked polyisocyanate composition obtained in Reference Example 2 (corresponding to 30 mmol of effective NCO groups) was mixed with 171.4 g of water (in such a manner that the total mass became 200.0 g) so as to obtain an aqueous solution of the blocked polyisocyanate composition. The amount of gas (carbon dioxide) generated during storage of this solution at 40° C. for 10 days was measured. The result is shown in Table 6.

Examples 75-85, Reference Examples 4 and 6, and Comparative Example 16

Evaluation of Blocked Polyisocyanate Compositions

The blocked polyisocyanate compositions were produced and evaluated in the same manner as in Example 74 with the exception that the components and ratios shown in Table 6 were used. The evaluation results of the blocked polyisocyanate compositions are shown in Table 6.

TABLE 6-1

|  |  | Example 74 | Example 75 | Example 76 | Example 77 |
| --- | --- | --- | --- | --- | --- |
| Blocked polyisocyanate composition |  | Example 62 | Example 63 | Example 64 | Example 65 |
|  | Part by mass | 14.0 | 9.2 | 13.7 | 11.1 |
| Polyol |  | Base resin 4 *13 | Base resin 4 | Base resin 4 | Base resin 4 |
|  | Part by mass | 100 | 100 | 100 | 100 |
| NCO/OH ratio |  | 0.5 | 0.3 | 0.5 | 0.3 |
| Water | Part by mass | 30.0 | 26.6 | 29.8 | 27.9 |
| Coating material solid content wt % |  | 35.0 | 35.0 | 35.0 | 35.0 |
| pH adjustment during coating solution preparation |  | ○ | ○ | ○ | ○ |
| Initial gel fraction |  | ◎ | ○ | ○ | ◎ |
| Post-storage gel fraction retention rate |  | ◎ | ○ | ○ | ◎ |
| pH change in coating solution before and after storage |  | ◎◎ | ◎ | ◎ | ◎◎ |
| Gas generation test |  | ◎◎ | ◎ | ◎ | ◎◎ |

TABLE 6-2

|  |  | Example 78 | Example 79 | Example 80 | Example 81 |
|---|---|---|---|---|---|
| Blocked polyisocyanate composition |  | Example 66 | Example 67 | Example 68 | Example 69 |
|  | Part by mass | 14.5 | 9.9 | 10.8 | 81.7 |
| Polyol |  | Base resin 4 | Base resin 4 | Base resin 4 | Base resin 5 *14 |
|  | Part by mass | 100 | 100 | 100 | 100 |
| NCO/OH ratio |  | 0.3 | 0.3 | 0.3 | 1.0 |
| Water | Part by mass | 30.3 | 27.1 | 27.7 | 207.7 |
| Coating material solid content wt % |  | 35.0 | 35.0 | 35.0 | 28.0 |
| pH adjustment during coating solution preparation |  | ○ | ○ | ○ | ○ |
| Initial gel fraction |  | ◎ | ○ | ○ | ○ |
| Post-storage gel fraction retention rate |  | ○ | ◎ | ○ | ◎ |
| pH change in coating solution before and after storage |  | ◎ | ◎ | ◎◎ | ◎◎ |
| Gas generation test |  | ◎ | ◎ | ◎◎ | ◎◎ |

TABLE 6-3

|  |  | Example 82 | Example 83 | Example 84 | Example 85 |
|---|---|---|---|---|---|
| Blocked polyisocyanate composition |  | Example 70 | Example 71 | Example 72 | Example 73 |
|  | Part by mass | 8.4 | 12.3 | 9.7 | 8.6 |
| Polyol |  | Base resin 4 | Base resin 4 | Base resin 4 | Base resin 4 |
|  | Part by mass | 100 | 100 | 100 | 100 |
| NCO/OH ratio |  | 0.3 | 0.5 | 0.3 | 0.3 |
| Water | Part by mass | 26.0 | 28.8 | 26.9 | 26.1 |
| Coating material solid content wt % |  | 35.0 | 35.0 | 35.0 | 35.0 |
| pH adjustment during coating solution preparation |  | ○ | ○ | ○ | ○ |
| Initial gel fraction |  | ◎ | ◎ | ○ | ○ |
| Post-storage gel fraction retention rate |  | ◎ | ◎ | ◎ | ◎ |
| pH change in coating solution before and after storage |  | ◎◎ | ◎◎ | ◎◎ | ◎ |
| Gas generation test |  | ◎◎ | ◎◎ | ◎◎ | ◎ |

TABLE 6-4

|  |  | Reference Example 4 | Reference Example 5 | Reference Example 6 | Comparative Example 16 |
|---|---|---|---|---|---|
| Blocked polyisocyanate composition |  | Example 32 in Table 3 | Reference Example 2 | Reference Example 3 | Comparative Example 15 |
|  | Part by mass | 8.4 | 8.6 | 8.2 | 7.0 |
| Polyol |  | Base resin 4 | Base resin 4 | Base resin 4 | Base resin 4 |
|  | Part by mass | 100 | 100 | 100 | 100 |
| NCO/OH ratio |  | 0.3 | 0.3 | 0.3 | 0.3 |
| Water | Part by mass | 26.0 | 26.1 | 25.9 | 25.0 |
| Coating material solid content wt % |  | 35.0 | 35.0 | 35.0 | 35.0 |
| pH adjustment during coating solution preparation |  | ○ | X | ○ | ○ |
| Initial gel fraction |  | ◎ | ◎ | ○ | Δ |
| Post-storage gel fraction retention rate |  | ◎ | ◎ | ◎ | Δ |
| pH change in coating solution before and after storage |  | ○ | (○) *15 | ○ | X |
| Gas generation test |  | ○ | ◎ | ○ | X |

The numbers with the symbol * in Table 6 represent the following notes, respectively.

*13 Acrylic emulsion (resin concentration: 42 mass %; medium: water; hydroxyl value per unit of resin: 40 mg KOH/g; acid value per unit of resin: 13 mg KOH/g; Tg: 20° C.; number average molecular weight: 100,000)

*14 Acrylic polyol (resin concentration: 60 mass %; solvent: DMDG; hydroxyl value per unit of resin: 80 mg KOH/g; acid value per unit of resin: 47 mg KOH/g; Tg: 30° C.; number average molecular weight: 7,400)

*15 The pH became higher than 8.5 during the preparation of a coating solution and the pH could not be adjusted to 8.5 with dimethylethanolamine. Thus, the initial value in pH change measurement was defined as the concerned pH (higher than 8.5), and the resultant value was described in the parentheses ( ).

From the results of the above-described Examples, Comparative Examples, and Reference Examples, it was found that the blocked polyisocyanate composition of the present invention was crosslinkable at a baking temperature of 100° C. or lower and had excellent moisture stability, and also that the present blocked polyisocyanate composition had excellent storage stability (pH change, gas generation, post-storage curability, etc.) when it was used as an aqueous coating composition.

INDUSTRIAL APPLICABILITY

The blocked polyisocyanate composition of the present invention can be preferably used as a coating composition that has an excellent low-temperature curability, excellent moisture stability, and an excellent post-storage curability.

The invention claimed is:

1. A blocked polyisocyanate composition comprising at least one blocked polyisocyanate represented by a formula (I):

  (I)

wherein R represents a residue of a polyisocyanate made from one or two or more selected from an aliphatic polyisocyanate, an alicyclic polyisocyanate and an aromatic polyisocyanate, from which isocyanate groups thereof are excluded, wherein the R is bound to a substituent(s) including A and a substituent(s) including B; A represents one or two or more kinds of a keto form represented by a formula (II) shown below or an enol isomer(s) thereof; B represents one or two or more kinds of a structural unit represented by a formula (III); and a total of x and y is from 2.0 to 20, x is not 0, and y is not 0,

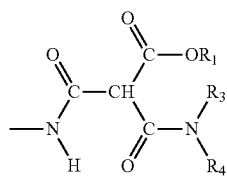  (II)

wherein $R_1$ represents an alkyl group containing 1 to 8 carbon atoms, a phenyl group or a benzyl group; and $R_3$ and $R_4$ may be identical to or different from each other, and they each represents a hydrocarbon group containing 1 to 30 carbon atoms, which optionally contains at least one selected from an ether bond, an ester bond, a hydroxyl group, a carbonyl group, and a thiol group, wherein the $R_3$ and the $R_4$ may be bonded to each other to form a 5- or 6-membered cycloalkyl group, or the $R_3$ and the $R_4$ may form a 3-, 4-, 5-, or 6-membered ring together with a nitrogen atom sandwiched between the $R_3$ and the $R_4$, the ring optionally containing a nitrogen or oxygen atom as an additional crosslinking member,

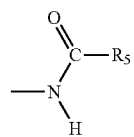  (III)

wherein $R_5$ represents a residue of an active hydrogen-containing compound, from which an active hydrogen is excluded.

2. The blocked polyisocyanate composition according to claim 1, wherein the $R_3$ and the $R_4$ in the formula (II) both represent a branched alkyl group containing 3 to 6 carbon atoms.

3. The blocked polyisocyanate composition according to claim 1, wherein the $(R_3)(R_4)$N— in the formula (II) represents a connected structure represented by a formula (IV):

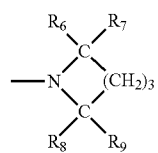  (IV)

wherein $R_6$, $R_7$, $R_8$, and $R_9$ each independently represents hydrogen or a methyl group, and at least one of them is a methyl group.

4. The blocked polyisocyanate composition according to claim 1, wherein the x and the y in the formula (I) meet the equation: $x/y \geq 1$.

5. The blocked polyisocyanate composition according to claim 1, wherein at least part of the blocked polyisocyanate of the formula (I) is at least one blocked polyisocyanate represented by a formula (V):

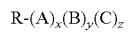  (V)

wherein R represents a residue of a polyisocyanate made from one or two or more selected from an aliphatic polyisocyanate, an alicyclic polyisocyanate and an aromatic polyisocyanate, from which isocyanate groups thereof are excluded;

A represents one or two or more kinds of a keto form represented by the formula (II) or an enol isomer(s) thereof;

B represents one or two or more kinds of a structural unit represented by the above formula (III);

C represents one or two or more kinds of a structural unit represented by a formula (VI); and x+y+z=2.0 to 20, and any of x and z is not 0,

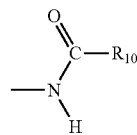  (VI)

wherein $R_{10}$ represents a residue of an active hydrogen-containing hydrophilic compound, from which an active hydrogen is excluded.

6. The blocked polyisocyanate composition according to claim 5, wherein the x, the y, and the z in the formula (V) meet the equation: $49 \geq (x+y)/z \geq 1$ and $x/y \geq 1$.

7. The blocked polyisocyanate composition according to claim 1, which comprises a basic compound (e) having an acid dissociation constant (PKa) of 7.0 to 8.5 in an amount of 10 mol % or more based on blocked isocyanate groups of the blocked polyisocyanate composition, wherein a number of moles of the blocked isocyanate groups in the formula (I) is indicated as a number of moles on the basis of isocyanate groups derived from the polyisocyanate serving as a precursor.

8. A coating composition comprising the blocked polyisocyanate composition according to claim 1 and a polyol.

9. The coating composition according to claim 8, which is an aqueous coating composition.

10. A coating film formed from a coating composition according to claim 8.

11. A method for producing a blocked polyisocyanate composition, which comprises: a first step of adding a malonic diester (b) represented by a formula (VII) to a polyisocyanate (a) having, as a skeleton, one or two or more selected from the group consisting of an aliphatic polyisocyanate, an alicyclic polyisocyanate, and an aromatic polyisocyanate, in an amount of 75 to 150 mol % based on isocyanate groups of the polyisocyanate (a) so that the isocyanate groups of the polyisocyanate (a) are allowed to react with the malonic diester (b); and a second step of allowing a product obtained in the first step to react with one or two or more kinds of an organic amine compound (c) represented by a formula (VIII):

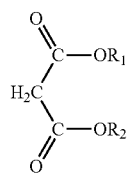
(VII)

wherein $R_1$ and $R_2$ each independently represents an alkyl group containing 1 to 8 carbon atoms, a phenyl group or a benzyl group, and the $R_1$ and the $R_2$ may be identical to or different from each other,

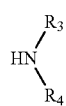
(VIII)

wherein $R_3$ and $R_4$ may be identical to or different from each other, and they each represents a hydrocarbon group containing 1 to 30 carbon atoms, which optionally contains at least one selected from an ether bond, an ester bond, a hydroxyl group, a carbonyl group, and a thiol group, wherein the $R_3$ and the $R_4$ may be bonded to each other to form a 5- or 6-membered cycloalkyl group, or the $R_3$ and the $R_4$ may form a 3-, 4-, 5-, or 6-membered ring together with a nitrogen atom sandwiched between the $R_3$ and the $R_4$, the ring optionally containing a nitrogen or oxygen atom as an additional crosslinking member.

12. The method for producing a blocked polyisocyanate composition according to claim 11, wherein the first step is a step of adding the malonic diester (b) and the active hydrogen-containing hydrophilic compound (d) to the polyisocyanate (a), in a total amount of the malonic diester (b) and the active hydrogen-containing hydrophilic compound (d) of 77 to 150 mol % based on the isocyanate groups of the polyisocyanate so that the polyisocyanate (a) is allowed to react with the malonic diester (b) and the active hydrogen-containing hydrophilic compound (d).

13. The method for producing a blocked polyisocyanate composition according to claim 12, wherein the first step is a step of allowing the polyisocyanate (a) to react with the active hydrogen-containing hydrophilic compound (d) and then subjecting a resultant product to a further reaction with the malonic diester (b).

14. The method for producing a blocked polyisocyanate composition according to claim 11, wherein, in the second step, the one or two or more kinds of the organic amine compound (c) is added to a product obtained in the first step, in an amount of 50 to 500 mol % based on the isocyanate groups of the polyisocyanate (a) so that the organic amine compound (c) is allowed to react with the product obtained in the first step.

15. The method for producing a blocked polyisocyanate composition according to claim 11, wherein a third step of removing the organic amine compound (c) for purifying the composition is carried out after the first step and the second step.

16. The method for producing a blocked polyisocyanate composition according to claim 15, wherein, in the third step, the organic amine compound (c) and an alcohol compound dissociated as a result of the reaction of an ester group of the product obtained in the first step with the organic amine compound, are removed for purifying the composition.

17. The method for producing a blocked polyisocyanate composition according to claim 15, wherein a basic compound (e) having an acid dissociation constant (PKa) of 7.0 to 8.5 is added after the first step, the second step, and the third step.

18. The blocked polyisocyanate composition according to claim 2, wherein the x and the y in the formula (I) meet the equation: $x/y \geq 1$.

19. The blocked polyisocyanate composition according to claim 3, wherein the x and the y in the formula (I) meet the equation: $x/y \geq 1$.

20. The blocked polyisocyanate composition according to claim 2, wherein at least part of the blocked polyisocyanate of the formula (I) is at least one blocked polyisocyanate represented by a formula (V):

$$R-(A)_x(B)_y(C)_z \qquad (V)$$

wherein R represents a residue of a polyisocyanate made from one or two or more selected from an aliphatic polyisocyanate, an alicyclic polyisocyanate and an aromatic polyisocyanate, from which isocyanate groups thereof are excluded;

A represents one or two or more kinds of a keto form represented by the formula (II) or an enol isomer(s) thereof;

B represents one or two or more kinds of a structural unit represented by the above formula (III);

C represents one or two or more kinds of a structural unit represented by a formula (VI); and x+y+z=2.0 to 20, and any of x and z is not 0,

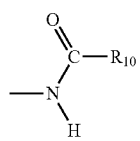

wherein $R_{10}$ represents a residue of an active hydrogen-containing hydrophilic compound, from which an active hydrogen is excluded.

21. The blocked polyisocyanate composition according to claim 3, wherein at least part of the blocked polyisocyanate of the formula (I) is at least one blocked polyisocyanate represented by a formula (V):

wherein R represents a residue of a polyisocyanate made from one or two or more selected from an aliphatic polyisocyanate, an alicyclic polyisocyanate and an aromatic polyisocyanate, from which isocyanate groups thereof are excluded;
A represents one or two or more kinds of a keto form represented by the formula (II or an enol isomer(s) thereof;
B represents one or two or more kinds of a structural unit represented by the above formula (III);
C represents one or two or more kinds of a structural unit represented by a formula (VI); and
x+y+z=2.0 to 20, and any of x and z is not 0,

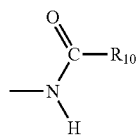

wherein $R_{10}$ represents a residue of an active hydrogen-containing hydrophilic compound, from which an active hydrogen is excluded.

22. The blocked polyisocyanate composition according to claim 20, wherein the x, the y, and the z in the formula (V) meet the equation: $49 \geq (x+y)/z \geq 1$ and $x/y \geq 1$.

23. The blocked polyisocyanate composition according to claim 21, wherein the x, the y, and the z in the formula (V) meet the equation: $49 \geq (x+y)/z \geq 1$ and $x/y \geq 1$.

24. The blocked polyisocyanate composition according to claim 2, which comprises a basic compound (e) having an acid dissociation constant (PKa) of 7.0 to 8.5 in an amount of 10 mol % or more based on blocked isocyanate groups of the blocked polyisocyanate composition, wherein a number of moles of the blocked isocyanate groups in the formula (I) is indicated as a number of moles on the basis of isocyanate groups derived from the polyisocyanate serving as a precursor.

25. The blocked polyisocyanate composition according to claim 3, which comprises a basic compound (e) having an acid dissociation constant (PKa) of 7.0 to 8.5 in an amount of 10 mol % or more based on blocked isocyanate groups of the blocked polyisocyanate composition, wherein a number of moles of the blocked isocyanate groups in the formula (I) is indicated as a number of moles on the basis of isocyanate groups derived from the polyisocyanate serving as a precursor.

26. A coating composition comprising the blocked polyisocyanate composition according to claim 2 and a polyol.

27. A coating composition comprising the blocked polyisocyanate composition according to claim 3 and a polyol.

28. The coating composition according to claim 26, which is an aqueous coating composition.

29. The coating composition according to claim 27, which is an aqueous coating composition.

30. A coating film formed from a coating composition according to claim 26.

31. A coating film formed from a coating composition according to claim 27.

32. The method for producing a blocked polyisocyanate composition according to claim 12, wherein, in the second step, the one or two or more kinds of the organic amine compound (c) is added to a product obtained in the first step, in an amount of 50 to 500 mol % based on the isocyanate groups of the polyisocyanate (a) so that the organic amine compound (c) is allowed to react with the product obtained in the first step.

33. The method for producing a blocked polyisocyanate composition according to claim 13, wherein, in the second step, the one or two or more kinds of the organic amine compound (c) is added to a product obtained in the first step, in an amount of 50 to 500 mol % based on the isocyanate groups of the polyisocyanate (a) so that the organic amine compound (c) is allowed to react with the product obtained in the first step.

34. The method for producing a blocked polyisocyanate composition according to claim 12, wherein a third step of removing the organic amine compound (c) for purifying the composition is carried out after the first step and the second step.

35. The method for producing a blocked polyisocyanate composition according to claim 13, wherein a third step of removing the organic amine compound (c) for purifying the composition is carried out after the first step and the second step.

36. The method for producing a blocked polyisocyanate composition according to claim 14, wherein a third step of removing the organic amine compound (c) for purifying the composition is carried out after the first step and the second step.

37. The method for producing a blocked polyisocyanate composition according to claim 34, wherein, in the third step, the organic amine compound (c) and an alcohol compound dissociated as a result of the reaction of an ester group of the product obtained in the first step with the organic amine compound, are removed for purifying the composition.

38. The method for producing a blocked polyisocyanate composition according to claim 35, wherein, in the third step, the organic amine compound (c) and an alcohol compound dissociated as a result of the reaction of an ester group of the product obtained in the first step with the organic amine compound, are removed for purifying the composition.

39. The method for producing a blocked polyisocyanate composition according to claim 36, wherein, in the third step, the organic amine compound (c) and an alcohol compound dissociated as a result of the reaction of an ester group of the product obtained in the first step with the organic amine compound, are removed for purifying the composition.

40. The method for producing a blocked polyisocyanate composition according to claim 34, wherein a basic compound (e) having an acid dissociation constant (PKa) of 7.0 to 8.5 is added after the first step, the second step, and the third step.

41. The method for producing a blocked polyisocyanate composition according to claim 35, wherein a basic compound (e) having an acid dissociation constant (PKa) of 7.0 to 8.5 is added after the first step, the second step, and the third step.

42. The method for producing a blocked polyisocyanate composition according to claim 36, wherein a basic compound (e) having an acid dissociation constant (PKa) of 7.0 to 8.5 is added after the first step, the second step, and the third step.

43. The blocked polyisocyanate composition according to claim 7, wherein at least part of the blocked polyisocyanate of the formula (I) is at least one blocked polyisocyanate represented by a formula (V):

wherein R represents a residue of a polyisocyanate made from one or two or more selected from an aliphatic polyisocyanate, an alicyclic polyisocyanate and an aromatic polyisocyanate, from which isocyanate groups thereof are excluded;
A represents one or two or more kinds of a keto form represented by the formula (II) or an enol isomer(s) thereof;
B represents one or two or more kinds of a structural unit represented by the above formula (III);
C represents one or two or more kinds of a structural unit represented by a formula (VI); and
x+y+z=2.0 to 20, and any of x and z is not 0,

wherein $R_{10}$ represents a residue of an active hydrogen-containing hydrophilic compound, from which an active hydrogen is excluded; and
wherein a number of moles of the blocked isocyanate groups in the formula (V) is indicated as a number of moles on the basis of isocyanate groups used as sources of partial structures A and B in the polyisocyanate serving as a precursor.

44. The blocked polyisocyanate composition according to claim 24, wherein at least part of the blocked polyisocyanate of the formula (I) is at least one blocked polyisocyanate represented by a formula (V):

wherein R represents a residue of a polyisocyanate made from one or two or more selected from an aliphatic polyisocyanate, an alicyclic polyisocyanate and an aromatic polyisocyanate, from which isocyanate groups thereof are excluded;
A represents one or two or more kinds of a keto form represented by the formula (II) or an enol isomer(s) thereof;
B represents one or two or more kinds of a structural unit represented by the above formula (III);
C represents one or two or more kinds of a structural unit represented by a formula (VI); and
x+y+z=2.0 to 20, and any of x and z is not 0,

wherein $R_{10}$ represents a residue of an active hydrogen-containing hydrophilic compound, from which an active hydrogen is excluded; and
wherein a number of moles of the blocked isocyanate groups in the formula (V) is indicated as a number of moles on the basis of isocyanate groups used as sources of partial structures A and B in the polyisocyanate serving as a precursor.

45. The blocked polyisocyanate composition according to claim 25, wherein at least part of the blocked polyisocyanate of the formula (I) is at least one blocked polyisocyanate represented by a formula (V):

wherein R represents a residue of a polyisocyanate made from one or two or more selected from an aliphatic polyisocyanate, an alicyclic polyisocyanate and an aromatic polyisocyanate, from which isocyanate groups thereof are excluded;
A represents one or two or more kinds of a keto form represented by the formula (II) or an enol isomer(s) thereof;
B represents one or two or more kinds of a structural unit represented by the above formula (III);
C represents one or two or more kinds of a structural unit represented by a formula (VI); and
x+y+z=2.0 to 20, and any of x and z is not 0,

wherein $R_{10}$ represents a residue of an active hydrogen-containing hydrophilic compound, from which an active hydrogen is excluded; and
wherein a number of moles of the blocked isocyanate groups in the formula (V) is indicated as a number of moles on the basis of isocyanate groups used as sources of partial structures A and B in the polyisocyanate serving as a precursor.

46. The blocked polyisocyanate composition according to claim 1, wherein the x and the y in the formula (I) meet the equation: x/y≥0.8.

* * * * *